(12) United States Patent
Wang et al.

(10) Patent No.: US 10,491,380 B2
(45) Date of Patent: Nov. 26, 2019

(54) FIRMWARE OF MODULAR ASSEMBLY SYSTEM

(71) Applicant: Shenzhen Bell Creative Science and Education Co., Ltd., Shenzhen (CN)

(72) Inventors: Zuobing Wang, Shenzhen (CN); Hongbo Qi, Shenzhen (CN); Jinfu Zhou, Shenzhen (CN); Ziwen Chen, Shenzhen (CN)

(73) Assignee: SHENZHEN BELL CREATIVE SCIENCE AND EDUCATION CO., LTD., Shenzhen (CN)

( * ) Notice: Subject to any disclaimer, the term of this patent is extended or adjusted under 35 U.S.C. 154(b) by 191 days.

(21) Appl. No.: 15/601,648

(22) Filed: May 22, 2017

(65) Prior Publication Data
US 2017/0286089 A1 Oct. 5, 2017

Related U.S. Application Data

(63) Continuation of application No. PCT/CN2016/104824, filed on Nov. 7, 2016.

(30) Foreign Application Priority Data

Mar. 31, 2016 (CN) .................... 2016 2 0271418 U

(51) Int. Cl.
*H04L 9/08* (2006.01)
*A63H 33/00* (2006.01)
(Continued)

(52) U.S. Cl.
CPC ......... *H04L 9/0816* (2013.01); *A63H 33/005* (2013.01); *A63H 33/042* (2013.01);
(Continued)

(58) Field of Classification Search
CPC ...... A63H 29/22; A63H 11/00; A63H 27/001; A63H 33/062; A63H 30/04; A63H 27/12;
(Continued)

(56) References Cited

U.S. PATENT DOCUMENTS 6,443,796 B1 9/2002 Shackelford
6,454,624 B1 9/2002 Duff et al.
(Continued)

FOREIGN PATENT DOCUMENTS

CN 101908989 A 12/2010
CN 102033764 A 4/2011
(Continued)

OTHER PUBLICATIONS

International Search Report and Written Opinion directed to International Patent Application No. PCT/CN2016/104824, dated Feb. 6, 2017; 15 pages.
(Continued)

*Primary Examiner* — Cheng-Feng Huang
(74) *Attorney, Agent, or Firm* — Bayes PLLC

(57) ABSTRACT

A method for updating firmware on a control module of a modular assembly system is provided. Information related to noise sampled from the control module is obtained. A first encryption key is calculated based on the information. Firmware to be updated on the control module is received from a host of the modular assembly system. The firmware is encrypted based on at least a second encryption key. In response to determining that the received firmware can be decrypted, the decrypted firmware is loaded into the control module. At least one of the obtaining, calculating, receiving, determining, and loading is performed by the control module.

12 Claims, 47 Drawing Sheets

(51) Int. Cl.

| | |
|---|---|
| *A63H 33/04* | (2006.01) |
| *G06F 8/65* | (2018.01) |
| *H04L 9/14* | (2006.01) |
| *B25J 9/08* | (2006.01) |
| *B25J 9/16* | (2006.01) |
| *G06F 9/54* | (2006.01) |
| *G06F 3/0481* | (2013.01) |
| *G06F 3/0484* | (2013.01) |
| *G06F 3/0488* | (2013.01) |
| *H04L 12/24* | (2006.01) |
| *B25J 9/00* | (2006.01) |
| *G05B 15/02* | (2006.01) |
| *A63H 27/00* | (2006.01) |
| *G06F 8/30* | (2018.01) |
| *A63H 11/00* | (2006.01) |

(52) U.S. Cl.
CPC .............. *B25J 9/08* (2013.01); *B25J 9/1617* (2013.01); *G06F 3/04817* (2013.01); *G06F 3/04847* (2013.01); *G06F 3/04883* (2013.01); *G06F 8/65* (2013.01); *G06F 9/546* (2013.01); *H04L 9/0819* (2013.01); *H04L 9/0894* (2013.01); *H04L 9/14* (2013.01); *H04L 41/12* (2013.01); *A63H 11/00* (2013.01); *A63H 27/001* (2013.01); *B25J 9/0003* (2013.01); *G05B 15/02* (2013.01); *G06F 8/30* (2013.01)

(58) Field of Classification Search
CPC .... A63H 33/042; A63H 33/26; A63H 33/005; B25J 9/1617; B25J 9/08; B25J 9/0003; H04L 41/12; H04L 9/0894; H04L 9/0819; H04L 9/0816; H04L 9/14; G06F 3/167; G06F 3/04847; G06F 3/0486; G06F 3/04883; G06F 3/017; G06F 3/04817; G06F 3/0482; G06F 9/546; G06F 8/65; G06F 8/30; H01R 13/6271; H01R 13/627; G09B 5/00; G05B 15/02
See application file for complete search history.

(56) References Cited

U.S. PATENT DOCUMENTS

| | | | |
|---|---|---|---|
| 6,724,894 B1 * | 4/2004 | Singer ............... | H04L 9/302 |
| | | | 380/277 |
| 7,252,572 B2 | 8/2007 | Wright et al. | |
| 8,364,309 B1 | 1/2013 | Bailey | |
| 8,371,894 B1 | 2/2013 | Rosen et al. | |
| 8,851,953 B2 | 10/2014 | Oschuetz et al. | |
| 9,065,519 B2 | 6/2015 | Cyzs et al. | |
| 10,177,934 B1 * | 1/2019 | Marr ............... | H04L 12/40032 |
| 2006/0092133 A1 | 5/2006 | Touma et al. | |
| 2009/0023358 A1 | 1/2009 | Lu | |
| 2009/0215357 A1 | 8/2009 | Seligman | |
| 2011/0045736 A1 | 2/2011 | Wooten | |
| 2011/0138192 A1 * | 6/2011 | Kocher ............ | G06F 21/602 |
| | | | 713/189 |
| 2011/0276807 A1 * | 11/2011 | Shin ............... | G06F 8/65 |
| | | | 713/189 |
| 2012/0122059 A1 | 5/2012 | Schweikardt et al. | |
| 2013/0019019 A1 | 1/2013 | Lam | |
| 2013/0197859 A1 | 8/2013 | Albano et al. | |
| 2013/0217296 A1 | 8/2013 | Widjaja | |
| 2014/0122903 A1 * | 5/2014 | Endo ............... | G06F 21/602 |
| | | | 713/193 |
| 2014/0308872 A1 | 10/2014 | Petillo | |
| 2015/0012688 A1 * | 1/2015 | Zhang .............. | G06F 8/654 |
| | | | 711/103 |
| 2015/0074420 A1 * | 3/2015 | Sone ............... | G06F 8/654 |
| | | | 713/187 |
| 2015/0121070 A1 * | 4/2015 | Lau ................. | G06F 8/654 |
| | | | 713/164 |
| 2015/0180840 A1 * | 6/2015 | Jung ................ | G06F 8/654 |
| | | | 713/150 |
| 2015/0217204 A1 | 8/2015 | Howard et al. | |
| 2015/0364060 A1 | 12/2015 | Gupta et al. | |
| 2016/0127931 A1 * | 5/2016 | Baxley ............ | G06F 16/285 |
| | | | 455/67.16 |
| 2017/0177512 A1 | 6/2017 | Villar et al. | |

FOREIGN PATENT DOCUMENTS

| | | |
|---|---|---|
| CN | 102563168 A | 7/2012 |
| EP | 1287869 A2 | 3/2003 |
| WO | WO 2009017657 A1 | 2/2009 |
| WO | 2016187517 A1 | 11/2016 |

OTHER PUBLICATIONS

English-language abstract of Chinese Patent Publication No. CN 101908989 A; 2 pages.
English-language abstract of Chinese Patent Publication No. CN 102033764 A; 2 pages.
English-language abstract of Chinese Patent Publication No. CN 102563168 A; 1 page.
Supplementary European Search Report issued in parallel International Patent Application No. PCT/CN2016/104824, dated Feb. 21, 2019; 7 page.

\* cited by examiner

FIRMWARE OF MODULAR ASSEMBLY SYSTEM

CROSS REFERENCE TO RELATED APPLICATION

This application is continuation of International Application No. PCT/CN2016/104824, filed on Nov. 7, 2016, entitled "Modular Assembly System," which claims priority to Chinese Application No. CN201620271418.0, filed on Mar. 31, 2016, both of which are hereby incorporated by reference in their entireties.

BACKGROUND

The disclosure relates generally to robotic systems, and more particularly, to modular assembly robotic toys.

Robotic toys are cutting-edge products for childhood education because they can keep children engaged, educated, and entertained. Unlike a virtual character that resides only on a display screen, a robotic toy can be held in a child's arm or touched and thus, provides a visceral experience. Today, one focus is to explore how more sophisticated robotic systems could be used in educational settings. For example, the term "educational robotics" refers to the teaching practice during which the students use the robots to construct knowledge with the help of or for the robots themselves.

While there is much potential for such systems, known robotic systems as toys have encountered issues such as difficulty of assembling, limited functions, and lack of flexibility and extensibility, especially when the users are young children.

SUMMARY

The disclosure relates generally to robotic systems, and more particularly, to modular assembly robotic toys.

In one example, a system includes a plurality of assembly modules and one or more connectors. Each assembly module includes at least one connection interface. Each connector is configured to mechanically and electrically connect two of the plurality of assembly modules via the respective connection interfaces of the two assembly modules. The plurality of assembly modules include at least a control module and an analyzing module. The control module includes a control module communication unit configured to obtain a set of host instructions from one or more hosts and a control module processor configured to generate a set of operation instructions for control each assembly module based on at least the set of host instructions. The analyzing module includes an analyzing module sensor configured to obtain a sensor signal, an analyzing module processor configured to analyze the sensor signal to generate a first analyzing result, and an analyzing module communication unit configured to transmit the sensor signal or the first analyzing result to at least one of the one or more hosts.

In another example, an assembly module includes at least one connection interface, a sensor, a processor, and a communication unit. Each connection interface is configured to mechanically and electrically connect to a connector and receive at least a power signal via the connector. The sensor is configured to obtain a sensor signal. The processor is operatively coupled to the sensor and the at least one connection interface and configured to analyze the sensor signal to generate an analyzing result. The communication unit is operatively coupled to the processor and configured to transmit the sensor signal or the analyzing result to a host.

In still another example, a system includes a plurality of assembly modules and one or more connectors. At least one of the assembly modules includes at least one connection interface. Each connector is configured to mechanically and electrically connect two of the plurality of assembly modules via the connection interface of one of the two assembly modules. The plurality of assembly modules include at least a control module and an actuation module. The control module includes a communication unit configured to obtain a set of host instructions from one or more hosts and a processor configured to generate a set of operation instructions for each assembly module based on at least the set of host instructions. The actuation module includes a set of propellers and a motor configured to drive the set of propellers based on at least the set of operation instructions for the actuation module generated by the processor.

In yet another example, a system includes a plurality of assembly modules and one or more connectors. Each assembly module includes at least one connection interface. Each connector is configured to mechanically and electrically connect two of the plurality of assembly modules via the respective connection interfaces of the two assembly modules. Each connector includes two open ends adapted to fitting into the connection interfaces of the two assembly modules, respectively. The plurality of assembly modules include at least a control module. The control module includes a communication unit configured to obtain a set of host instructions from one or more hosts and a processor configured to generate a set of operation instructions for each assembly module based on at least the set of host instructions.

In a different example, a connection structure includes two connection interfaces and a connector. Each connection interface includes a plurality of planar contacts arranged at a center and one or more concentric rings on a circuit board and a plurality of first lock mechanisms arranged on a first casing. The connector includes a second casing including two open ends and a plurality of second lock mechanisms arranged on the second casing and a plurality of pins. Each pin includes two ends each exposed by one of the two open ends of the second casing, respectively. When the connector is plugged into the two connection interfaces at a plurality of orientations relative to one another, the plurality of pins of the connector are in contact with the plurality of planar contacts of each connection interface so that the two connection interfaces are electrically connected, and the plurality of second lock mechanisms of the connector are interlocked with the plurality of first lock mechanisms of each connection interface so that the two connection interfaces are mechanically connected.

In another example, a connection structure includes two connection interfaces and a connector. Each connection interface includes a plurality of contacts arranged on a circuit board and a plurality of first lock mechanisms arranged on a first casing. The connection includes a second casing including two open ends and a plurality of second lock mechanisms arranged on the second casing and a plurality of concentric ring contacts. Each concentric ring contact includes two ends each exposed by one of the two open ends of the second casing, respectively. When the connector is plugged into the two connection interfaces at a plurality of orientations relative to one another, the plurality of concentric ring contacts of the connector are in contact with the plurality of contacts of each connection interface so that the two connection interfaces are electrically connected, and the plurality of second lock mechanisms of the connector are interlocked with the plurality of first lock mechanisms of each connection interface so that the two connection interfaces are mechanically connected.

In a different example, a method for registering one of a plurality of assembly modules operatively coupled to one another in a modular assembly system is provided. A first message including a first identifier of the assembly module is received from one of the plurality of assembly modules. A second message including a second identifier for the assembly module is transmitted to the assembly module. The second identifier is generated based on at least the first identifier. A third message including the second identifier is received from the assembly module. In response to determining that the third message is received, the assembly module is registered as a new assembly module of the modular assembly system. At least one of the receiving, transmitting, determining, and registering is performed by a control module of the plurality of assembly modules.

In another example, a method for updating a status associated with one of a plurality of assembly modules operatively coupled to one another in a modular assembly system is provided. A first message for requesting data from the assembly module is transmitted to one of the plurality of assembly modules. A second message including the requested data or a third message including a normal status indicator is received from the assembly module. In response to determining that the second message or the third message is received, a status associated with the assembly module is updated as being coupled to the modular assembly system. At least one of the transmitting, determining, and updating is performed by a control module of the plurality of assembly modules.

In a different example, a method for updating firmware on a control module of a modular assembly system is provided. Information related to noise sampled from the control module is obtained. A first encryption key is calculated based on the information. Firmware to be updated on the control module is received from a host of the modular assembly system. The firmware is encrypted based on at least a second encryption key. In response to determining that the received firmware can be decrypted, the decrypted firmware is loaded into the control module. At least one of the obtaining, calculating, receiving, determining, and loading is performed by the control module.

In another example, a method for encrypting firmware to be updated on a control module of a modular assembly system is provided. An encryption key calculated based on information related to noise sampled from the control module is received. Firmware is encrypted based on at least the encryption key. The encrypted firmware is transmitted to the control module. At least one of the receiving, encrypting, and transmitting is performed by a host of the modular assembly system.

In a different example, a method for providing host instructions to a control module of a modular assembly system comprising a plurality of assembly modules is provided. A graphical programming environment including a set of first graphical representations and a set of second graphical representations is presented to a user. Each first graphical representation corresponds to a statement block comprising at least one parameter. Each second graphical representation corresponds to one of the plurality of assembly modules associated with at least one property. A user is facilitated to select at least one of the first graphical representations and provide values to the at least one parameter of each selected first graphical representation. The user is facilitated to provide values to the at least one property of one or more of the second graphical representations. Based on at least the selected first and second graphical representations and the provided values thereof, a set of host instructions are generated. The set of host instructions are transmitted to the control module for controlling operation of the plurality of assembly modules. At least one of the presenting, facilitating, facilitating, generating, and transmitting is performed by a host of the modular assembly system.

In another example, a method for providing host instructions to a control module of a modular assembly system comprising a plurality of assembly modules is provided. A graphical user interface (GUI) including a first set of GUI elements and a second set of GUI elements is presented to a user. The first set of GUI elements allow the user to interactively control operation of the modular assembly system at runtime when the modular assembly system is on operation. The second set of GUI elements allow the user to designate a function corresponding to the modular assembly system. The user is facilitated to select one of the first and second sets of GUI elements. In response to the user selecting the first set of GUI elements, a first set of host instructions are dynamically generated based on at least the user's interactions with the first set of GUI elements for controlling the operation of the modular assembly system at runtime, and the generated first set of host instructions are transmitted to the control module of the modular assembly system at runtime when the modular assembly system is on operation. In response to the user selecting the second set of GUI elements, a second set of host instructions are obtained based on at least the function designated by the user, and the obtained second set of host instructions are transmitted to the control module of the modular assembly system prior to the modular assembly system performs the function designated by the user. At least one of the presenting, facilitating, generating, transmitting, obtaining, and transmitting is performed by a host of the modular assembly system.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Figure 1A:
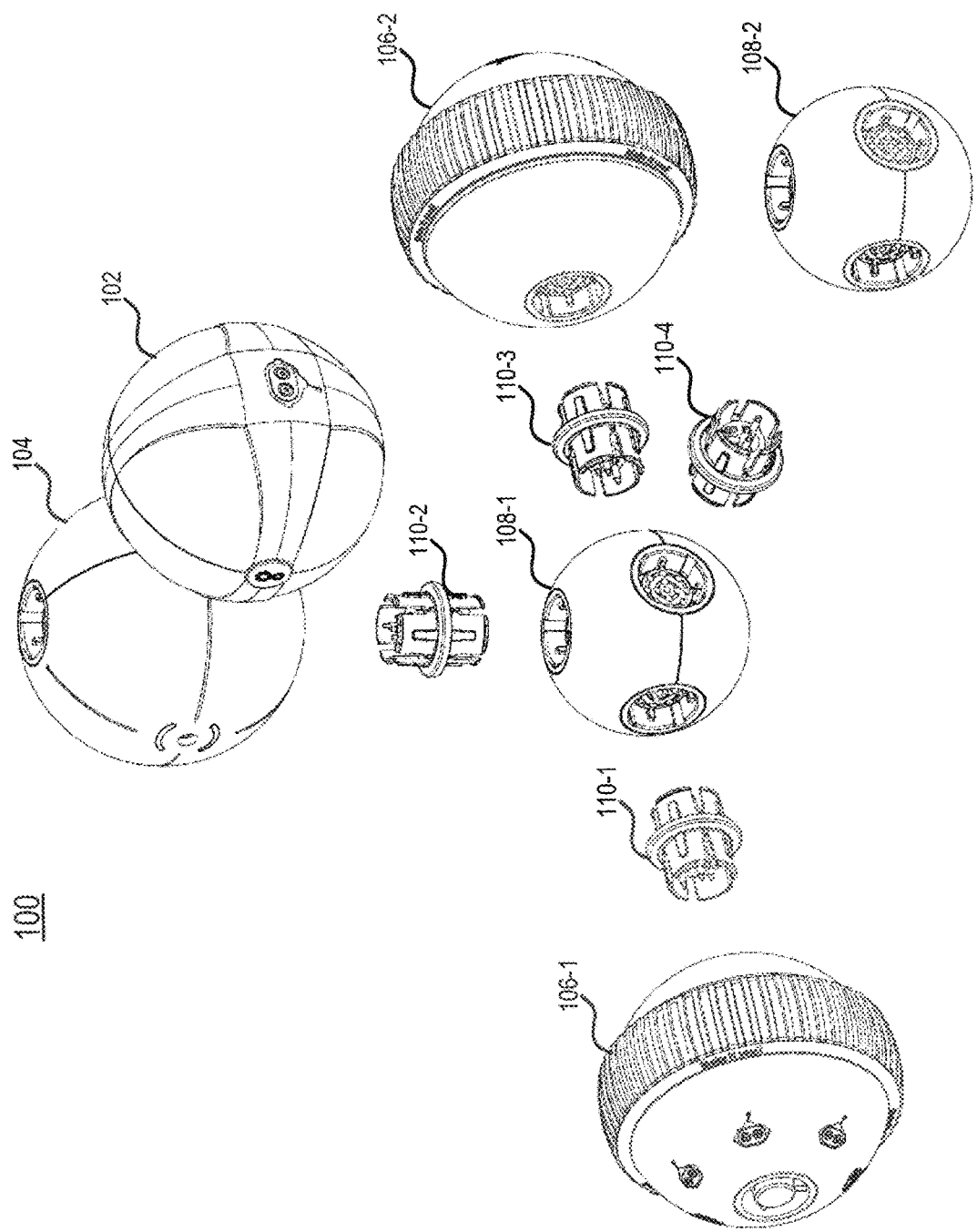
FIGS. 1A-1C are perspective views of an example of a modular assembly robotic toy including multiple assembly modules and connectors in accordance with an embodiment.

In the following detailed description, numerous specific details are set forth by way of examples in order to provide a thorough understanding of the relevant disclosures. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As will be disclosed in detail below, among other novel features, the modular assembly systems disclosed herein provide the ability to easily assemble a wide variety of robotic toys from different assembly modules without any assembly tools. In some embodiments, connectors can be used to both mechanically and electrically connect any assembly modules via their respective connection interfaces, thereby providing flexibility and extensibility to achieve different structures, forms, and functions of robotic toys by users. In some embodiments, assembly modules may include "smart" modules that can independently perform certain sensing and analysis functions and communicate the sensing and/or analysis results directly with remote hosts and/or servers. In some embodiments, detection mechanisms may be used to efficiently and effectively achieve assembly module registration and status updates (e.g., online and offline) without the need for physical module configuration or user intervention. In some embodiments, the functions of an assembly module may be further extended by downloading updated firmware using secure update mechanisms.

The modular assembly systems disclosed herein also provide the ability to facilitate users to easily program any assembled robotic toys via graphical interfaces of various software applications so as to customize the behaviors and functions of the assembled robotic toys as desired. In some embodiments, a graphical programming environment can be used by users, for example, young children, to input programs that can be downloaded to the assembled robotic toys. In some embodiments, a runtime control environment may be provided on a portable device so that users can intuitively and interactively control the actions of the assembled robotic toys in real-time.

Additional novel features will be set forth in part in the description which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities, and combinations set forth in the detailed examples discussed below.

Modular Assembly System

Figure 1B:
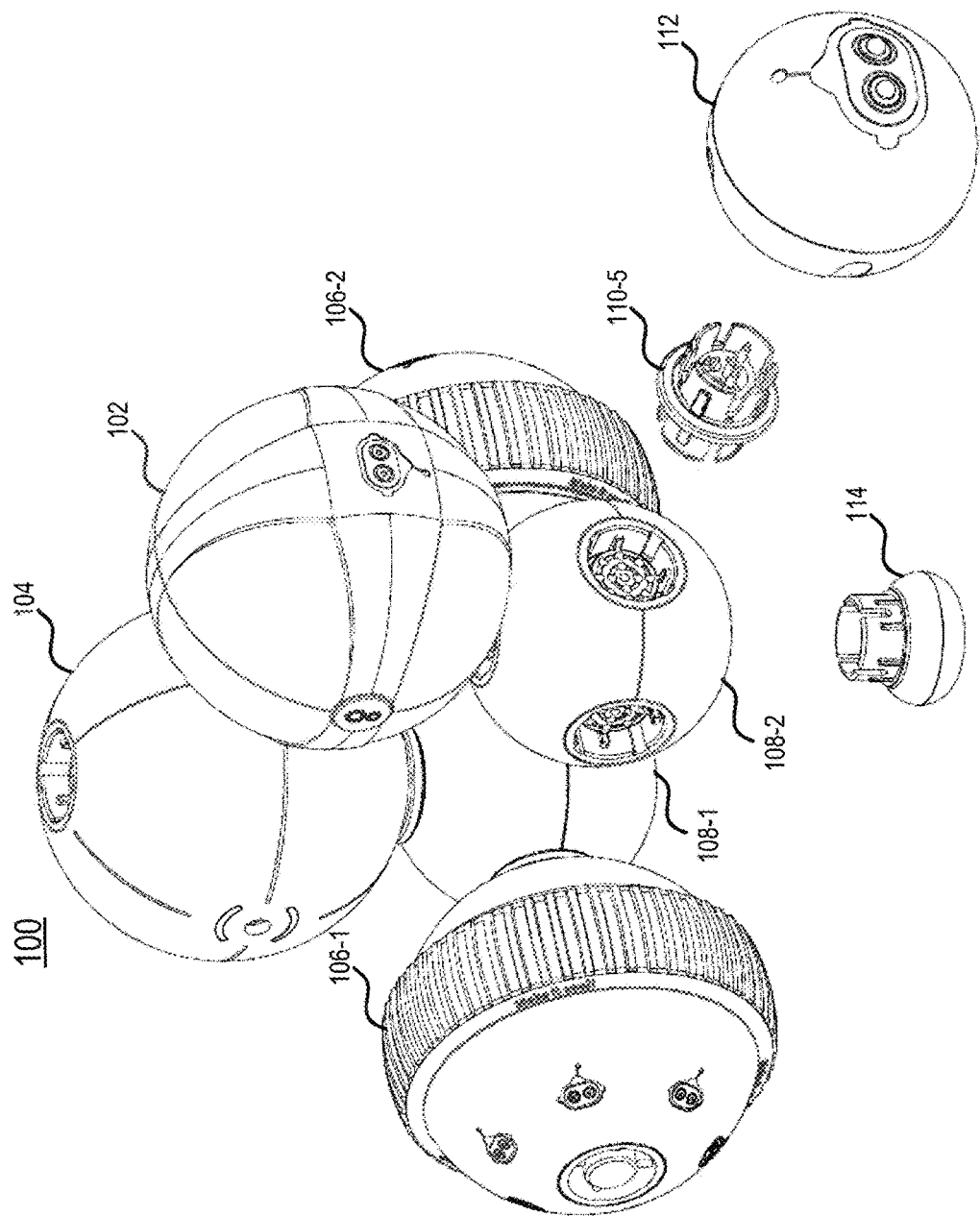
Figure 1C:
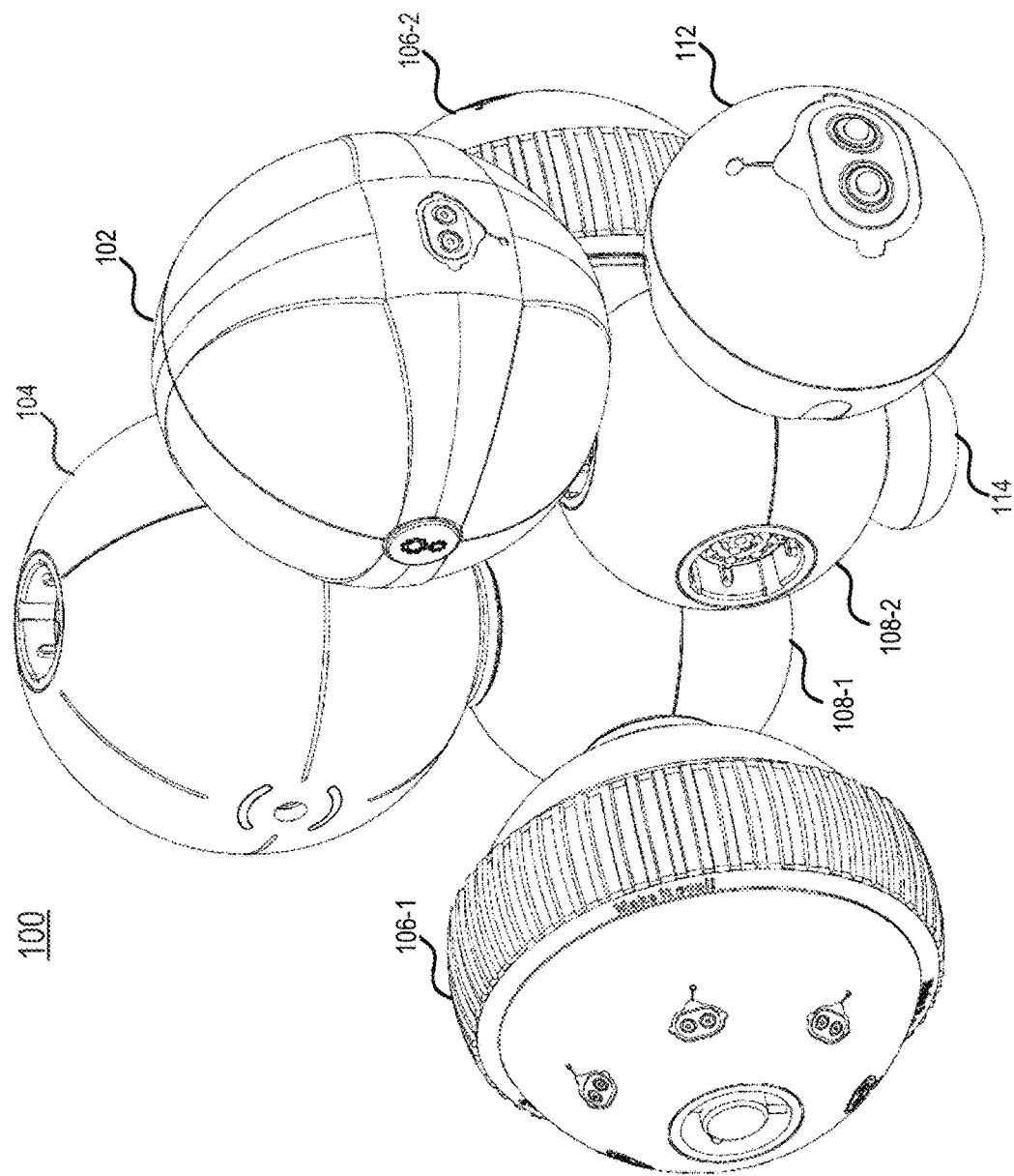

FIGS. 1A-1C are perspective views of an example of a modular assembly robotic toy 100 including multiple assembly modules 102, 104, 106, and 108 and connectors 110 in accordance with an embodiment. In FIG. 1A, a control module 102 is connected to a power module 104 by a connector 110. Power module 104 and the rest of assembly modules—two wheel modules 106-1 and 106-2 and two connector modules 108-1 and 108-2 are to be connected by connectors 110-1, 110-2, 110-3, and 110-4. In this embodiment, all connectors 110 are the same and interchangeable. Any connector 110 can be used to mechanically and electrically connect any two assembly modules 102, 104, 106, and 108 via their respective connection interfaces, which are the same as well. In this embodiment, each of power module 104 and connector modules 108-1 and 108-2 includes multiple connection interfaces and thus, can connect to multiple assembly modules 102, 104, 106, and 108. Thus, power module 104 and connector modules 108-1 and 108-2 may serve as a "hub" to provide the flexibility and extensibility of connecting multiple assembly modules together. For example, connector module 108-1 can connect to power module 104 and two wheel modules 106-1 and 106-2. On the other hand, some assembly modules, such as control module 102 and wheel modules 106-1 and 106-2, each includes a single connection interface and thus, may be arranged at the "end" of modular assembly robotic toy 100.

As will be described below in detail, control module 102 may work as the "brain" of modular assembly robotic toy 100 to control operations of each assembly module of modular assembly robotic toy 100 by communicating data signals, e.g., operation instructions, with each assembly module via connectors 110. Power module 104 may provide "energy" to modular assembly robotic toy 100, for example, by transmitting power signals from a battery pack to each assembly module via connectors 110. Wheel modules 106, as one example of actuator modules, may work as the "feet" of modular assembly robotic toy 100 by rotating themselves along the axis of rotation. In this embodiment, each assembly module is substantially ball-shaped. For example, because of the ball shape, wheel modules 106 can move without additional structures, i.e., can rotate themselves along the axis of rotation. Also, because of the ball shape, multiple connection interfaces can be arranged symmetrically along any diameters of connector module 108 so that connector module 108 can be arranged at various orientations in modular assembly robotic toy 100, which further improves the flexibility and extensibility of modular assembly robotic toy 100. Connectors 110 may serve as the "bones" and "nerves" of modular assembly robotic toy 100 to provide both mechanical and electrical connections between assembly modules. For example, each connector 110 includes two open ends adapted to fitting into the connection interfaces of any two assembly modules, respectively.

FIG. 1B illustrates that the assembly modules described with respect to FIG. 1A have been assembled together. The assembled structure can move around by wheel modules 106, which are controlled by control module 102 and powered-up by power module 104. FIG. 1B further illustrates that modular assembly robotic toy 100 can change its structure and form and extend its functions by connecting more assembly modules, e.g., an infrared sensor module 112 via connector 110-5 and a follower 114. In this embodiment, infrared sensor module 112 can be plugged into modular assembly robotic toy 100 by connecting to a spare connection interface of connector module 108-2 via connector 110-5. Follower 114, as one example of accessories, may be directly connected to another spare connection interface of connector module 108-2 without any connector.

As will be described below in detail, infrared sensor module 112, as one example of sensor modules, may work as the "eyes" of modular assembly robotic toy 100 to detect any objects by infrared beams. The sensor signals obtained by infrared sensor module 112 may be transmitted to control module 102 via connectors 110. Infrared sensor module 112 may be substantially ball-shaped as well. In this embodiment, follower 114 may help supporting and balancing modular assembly robotic toy 100 and follow the movement of wheel modules 106.

FIG. 1C illustrates that the assembly modules described with respect to FIG. 1B have been assembled together to build modular assembly robotic toy 100. Modular assembly robotic toy 100 can move around by wheel modules 106 and follower 114, which are controlled by control module 102 and powered-up by power module 104. Modular assembly robotic toy 100 can also detect objects along the moving path by infrared sensor module 112. In some embodiments, control module 102 may adjust the moving path to avoid any objects detected by infrared sensor module 112 and control the movement of wheel modules 106 according to the adjusted moving path in real-time. As will be described below in detail, the detection and movement operations of modular assembly robotic toy 100 may be controlled by control module 102 in accordance with host instructions received from host(s) either in the form of programming instructions downloaded prior to the operation of modular assembly robotic toy 100 or in the form of control instructions received at runtime. That is, modular assembly robotic toy 100 can be customized by assembling a number of assembly modules with different functions using the same connectors 110 and by programming the assembled structure through predefined programs and/or real-time control. It is to be appreciated that modular assembly robotic toy 100 illustrated in FIGS. 1A-1C is for the illustrative purpose only. As a modular assembly system, robotic toys with different structures, forms, and functions may be easily assembled and programmed in other examples as will be described below in detail.

Figure 2:
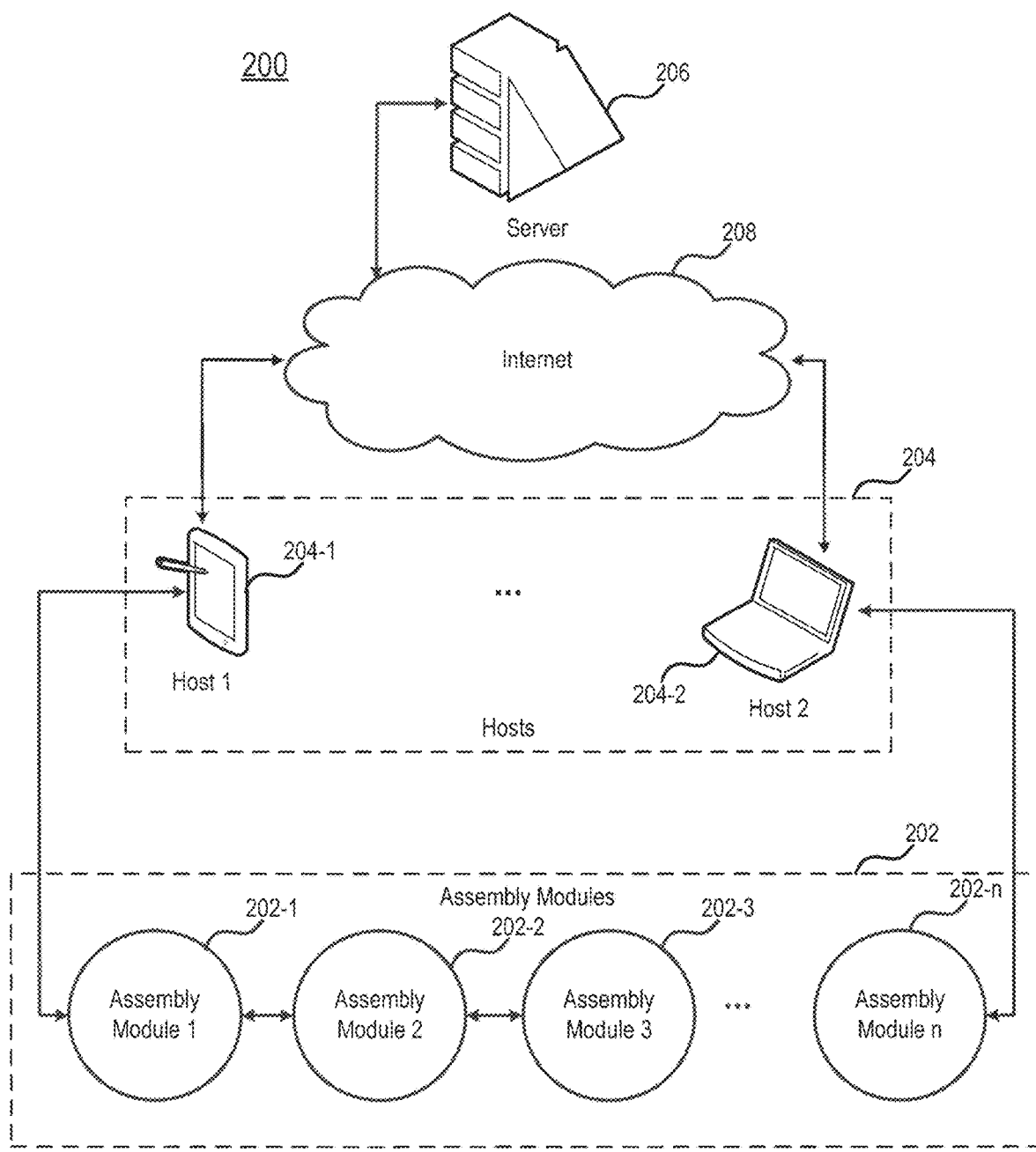
FIG. 2 is a block diagram illustrating a system including assembly modules, hosts, and a server in accordance with an embodiment.
Figure 3:
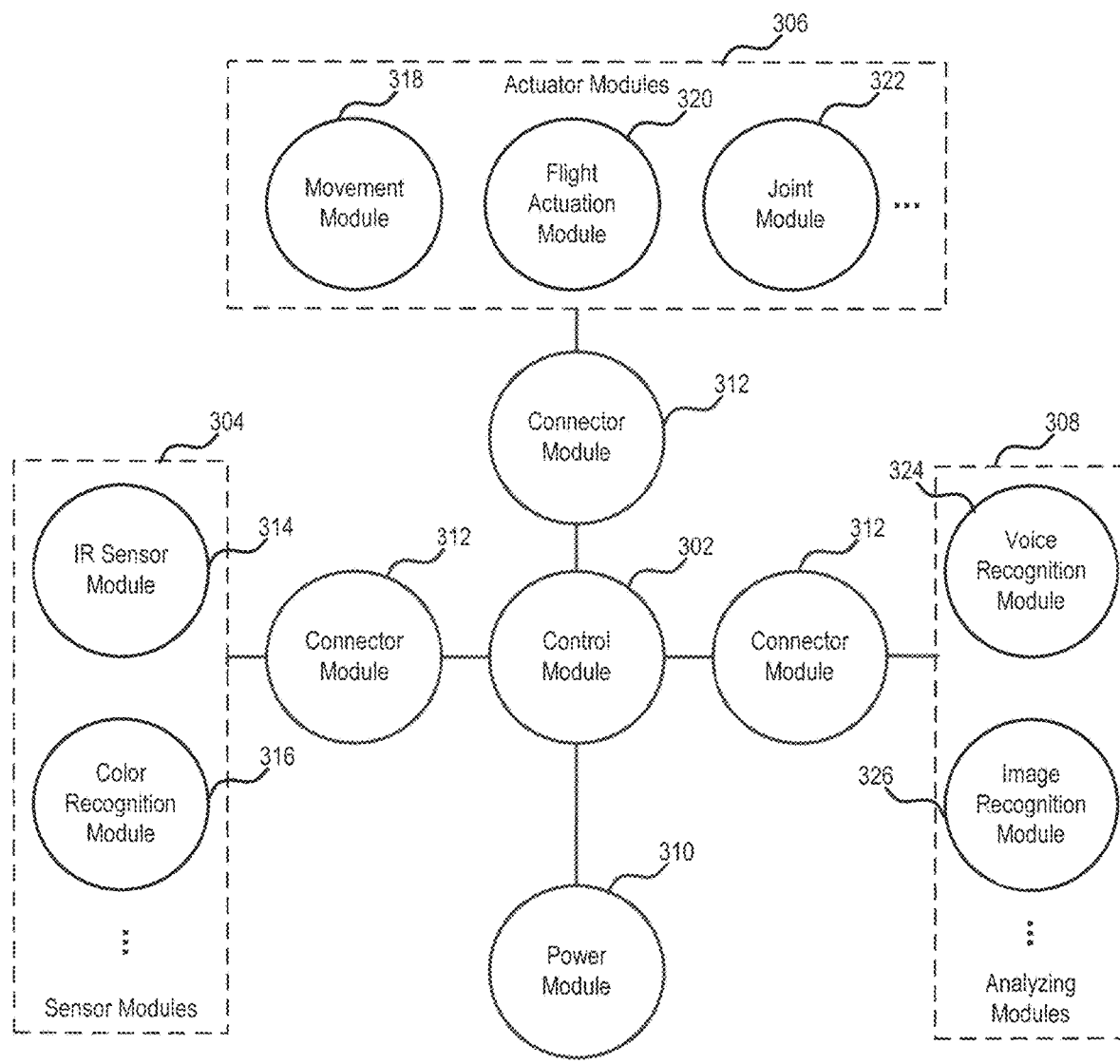
FIG. 3 is a depiction of various examples of assembly modules in accordance with an embodiment.

FIG. 2 is a block diagram illustrating a system 200 including assembly modules 202, hosts 204, and a server 206 in accordance with an embodiment. System 200 in this embodiment provides hardware, firmware, software, and service supports for assembling, testing, and maintaining modular assembly robotic toys with different structures, forms, and functions. Assembly modules 202 include a number of assembly modules 202-1, 202-2, 202-3, . . . , 202-n of different types. For example, FIG. 3 is a depiction of various examples of assembly modules 202 in accordance with an embodiment, which include control modules 302 (e.g., control module 102 in FIGS. 1A-1C), sensor modules 304, actuator modules 306, analyzing modules 308 (a.k.a. "smart" modules), power modules 310 (e.g., power module 104 in FIGS. 1A-1C), and connector modules 312 (e.g., connector module 108 in FIGS. 1A-1C). It is to be appreciated that any other types of assembly modules may be included in other examples.

In this embodiment, sensor modules 304 may include sub-types, such as infrared sensor modules 314 (e.g., infrared sensor module 112 in FIGS. 1A-1C), color recognition modules 316, and any other sensor modules that can obtain sensor signals from one or more sensors of any types. Actuator modules 306 may include sub-types as well, for example, movement modules 318 (e.g., wheel module 106 in FIGS. 1A-1C), flight actuation modules 320, joint modules 322, and any other actuator modules that can apply energy for physical operation by one or more actuators of any types. Analyzing modules 308 may also include sub-types, including voice recognition modules 324, image recognition modules 326, and any other analyzing modules that can independently obtain and analyze sensor signals and transmit the sensor signals or the analyzing result to hosts 204 and/or server 206. It is to be appreciated that in some embodiments, the same assembly module (e.g., in the sense of having the same hardware) may become different types of assembly modules by downloading different types of firmware. For example, voice recognition module 324 and image recognition module 326 may be formed by downloading different types of firmware to the same physical module. In some embodiments, one type of assembly module may become another type of assembly module by connecting to accessories. For example, movement module 318 may connect to a set of propellers to become flight actuation module 320 or a water actuation module (not shown).

As shown in FIG. 3, different types of assembly modules 202 may be connected to control modules 302 through connector modules 312. It is to be appreciated that any two assembly modules 202, either in the same type or different types, may be connected one another without connector module 312, e.g., be connected directly via connectors as described above with respect to FIGS. 1A-1C. It is also to be appreciated that connector modules 312 do not have to be connected to control modules 302 and can be connected to any types of assembly modules 202. In some embodiments, connector modules 312 may be viewed as a "hub" to provide a number of connection interfaces so that more assembly modules 202 can be assembled together. Regardless of the specific type, each assembly module 202 includes at least one connection interface through which assembly module 202 can be plugged to a modular assembly robotic toy by a connector. In some embodiments, connection interfaces of any assembly modules 202 are all the same, i.e., are standard connection interfaces, so that the same connectors can be used to connect any two assembly modules 202. As described above, in some embodiments, each assembly module 202 is substantially ball-shaped. The detail of each assembly module 202 will be described below with respect to FIGS. 6-11.

Referring back to FIG. 2, in this embodiment, hosts 204 may include multiple hosts 204-1 and 204-2, each of which may be any suitable device, for example, a mobile or portable device (e.g., dumb or smart phone, tablet, etc.), laptop computer, desktop computer, netbook computer, media center, wearable device (e.g., eyeglasses, wrist watch, etc.), virtual reality (VR) or augmented reality (AR) device (e.g., VR headset, etc.), automobile control station, gaming console, television set, set-top box, global positioning system (GPS), printer, or any other suitable device. Hosts 204 may communicate with some of assembly modules 202, e.g., control modules 302 and analyzing modules 308, via any suitable communication approaches, such as wired communication, e.g., universal serial bus (USB), IEEE 1394, Thunderbolt, etc., or wireless communication, e.g., WiFi, Bluetooth, ZigBee, near-field communication (NFC), etc., to name a few. Hosts 204 may also communicate with server 206 via the Internet 208. In some embodiments, Hosts 204 may communicate with server 206 via any other networks, such as a local area network (LAN), a personal area network (PAN), etc.

In this embodiment, applications may run on hosts 204 to allow hosts 204 to configure, control, and manage any modular assembly robotic toys assembled from assembly modules 202. In one example, programming applications running on hosts 204 may facilitate users to build programs or select existing demo programs and download the programs into control module 302. In another example, control applications running on hosts 204 may allow users to real-time control the operations of modular assembly robotic toys by transmitting control instructions to control module 302 at runtime. In still another example, hosts 204 may obtain updated firmware, for example, from server 206, encrypt the firmware, and manage the downloading of the encrypted firmware to control module 302. In yet another example, hosts 204 may receive and handle data from modular assembly robotic toys, e.g., from control module 302 or analyzing module 308. For example, status (e.g., registration or online/offline status) of each assembly module 202 may be displayed on hosts 204 based on status messages received from control module 302; sensor signals and/or analyzing results of the sensors signals may be received from control module 302 and/or analyzing modules 308 and processed by hosts 204 or forwarded to server 206 for further processing. In this embodiment, multiple hosts 204 may be used to distribute the tasks. For example, host 204-2 may be a laptop or desktop computer on which the programming application and firmware update application run. Host 204-2 may be connected to control module 302 via USB to transmit programming instructions or updated firmware to control module 302 prior to the operation of the modular assembly robotic toy. Host 204-1 may be a mobile or portable device on which the control application runs. Host 204-1 may be connected to control module 302 via Bluetooth to transmit real-time control instructions and connected to analyzing modules 308 via WiFi to receive sensor signals and/or analyzing results from analyzing modules 308 at runtime.

In this embodiment, server 206 may run on the backend of system 200 to provide various services to system 200 via different applications running thereon. For example, an artificial intelligence application may be used by server 206 to analyze any sensor signals or analyzing results obtained from analyzing module 308 (e.g., being forwarded by hosts 204) to performance tasks such as voice recognition or image recognition. In another example, a user management application may be used by server 206 to manage users' information and store usage data related to the modular assembly robotic toys. In still another example, a firmware management application may be used by server 206 to store and manage firmware update data. As described above, server 206 may communicate with hosts 204 via the Internet 208 or any other networks to provide the services described above. It is to be appreciated that in some embodiments, server 206 may communicate with some assembly modules 202 directly, e.g., analyzing modules 308 for receiving the sensor signals and/or analyzing results.

Figure 4:
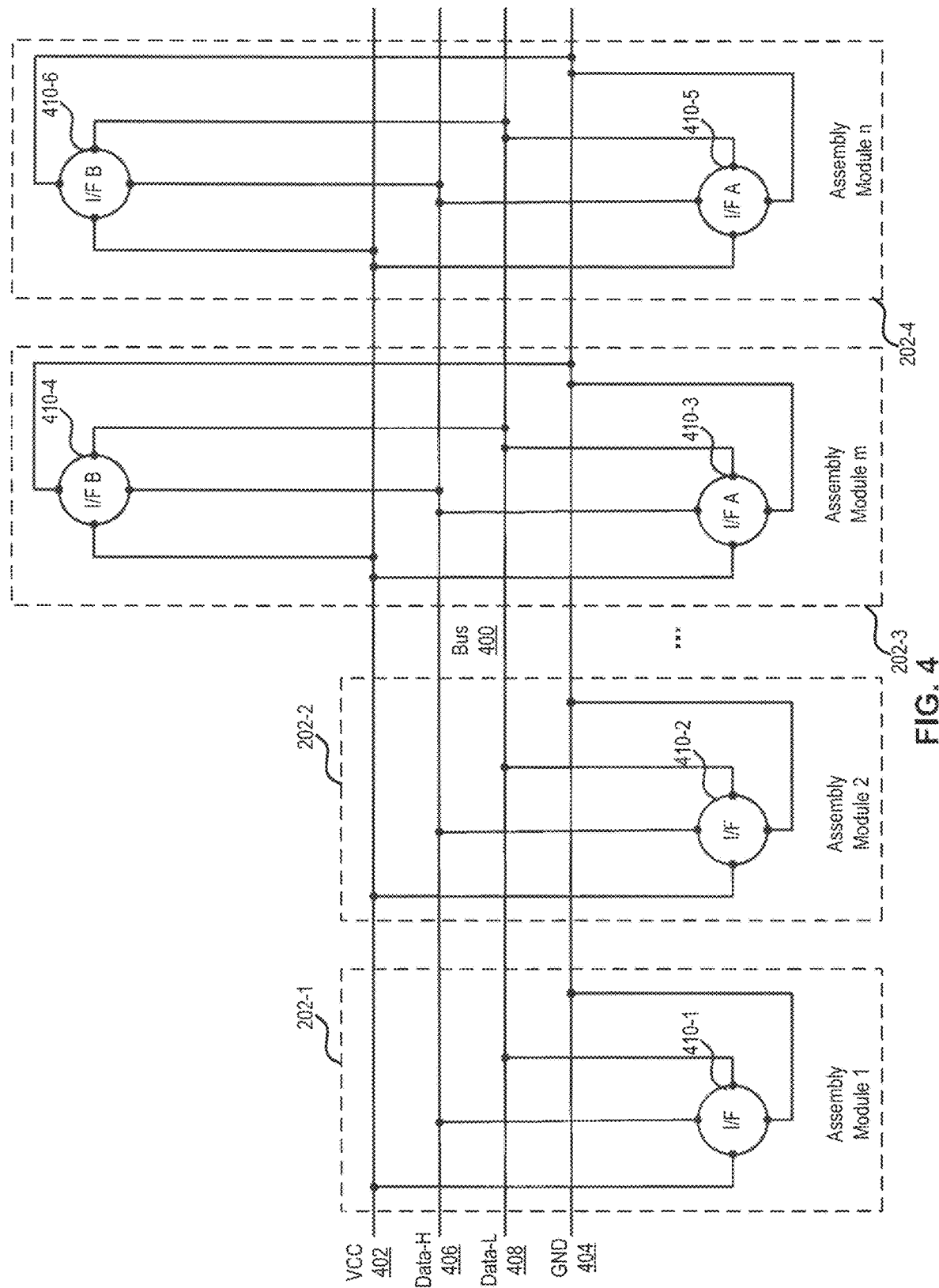
FIG. 4 is a schematic diagram illustrating an example of a bus connecting multiple assembly modules in accordance with an embodiment.

FIG. 4 is a schematic diagram illustrating an example of a bus 400 connecting multiple assembly modules 202 in accordance with an embodiment. In this embodiment, upon a number of assembly modules 202 being mechanically and electrically connected one another via connectors to form a modular assembly robotic toy, bus 400 is formed for transmitting power signals and data signals between assembly modules 202. As shown in FIG. 4, bus 400 may include two power lines—power supply (VCC) 402 and ground (GND) 404 for transmitting the power signals, e.g., a voltage between VCC 402 and GND 404. Bus 400 may also include two data lines—Data-H 406 and Data-L 408 for transmitting the data signals, for example, differential data signals. Each assembly module 202 may be electrically connected to bus 400 in parallel. For example, each connection interface (I/F) 410 of assembly module 202 may include four contacts, each of which can electrically connect to one of the four lines of bus 400. For some assembly modules 202-1 and 202-2 that include a single connection interface 410-1 and 410-2, e.g., control modules 302, sensor modules 304, or actuator modules 306, assembly modules 202-1 and 202-2 are electrically connected to bus 400 via single connection interface 410-1 and 410-2, respectively. For some assembly modules 202-3 and 202-4 that include multiple connection interfaces 410-3, 410-4, 410-5, and 410-6, e.g., power modules 310 or connector modules 312, each connection interface 410-3, 410-4, 410-5, and 410-6 of assembly modules 202-3 and 202-4 is individually and separately electrically connected to bus 400. As described above, power signals may be transmitted from power module 310 to each assembly module 202 via VCC 402 and GND 404 power lines of bus 400. Data signals may include operation instructions transmitted from control module 302 to each assembly module 202 and module data (e.g., sensor signals or status information) transmitted from each assembly module 202 to control module 302 via Data-H 406 and Data-L 408 data lines of bus 400.

In this embodiment, bus 400 may be a controlled area network (CAN) bus adopted by the International Organization of Standardization (ISO), for example, in ISO11898 and ISO11519 standards. According to the CAN bus standards, Data-H 406 and Data-L 408 may be CAN-H and CAN-L data lines, which transmit data signals by voltage differential therebetween. Power signals may be transmitted via VCC 402 and GND 404 according to the CAN bus standards as well. Data transmission and identifier (ID) allocation protocols applied by bus 400 may follow the CAN bus standards in general. It is to be appreciated that bus 400 is not limited to CAN bus and can be any suitable bus for transmitting power and data signals between assembly modules 202 that are electrically connected in parallel, such as but not limited to, USB, RS-485 bus, serial ATA (SATA) bus, low-voltage differential signaling (LVDS) bus, etc.

Figure 5:
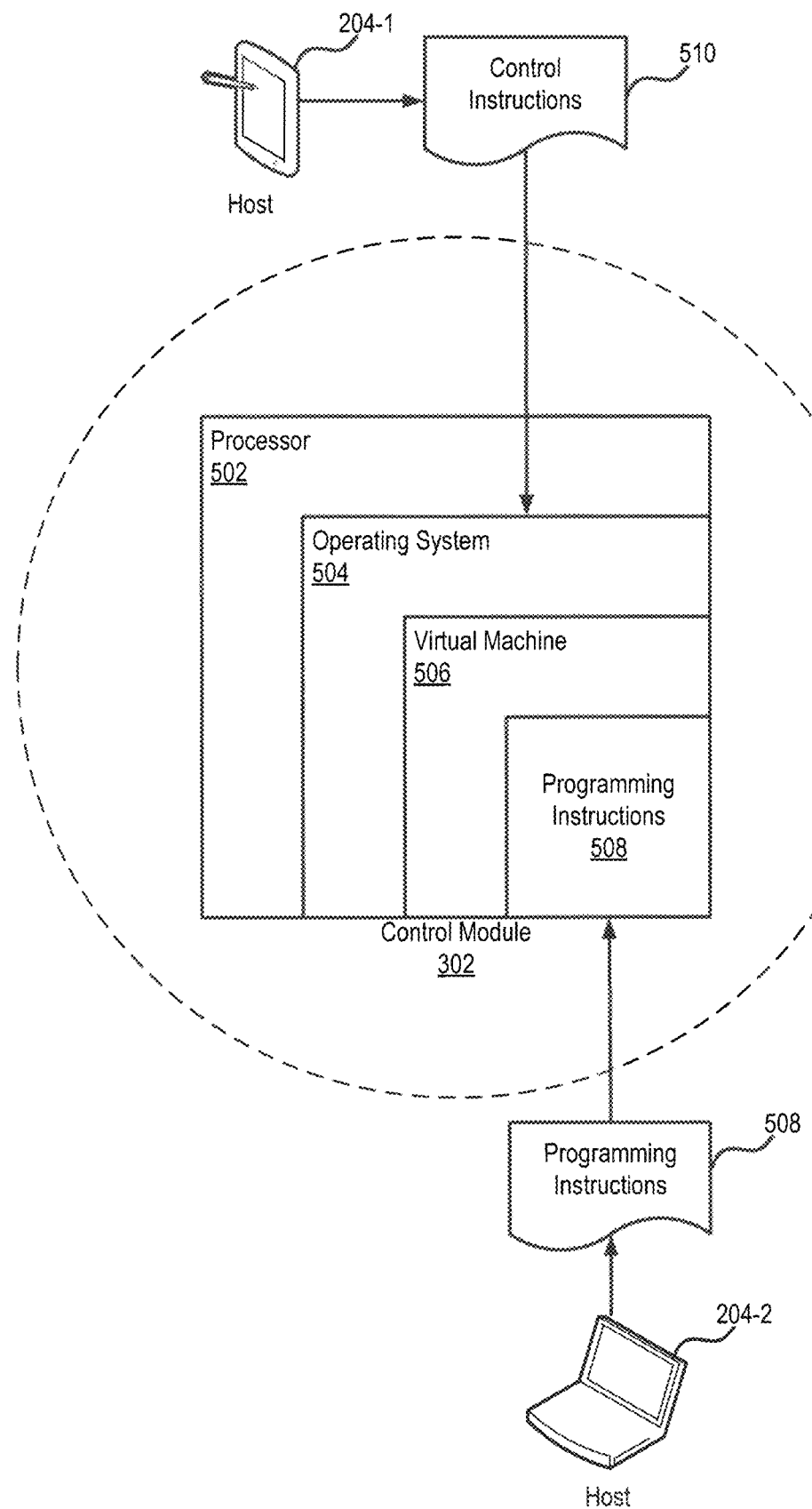
FIG. 5 is a depiction of an example of transmission of host instructions from hosts to a control module in accordance with an embodiment.

FIG. 5 is a depiction of an example of transmission of host instructions from hosts 204 to control module 302 in accordance with an embodiment. In this embodiment, control module 302 includes one or more processors 502 on which an operating system 504 can be implemented. Operating system 504 may be any suitable operating system such as embedded operating systems or real-time operating systems (RTOS), e.g., embedded Linux, iOS, NetBSD, Inferno, OpenWrt, Windows Embedded, etc. In this embodiment, a virtual machine 506 may run on operating system 504, such as Java virtual machine (JVM), Android Runtime (ART), Lua virtual machine, to name a few. Virtual machine 506 can provide the ability to execute programming instructions 508 in a platform-independent environment.

In this embodiment, a programming application may run on host 204-2. Programming instructions 508 generated by the programming application, either via an integrated programming environment (IDE) or by manual editing on host 204-2, may be transmitted from host 204-2 to virtual machine 506 of control module 302 directly. For example, programming instructions 508 may be Lua scripts. In addition to programming instructions 508, host instructions in this embodiment may also include control instructions 510 that are generated by a control application running on host 204-1 at runtime. Control instructions 510 may be transmitted from host 204-1 to operating system 504 directly, e.g., using Bluetooth low energy (BLE, a.k.a. Bluetooth Smart) technologies. In this embodiment, when virtual machine 506 is not executing any programming instructions 508 received from host 204-2, operating system 504 may generate operation instructions to control operations of corresponding assembly modules 202 based on control instructions 510 received from host 204-1 at runtime. When virtual machine 506 is executing programming instructions 508, e.g., Lua scripts, operating system 504 may handle control instructions 510 and control privilege to virtual machine 506. In this case, operating system 504 may work as an interface between virtual machine 506 and any other parts of the modular assembly robotic toy, e.g., assembly modules 202 and hosts 204, while virtual machine 506 is taking control of executing programming instructions 508 and control instructions 510.

Figure 6:
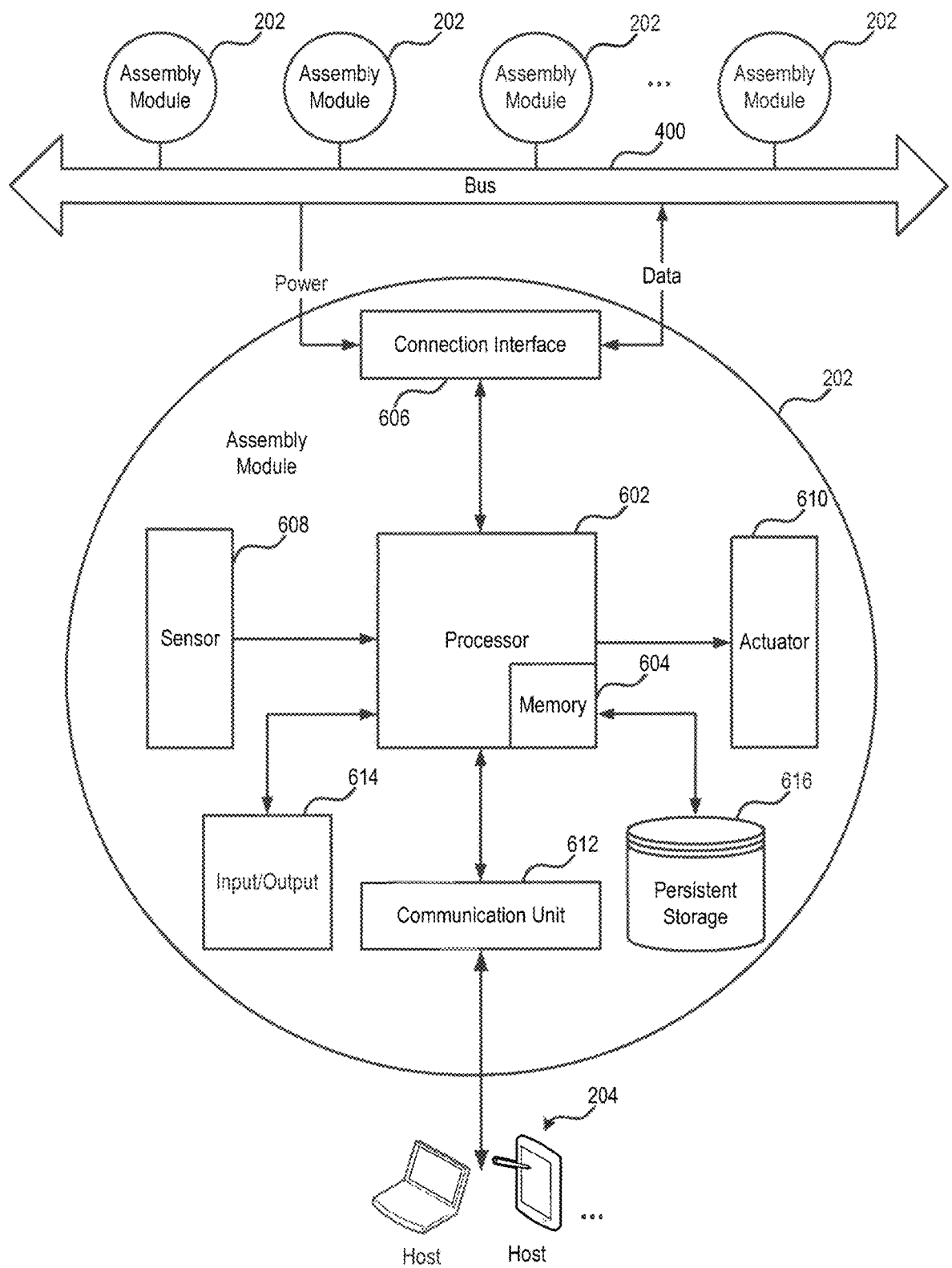
FIG. 6 is a block diagram illustrating an example of an assembly module in accordance with an embodiment.

FIG. 6 is a block diagram illustrating an example of an assembly module 202 in accordance with an embodiment. In this embodiment, assembly module 202 includes a processor 602, a memory 604, one or more connection interfaces 606, one or more sensors 608, one or more actuators 610, a communication unit 612, input/output (I/O) 614, and a persistent storage 616. As shown in FIG. 6, processor 602 may be operatively coupled to memory 604, connection interfaces 606, sensors 608, actuators 610, communication unit 612, I/O 614, and persistent storage 616. Assembly module 202 may communicate with hosts 204 via communication unit 612 and communicate with any other assembly modules 202 electrically connected to bus 400 via connection interfaces 606.

In this embodiment, processor 602 may include one or more processing units such as microcontroller units (MCUs), microprocessors, graphical processing units (GPUs), memory controllers, etc. Memory 604 may be any program memory (e.g., RAM, flash) or read-only memory (ROM) that is integrated with MCUs in a single integrated circuit or separate from the processing units. Processor 602 may control operations of each component of assembly module 202 by executing instructions stored in memory 604. In this embodiment, each connection interface 606 may receive power signals from bus 400 and transmit and receive data signals via bus 400 in accordance with the instructions from processor 602. Processor 602 may further receive data signals from connection interface 606 and transmit data signals to bus 400 via connection interface 606. Power signals may be transmitted via connection interface 606 to processor 602 to supply power. In some embodiments, power signals may be transmitted via connection interface 606 to other components of assembly module 202 to supply power. In this embodiment, communication unit 612 may be any wired or wireless communication unit, such as USB, IEEE 1394, Thunderbolt, WiFi, Bluetooth, ZigBee, or NFC units that can communicate with the corresponding types of communication units of hosts 204. As described above, host instructions transmitted from hosts 204 may be received by communication unit 612 and forwarded to processor 602. In some embodiments, communication unit 612 may include a modem or any network adaptors for communicating with server 206 via the Internet 208 or any other networks as described above. Data received from server 206 may be forwarded to processor 602 as well by communication unit 612.

In this embodiment, sensors 608 may include any types of sensors such as light sensors, motion sensors, temperature sensors, sound sensors, electrical sensors, magnetic sensors, chemical sensors, biosensors, to name a few. Regardless of the specific type, sensors 608 can obtain sensor signals and transmit the sensor signals to processor 602. Processor 602 may either analyzes the sensor signals and then transmits the analyzing results to hosts 204 via bus 400 or transmits the raw sensor signals directly to hosts 204 via communication unit 612. In this embodiment, actuators 610 may include any types of actuators, such as hydraulic actuators, pneumatic actuators, electric actuators, thermal actuators, magnetic actuators, mechanical actuators, to name a few. Regardless of the specific type, actuators 610 may perform physical actions according to the instructions provided by processor 602 (and power signals provided via bus 400 and connection interface 606 in some cases).

In this embodiment, I/O 614 may include any suitable I/O devices, such as display screens, lights, keypads, buttons, etc. Users of a modular assembly robotic toy may interact with assembly module 202 directly via I/O 614. For example, status information (e.g., power level, operating status) of assembly module 202 or the entire modular assembly robotic toy may be presented via the display screen or the lights. Users may interrupt operation of assembly module 202 using the keypads or buttons. In this embodiment, persistent storage 616 may be any data storage device that retains data after assembly module 202 being powered-off, such as hard disk drivers and solid-state drivers (e.g., flash drivers). Data stored in persistent storage 616 may be communicated with memory 604, such as programming instructions (e.g., source code or intermediate codes of demo programs), operation logs, usage data backup, firmware, etc. It is to be appreciated that additional components may be included in assembly module 202 as well in some embodiments. It is also to be appreciated that depending on the specific type of assembly module 202, certain components illustrated in FIG. 6 may not be necessary as described below with respect to FIGS. 7-11.

Figure 7:
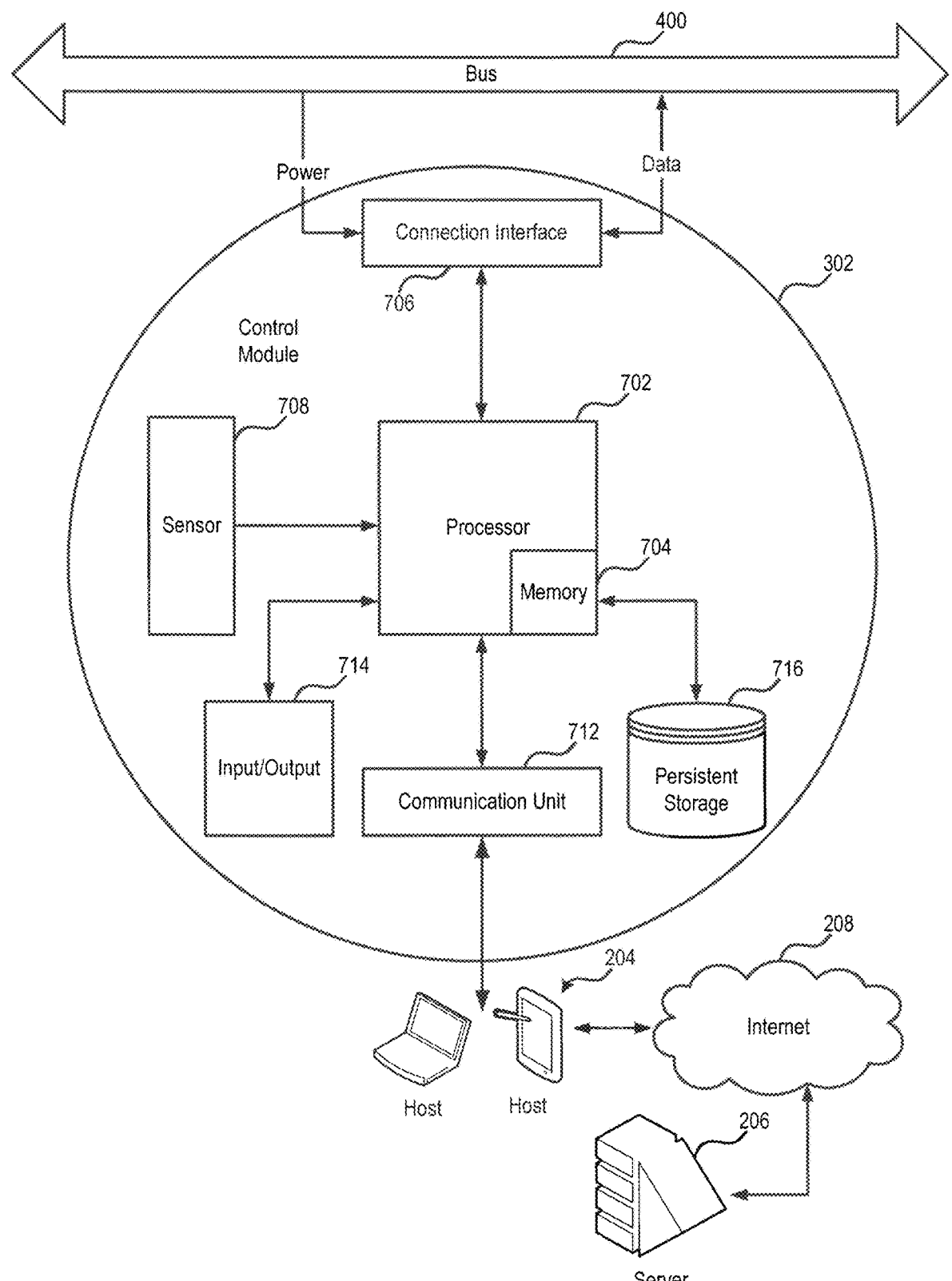
FIG. 7 is a block diagram illustrating an example of a control module in accordance with an embodiment.

FIG. 7 is a block diagram illustrating an example of a control module 302 in accordance with an embodiment. Control module 302 in this embodiment includes a processor 702, a memory 704, one or more connection interfaces 706, one or more sensors 708, a communication unit 712, I/O 714, and a persistent storage 716. As shown in FIG. 7, processor 702 may be operatively coupled to memory 704, connection interfaces 706, sensors 708, communication unit 712, I/O 714, and persistent storage 716. Each component in FIG. 7 may perform the same functions of corresponding component described above with respect to FIG. 6 and will not be repeated again in this embodiment. Additional or alternative features of some components in control module 302 will be described below in detail. For example, in some embodiments, persistent storage 716 may store programming instructions (e.g., source code or intermediate codes of demo programs) and operation logs and usage data backup of not only control module 302, but also other assembly modules 202 of the modular assembly robotic toy. In some embodiments, sensors 708 may include inertial sensors, such as gyroscopes and accelerometers.

In addition to controlling operations of components in control module 302, processor 702 of control module 302 may control operations of any other assembly modules 202 of the modular assembly robotic toy. As shown in FIG. 7, host instructions may be provided by hosts 204 to processor 702 via communication unit 712. As described above, programming instructions may be received prior to control module 302 is on operation and then executed by virtual machine 506 running on operating system 504 implemented on processor 702; control instructions, on the other hand, may be received at runtime when control module 302 is on operation and executed by operating system 504 directly. Based on the received host instructions, processor 702 may generate operation instructions for controlling each assembly module 202 via bus 400 and connection interface 706. Processor 702 may transmit operation instructions, as parts of data signals, to corresponding assembly modules 202 via connection interface 706 and bus 400. Moreover, processor 702 may communicate with assembly modules 202 via connection interface 706 and bus 400 to detect and configure any newly-added assembly modules. In some embodiments, the updated firmware may be provided by server 206 to hosts 204 via the Internet and then downloaded to memory 704 and/or persistent storage 716 via communication unit 712.

On the other hand, module data (e.g., sensor signals or status information) received from other assembly modules 202 or control module 302 itself may be transmitted by control module 302 to hosts 204 via communication unit 712 as well. In some embodiments, communication unit 712 may communicate with server 206 via the Internet or any other networks directly without passing through hosts 204.

In this embodiment, I/O 714 may further include a physical switch configured to, in response to an input from a user, interrupt or resume the obtaining of at least some of the host instructions from hosts 204 or the generation of the operation instructions by processor 702. In other words, execution of host instructions by processor 702 may be partially controlled by physical operation of the user via control module 302. For example, the physical switch may trigger processor 702 to execute the host instructions, for example, programming instructions (e.g., Lua scripts) by virtual machine 506. In some embodiments, control module 302 may further include a power switch for turning on and off control module 302 and/or the modular assembly robotic toy. The power switch may be different from the physical switch described above, which is used for controlling execution of host instructions by processor 702.

Figure 8:
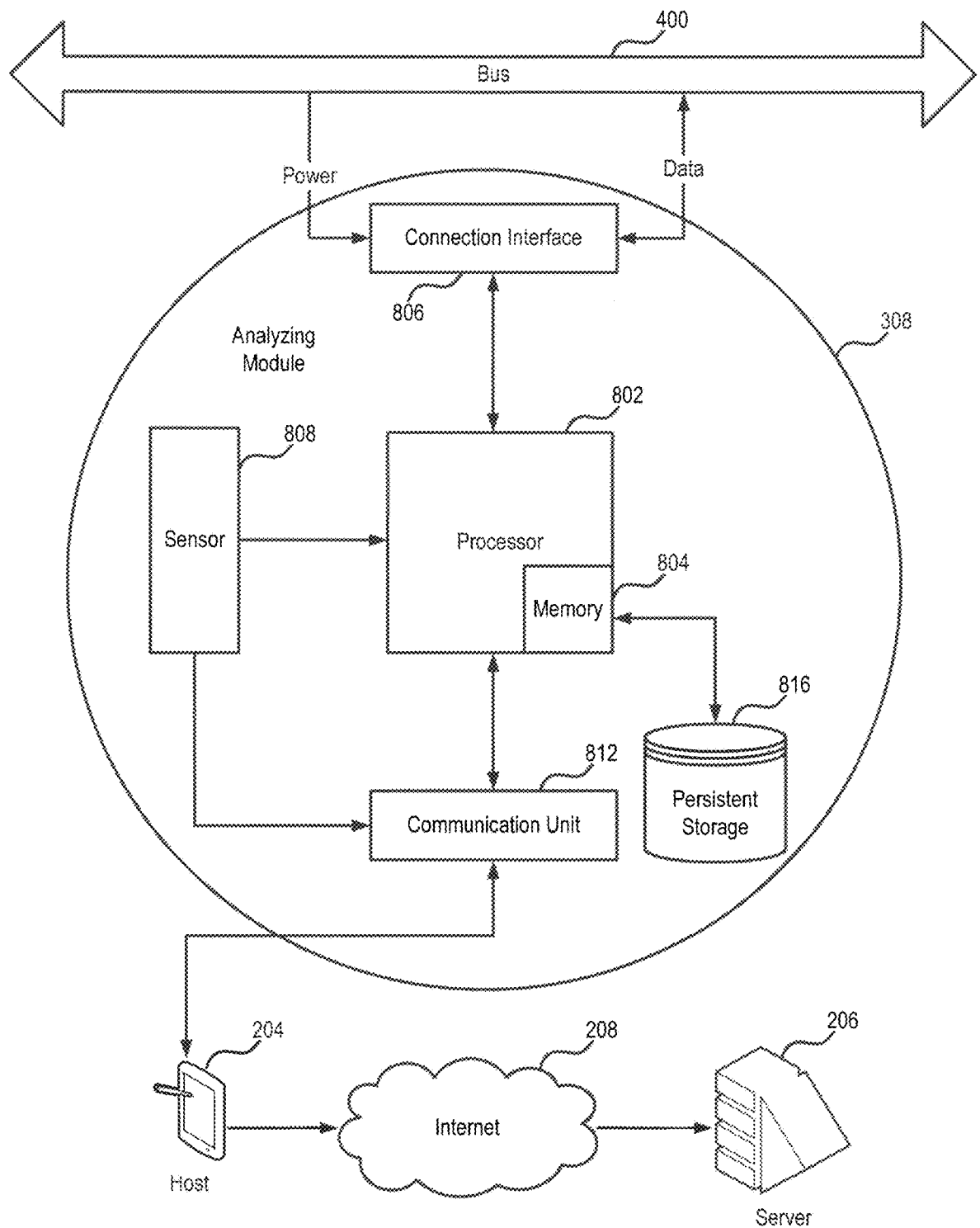
FIG. 8 is a block diagram illustrating an example of an analyzing module in accordance with an embodiment.

FIG. 8 is a block diagram illustrating an example of an analyzing module 308 in accordance with an embodiment. Analyzing module 308 in this embodiment includes a processor 802, a memory 804, one or more connection interfaces 806, one or more sensors 808, a communication unit 812, and a persistent storage 816. As shown in FIG. 8, processor 802 may be operatively coupled to memory 804, connection interfaces 806, sensors 808, communication unit 812, and persistent storage 816. Each component in FIG. 8 may perform the same functions of corresponding component described above with respect to FIG. 6 and will not be repeated again in this embodiment. Additional or alternative features of some components in analyzing module 308 will be described below in detail. For example, in some embodiments, persistent storage 816 may further store sensors signals obtained by sensors 808 and analyzing results of the signal signals generated by processor 802.

In addition to controlling operations of components in analyzing module 308, processor 802 of analyzing module 308 may be configured to analyze the sensor signals obtained by sensors 808 to generate analyzing results. In one example, analyzing module 308 may be voice recognition module 324, and sensors 808 may include a microphone or any sound sensors configured to obtain a voice signal. Processor 802 then may analyze the voice signal to generate a voice recognition result by implementing any suitable voice or speech recognition engines. In another example, analyzing module 308 may be image recognition module 326, and sensors 808 may include a camera or any image sensors configured to obtain an image signal. Processor 802 then may analyze the image signal to generate an image recognition result by implementing any suitable image or video recognition engines. In some embodiments, the recognition engines may be stored in persistent storage 816 and read into memory 804 at runtime for analyzing the corresponding sensor signals by processor 802. It is to be appreciated that analyzing module 308 can be of other types by including suitable types of sensors 808 and implementing suitable analyzing engines by processor 802.

In this embodiment, the sensor signals obtained by sensors 808 and/or the analyzing results generated by processor 802 may be transmitted to host 204 via communication unit 812 without passing through control module 302. Host 204 after receiving the sensor signals or the analyzing results, may further process the sensor signals or the analyzing results to generate further analyzing results because host 204 may have a superior computation capability than analyzing module 308 for performing more complex analysis. In some embodiments, host 204 may transmit the sensor signals or the analyzing results to server 206 via the Internet 208 or any other networks so that more powerful processors and/or analyzing engines on server 206 can perform even more complex analysis of the sensor signals or the analyzing results. In some embodiments, communication unit 812 may include a modem or any suitable network adaptors for transmitting the sensor signals or the analyzing results to server 206 directly without passing through host 204.

Based on the analyzing results from analyzing module 308, host 204, and/or server 206, host 204 may generate operation instructions and provide the operation instructions to processor 802 via communication unit 812. In some embodiments, the generated operation instructions may be provided by host 204 to control module 302 as a part of host instructions, and control module 302 then may transmit the operation instructions to analyzing module 308 or other assembly module 202 via bus 400. In one example, for voice recognition module 324, voice commands from a user to control the operations of the modular assembly robotic toy may be recognized and understood by host 204 in conjunction with voice recognition module 324 and/or server 206 and applied to corresponding assembly modules 202. In another example, for image recognition module 326, a target on the video taken by the camera of image recognition module 326 may be recognized and tracked by host 204 in conjunction with image recognition module 326 and/or server 206 so that host 204 can instruct corresponding actuator modules 306 to follow the moving path of the target and instruct image recognition module 326 to keep tracking of the target.

In this embodiment, analyzing module 308 may be considered as a "smart" module because analyzing module 308 can independently perform sensor signal analysis tasks and/or independently communicate the analyzing results with host 204 or server 206 without the intervention of control module 302. In some embodiments, analyzing module 308 may determine whether to analyze the obtained sensor signals by processor 802 or transmit the sensor signals to hosts 204 and/or server 206 for analysis. In one example, processor 802 may make the determination based on the complexity of the analysis tasks and perform relatively simple analysis tasks and handle over the relatively complex analysis tasks to hosts 204 and/or server 206. In another example, processor 802 may make the determination based on whether the communication unit 812 is capable of communicating with hosts 204 and/or server 206. For example, if the communication connection is established, then the analysis tasks may be handled over to hosts 204 and/or server 206. Otherwise, analyzing module 308 may perform the analysis tasks locally by processor 802. It is to be appreciated that pre-processing may be performed on the obtained raw sensor signals by processor 802 even when the analysis tasks are to be performed by hosts 204 and/or server 206.

Figure 9:
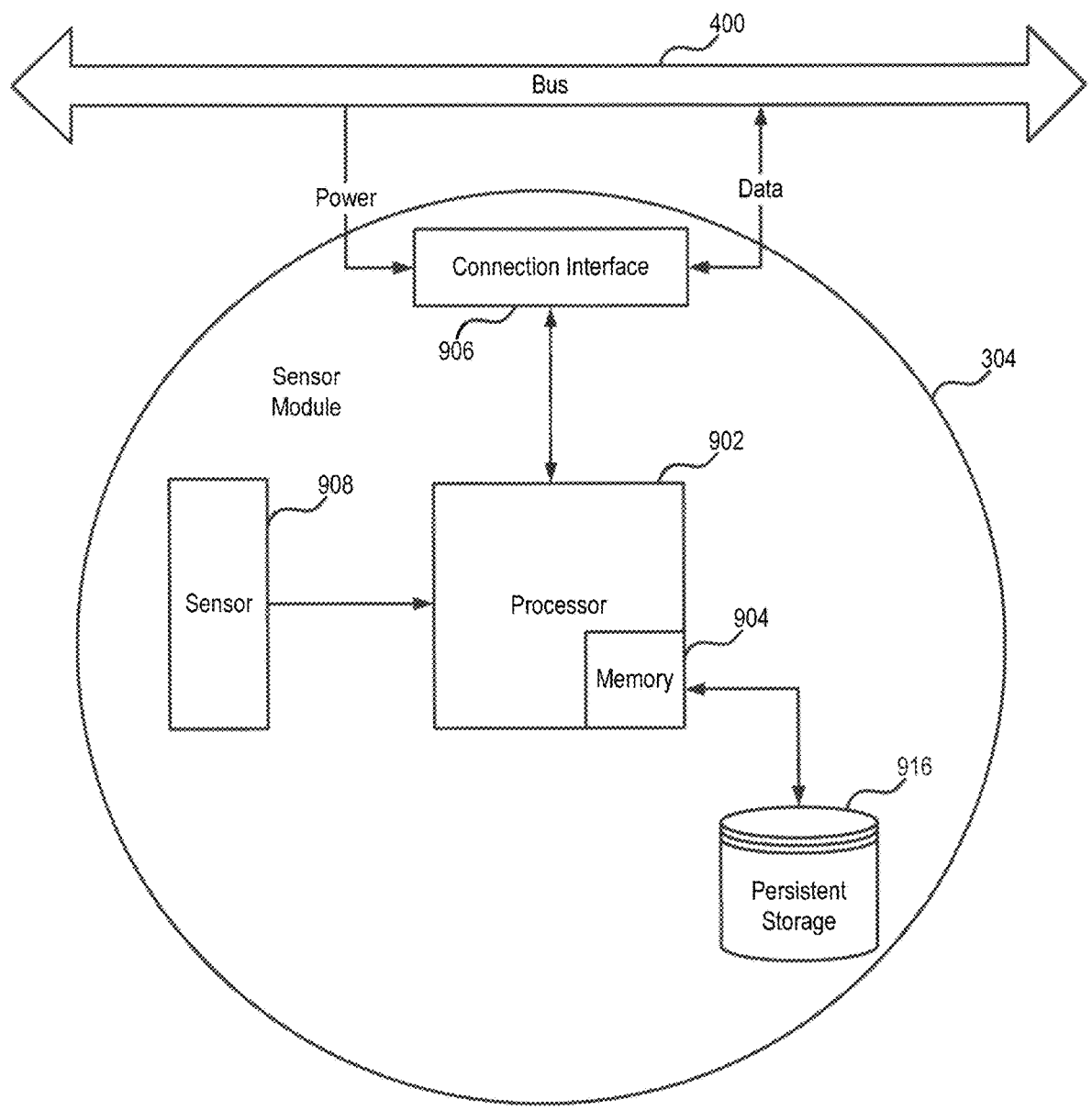
FIG. 9 is a block diagram illustrating an example of a sensor module in accordance with an embodiment.

FIG. 9 is a block diagram illustrating an example of sensor module 304 in accordance with an embodiment. Sensor module 304 in this embodiment includes a processor 902, a memory 904, one or more connection interfaces 906, one or more sensors 908, and a persistent storage 916. As shown in FIG. 9, processor 902 may be operatively coupled to memory 904, connection interfaces 906, sensors 908, and persistent storage 916. Each component in FIG. 9 may perform the same functions of corresponding component described above with respect to FIG. 6 and will not be repeated again in this embodiment. Additional or alternative features of some components in sensor module 304 will be described below in detail. For example, in some embodiments, persistent storage 916 may further store sensors signals obtained by sensors 908.

In one example, sensor module 304 may be infrared sensor module 314, and sensors 908 may include an infrared sensor. In some embodiments, the infrared sensor may include an infrared transmitter configured to emit a first infrared beam to an object and an infrared receiver configured to obtain a second infrared beam reflected from the object. Sensor signals may be obtained by infrared sensor module 314 based on the first and/or second infrared beams. In some embodiments, the infrared transmitter may be a light emitting diode (LED) that can produce light in the infrared spectrum, and the infrared receiver can detect the presence, motion, or brightness of the object based on the intensity of the second beam. In some embodiments, the infrared sensor may be a passive infrared sensor (PIR) that measures infrared light radiating from objects in its field of view, which can be used for detecting the presence or motion of the objects. In this embodiment, processor 902 may control operation of the infrared sensor based on operation instructions received from control module 302 via bus 400. For example, processor 902 may control the infrared sensor to work in the active mode (reflection mode) or in the passive mode. In the active mode, processor 902 may further control the infrared sensor to repeatedly emit the infrared beam or emit a single infrared beam.

In another example, sensor module 304 may be a color recognition module 316, and sensors 908 may include a light sensor configured to obtain a light signal from an object. The light sensor may be any suitable sensor that can detect the current ambient light level (e.g., RGB level and light intensity level), such as photoresistors, photodiodes, and phototransistors. Additional optical and electrical components may be included in the light sensor, such as color filters, input multiplexor, and light sources (e.g., RGB LEDs). In some embodiments, light signals obtained by the light sensor may be provided to processor 902 to determine the color of the object based on the light signals. In this embodiment, processor 902 may also control operation of the light sensor based on operation instructions received from control module 302 via bus 400. For example, processor 902 may control the light sensor to work in the ambient light intensity detection mode or in the R, G. or B color detection mode. Processor 902 may further control the light sources to repeatedly emit a light beam in a desired color or emit a single light beam in a desired color.

In this embodiment, the sensor signals, e.g., infrared signals, ambient light intensity signals, or RGB signals, may be formatted by processor 902 according to the data transmission and ID allocation protocols of bus 400 and packed into messages with IDs. The messages may be transmitted to control module 302 from processor 902 via bus 400. In some embodiments, data related to sensor signals may be stored in persistent storage 916 as backups. It is to be appreciated that sensor module 304 can be of any other types by including suitable types of sensors 908.

Figure 10:
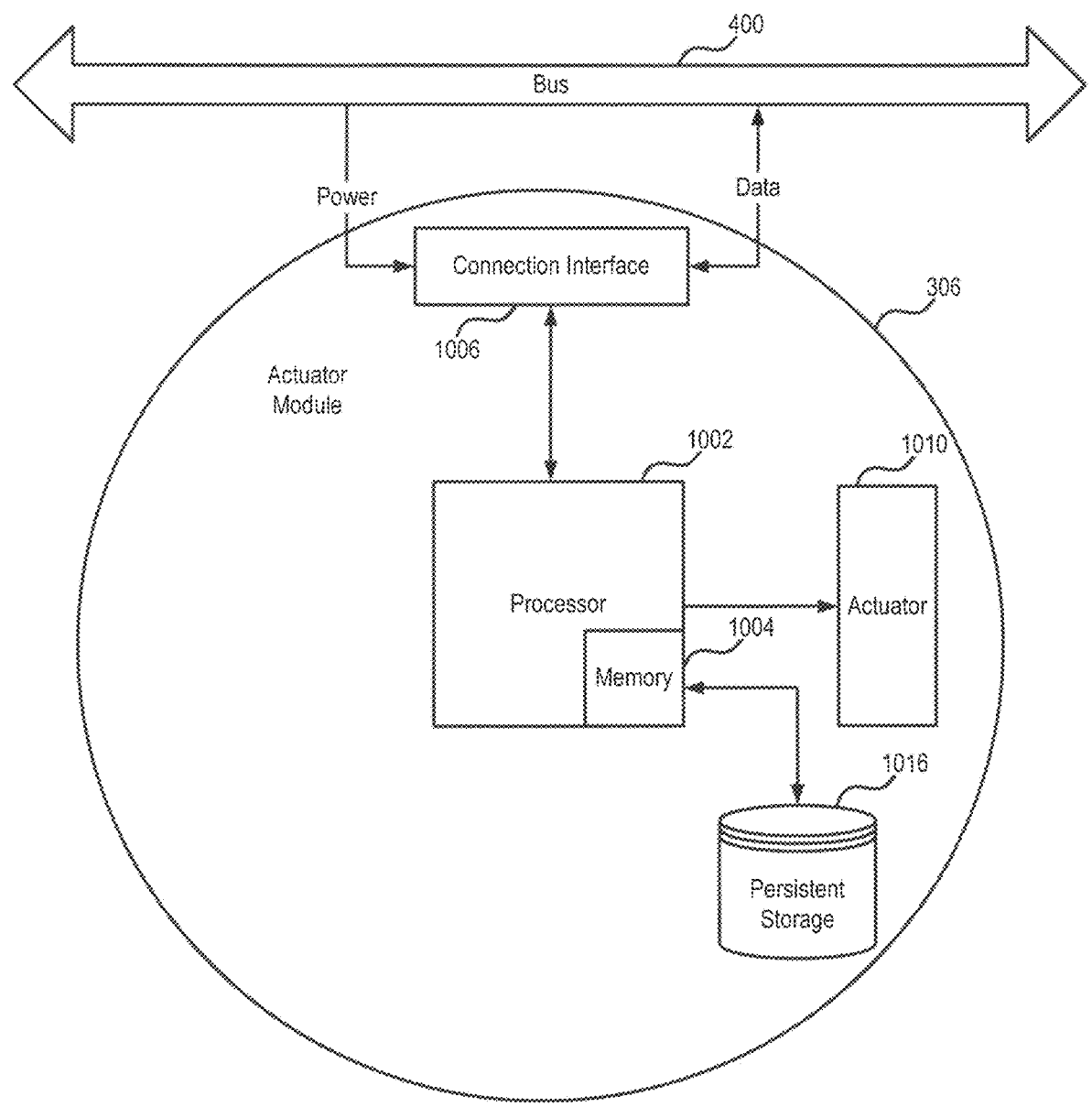
FIG. 10 is a block diagram illustrating an example of an actuator module in accordance with an embodiment.

FIG. 10 is a block diagram illustrating an example of actuator module 306 in accordance with an embodiment. Actuator module 306 in this embodiment includes a processor 1002, a memory 1004, one or more connection interfaces 1006, one or more actuators 1010, and a persistent storage 1016. As shown in FIG. 10, processor 1002 may be operatively coupled to memory 1004, connection interfaces 1006, actuators 1008, and persistent storage 1016. Each component in FIG. 10 may perform the same functions of corresponding component described above with respect to FIG. 6 and will not be repeated again in this embodiment. Additional or alternative features of some components in actuator module 306 will be described below in detail.

In one example, actuator module 306 may be movement module 318 that is substantially ball-shaped, and actuators 1010 may include a motor configured to rotate the entirety of movement module 318. For example, movement module 318 may be wheel module 106 illustrated in FIGS. 1A-1C, which includes a track around a great circle of sphere to increase the friction. The motor may be any electric motors, such as a servomotor, which can rotate the entirety of movement module 318 along an axis of rotation. In some embodiments, additional accessories may be attached to movement module 318, such as wheels or adaptors through which any physical structures can be plugged to the modular assembly robotic toy and rotate along with movement module 318. For example, in addition to moving the modular assembly robotic toy itself, movement module 318 can cause any piece of toys that is attached thereto via suitable adaptors to rotate as well. It is to be appreciated that the motor is not limited to a rotary motor for driving the angular movement of movement module 318. In some embodiments, the motor may be a linear motor for driving the linear movement of movement module 318. In this embodiment, processor 1002 may control operation of the motor based on operation instructions received from control module 302 via bus 400. For example, processor 1002 may control the movement speed, direction, duration, and break of movement module 318.

In another example, actuator module 306 may be a flight actuation module 320, and actuators 1010 may include a motor configured to drive a set of propellers. The motor may be any electric motors, such as a servomotor, which can rotate the set of propellers along an axis of rotation and thus, cause the modular assembly robotic toy to fly in the air. In this embodiment, processor 1002 may control operation of the motor based on operation instructions received from control module 302 via bus 400. For example, processor 1002 may control the flight speed, direction, altitude, pose, duration, and break of flight actuation module 320. In some embodiments, sensors 708 of control module 302 may obtain sensor signals indicative of attitude of the modular assembly robotic toy in the air at runtime, and processor 702 of control module 302 may generate operation instructions for flight actuation module 320 based on the sensor signals to adjust the flight attitude. It is to be appreciated that flight actuation module 320 may be turned into a water actuation module by driving a suitable set of propellers in the water.

In still another example, actuator module 306 may be a joint module 322, and actuators 1010 may include a steering gear configured to rotate joint module 322 from 0 to 180 degrees in the radial direction (e.g., as a radial joint module) or rotate joint module 322 from −90 to +90 degrees in the axial direction (e.g., as an axial joint module). In this embodiment, processor 1002 may control operation of the steering gear based on operation instructions received from control module 302 via bus 400. For example, processor 1002 may control the rotation speed, direction, angle, duration, and break of joint module 322.

In this embodiment, the operation instructions for controlling actuators 1010 may be formatted by processor 702 of control module 302 according to the data transmission and ID allocation protocols of bus 400 and packed into messages with IDs. The messages may be transmitted from control module 302 to processor 1002 of actuator module 306 via bus 400. In some embodiments, data related to operation status of actuators 1010 may be collected by processor 1002 and transmitted to control module 302 in suitable message formats. It is to be appreciated that actuator module 306 can be of other types by including suitable types of actuators 1010.

Figure 11:
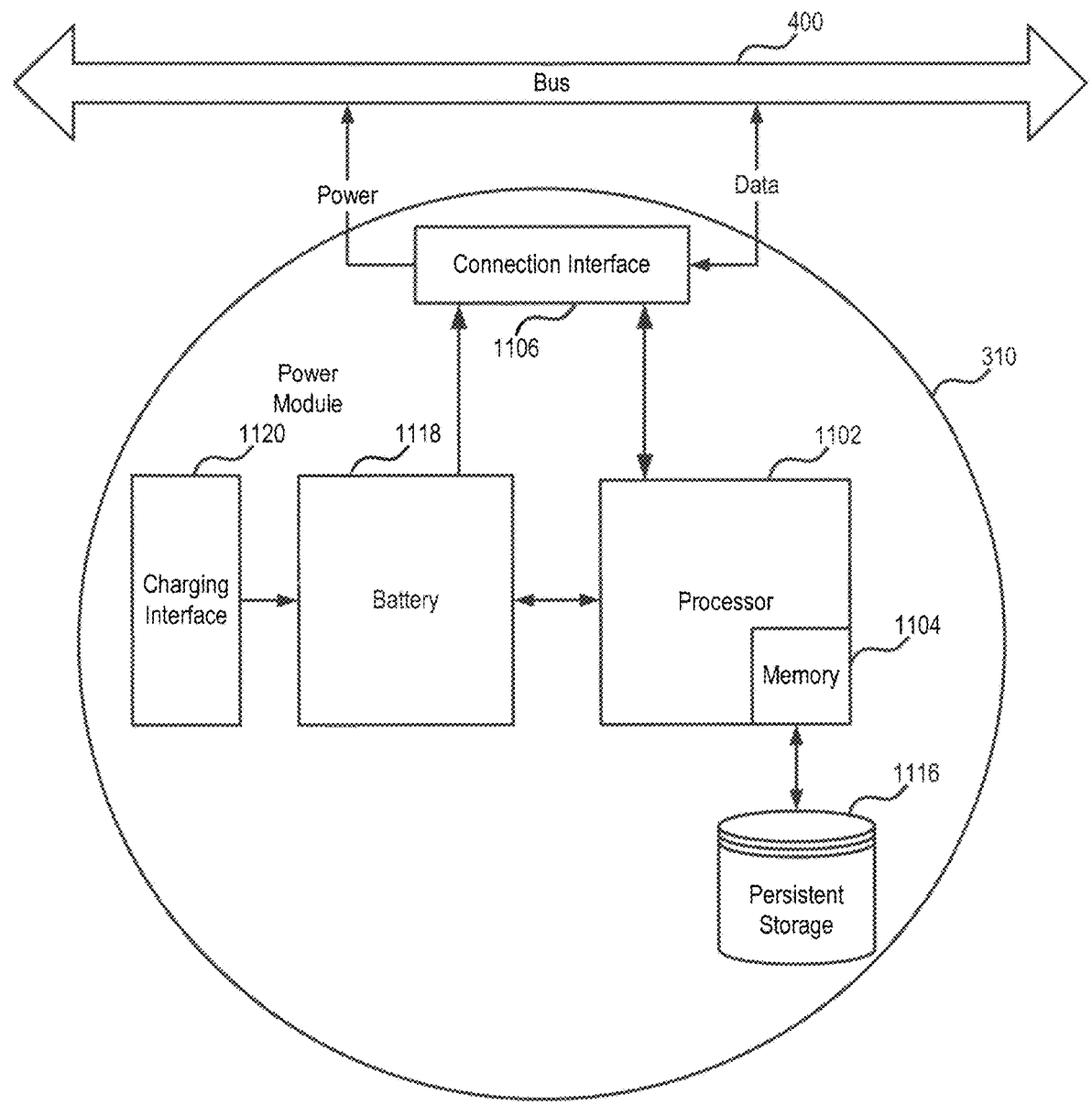
FIG. 11 is a block diagram illustrating an example of a power module in accordance with an embodiment.

FIG. 11 is a block diagram illustrating an example of a power module 310 in accordance with an embodiment. Power module 310 in this embodiment includes a processor 1102, a memory 1104, one or more connection interfaces 1106, a persistent storage 1116, a battery 1118, and a charging interface 1120. As shown in FIG. 11, processor 1102 may be operatively coupled to memory 1104, connection interfaces 1106, persistent storage 1116, and battery 1118. Each component in FIG. 11 may perform the same functions of corresponding component described above with respect to FIG. 6 and will not be repeated again in this embodiment. Additional or alternative features of some components in power module 310 will be described below in detail. For example, in some embodiments, persistent storage 1116 may further store battery-related information, e.g., battery health, charging condition, remaining lifetime, etc.

In this embodiment, battery 1118 may be any suitable batteries, including primary batteries such as lithium, alkaline, zinc, or magnesium batteries, and secondary (rechargeable batteries) such as lithium ion, NiCd, lead-acid, NiMH, NiZn, or AgZn batteries. In some embodiments, a number of batteries 1118 may form a battery pack. In this embodiment, operation of battery 1118, such as charging/discharging and maintenance, may be controlled by processor 1102 in conjunction with any suitable battery management circuit (not shown) based on operation instructions received from control module 302. The status of battery 1118, e.g., battery health, charging condition, and remaining lifetime, may be monitored by processor 1102 in conjunction with any suitable battery management circuit (not shown) as well. In some embodiments, power signals from battery 1118 may be provided to power module 310 and other assembly modules 202 via connection interface 1106 and bus 400.

In this embodiment, charging interface 1120 is operatively coupled to battery 1118 and may be any suitable interface/connector for charging battery 1118, including wired charging interfaces, such as USB or DC jack, and wireless (induction) charging interfaces, such as Magne Charge, Qi, Rezence, or Power Matters Alliance (PMA). It is to be appreciated that in some embodiments, power module 310 may include additional or alternative power supplies, such as solar panels, AC-to-DC supplies, AC adapters, and generators. In some embodiments, power module 310 may further include a power switch for a user to turn on and off the power of the modular assembly robotic toy and an indicator showing the current charging status and/or remaining power level of battery 1118. In this embodiment, operation of battery 1118 may be controlled by processor 1102 based on operation instructions received from control module 302 via bus 400.

Figure 12:
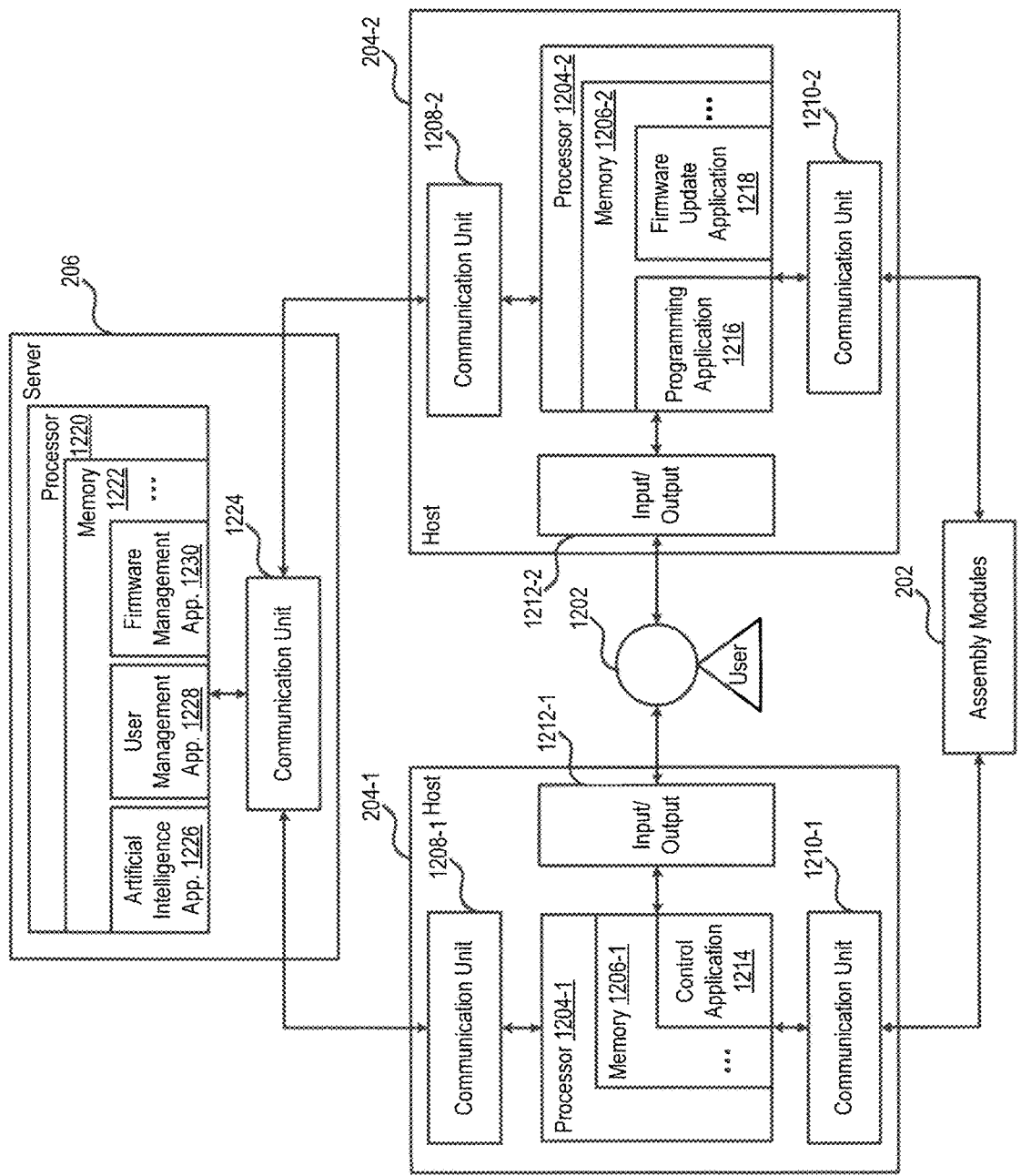
FIG. 12 is a block diagram illustrating an example of hosts and a server in accordance with an embodiment.

FIG. 12 is a block diagram illustrating an example of hosts 204 and a server 206 in accordance with an embodiment. In this embodiment, a user 1202 of a modular assembly robotic toy may assemble the modular assembly robotic toy using a number of assembly modules 202 and customize the functions and behaviors of the modular assembly robotic toy using hosts 204-1 and 204-2. In this embodiment, host 204-1 includes a processor 1204-1, a memory 1206-1, communication units 1208-1 and 1210-1, and I/O 1212-1. One or more applications, including a control application 1214, may be loaded into memory 1206-1 and executed by processor 1204-1. As will be described below in detail, a graphical user interface (GUI) of control application 1214 may be generated by processor 1204-1 and rendered on I/O 1212-1 (e.g., a display screen) for facilitating user 1202 to interact with control application 1214 via I/O 1212-1. In some embodiments, control application 1214 may receive input from user 1202 and generate a set of host instructions (e.g., control instructions) based on the user input at runtime when control module 302 is on operation. The set of host instructions may be transmitted to control module 302 via communication unit 1210-1. The user input may include, for example, a command received from the GUI rendered by host 204-1, a motion or gestured detected by one or more sensors on host 204-1, and a voice detected by a microphone on host 204-1. In other words, user 1202 can control the modular assembly robotic toy using control application 1214 through any suitable human-machine interfaces (HMIs).

Similarly, in this embodiment, host 204-2 includes a processor 1204-2, a memory 1206-2, communication units 1208-2 and 1210-2, and I/O 1212-2. Multiple applications, including a programming application 1216 and a firmware update application 1218, may be loaded into memory 1206-2 and executed by processor 1204-2. As will be described below in detail, a GUI of programming application 1216 may be generated by processor 1204-2 and rendered on I/O 1212-2 (e.g., a display screen) for facilitating user 1202 to interact with programming application 1216 via I/O 1212-2. In some embodiments, programming application 1216 may receive inputs from user 1202 and generate a set of host instructions (e.g., programming instructions) prior to control module 302 is on operation. The set of host instructions may be transmitted to control module 302 via communication unit 1210-2. The user inputs may include, for example, interactions with a graphical programming environment, e.g., programming by drag-and-drop of graphical representations of statement blocks. In some embodiments, user 1202 may select existing demo programs. In this embodiment, firmware update application 1218 may download firmware to be updated on control module 302 from server 206 via communication unit 1208-2, encrypt the firmware, and transmit the encrypted firmware to control module 302 via communication unit 1210-2. The firmware update status may be presented on the GUI of firmware update application 1218 to inform user 1202.

It is to be appreciated that additional or alternative applications may be loaded into memory 1206 and executed by processor 1204 of hosts 204 for various configuration, control, and maintenance functions with respect to the modular assembly robotic toy. In one example, an analyzing application may be implemented to analyze sensor signals obtained by sensor modules 304 or analyzing modules 308 to generate analyzing results, e.g., voice or image recognition results. In another example, an assembly module management application may be implemented to display a list of assembly modules 202 that are currently registered (e.g., have been plugged into the modular assembly robotic toy), a list of assembly modules 202 that are currently online (e.g., currently plugged into the modular assembly robotic toy and are on operation), and/or a list of assembly modules 202 that are currently offline (e.g., currently decoupled from the modular assembly robotic toy and are not on operation).

In this embodiment, communication units 1210 may communicate with assembly modules 202, e.g., control module 302, via wired or wireless communication, such as USB, WiFi, or Bluetooth. For example, control instructions may be transmitted by communication unit 1210-1 to control module 302 in real-time via Bluetooth, and programming instructions may be transmitted by communication unit 1210-2 to control module 302 via USB. Module data of assembly modules 202 may be received by communication unit 1210-1 via Bluetooth as well in real-time or received by communication unit 1210-2 via USB after the operation of control module 302 is completed. In this embodiment, communication units 1208 may communicate with remote server 206 via the Internet. For example, sensor signals, analyzing results of sensor signals, user information, or usage data may be transmitted to server 208 via the Internet by communication unit 1208. Further analyzing results of sensor signals, e.g., voice and image recognition results, updated firmware, user information, or usage data may be received from server 206 via the Internet by communication unit 1208.

In this embodiment, server 206 includes a processor 1220, a memory 1222, and a communication unit 1224. Multiple applications, including an artificial intelligence application 1226, a user management application 1228, and a firmware management application 1230, may be loaded into memory 1222 and executed by processor 1220. Server 206 may communicate with hosts 204 via the Internet or any other networks by communication unit 1224, which may be, for example, a modem or any suitable network adaptors.

In this embodiment, artificial intelligence application 1226 may implement any artificial intelligence algorithms, such as but not limited to, machine learning, natural language processing, search and optimization, logic programming and automated reasoning, probabilistic method, classifier and statistical learning method, neural network, and deep learning. As described above, artificial intelligence application 1226 may analyze the sensor signals or analyzing results of the sensor signals from hosts 204 and/or analyzing modules 308 using any suitable artificial intelligence approaches to generate analyzing results and provide the analyzing results to hosts 204 via communication unit 1224. For example, using any suitable artificial intelligence approach by artificial intelligence application 1226, voice or speech recognition may be performed on voice signals and image or video recognition may be performed on image signals.

In this embodiment, user management application 1228 may store and organize any information related to user 1202, for example, user profile, demographics, accounts, activities, preferences, and interests. In some embodiments, user management application 1228 may perform user authentication to verify whether user 1202 is authorized to assemble and customize the modular assembly robotic toy. In some embodiments, user management application 1228 may facilitate user 1202 to interact with other users of modular assembly robotic toys in a dedicated online community or any social media. For example, teachers may assist students to assemble and customize modular assembly robotic toys remotely via user management application 1228 on server 206. In this embodiment, firmware management application 1230 may obtain, store, and distribute firmware to be updated on control modules 302 of modular assembly robotic toys. Firmware may be dynamically or periodically updated to fix bugs, add new functions, and improve hardware performance. Firmware management application 1230 may organize firmware by versions (reflecting the recency of firmware) or categories (for different structures, forms, and functions of modular assembly robotic toys). In some embodiments, firmware updates may be notified and pushed to hosts 204 once they become available or periodically according to an update schedule.

Figure 13:
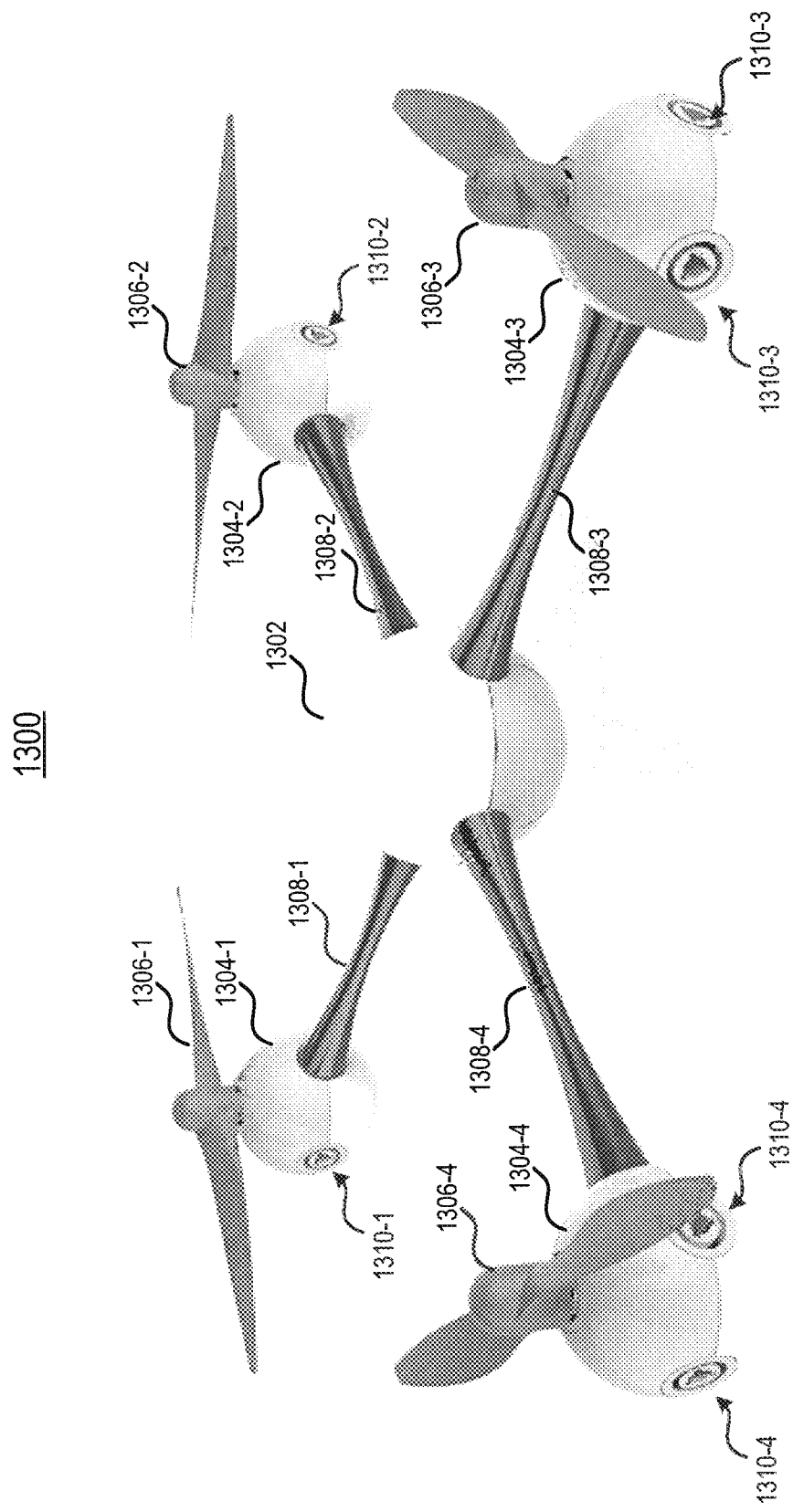
FIG. 13 is a perspective view of an example of a modular assembly unmanned aerial vehicle (UAV) robotic toy including multiple assembly modules and connectors in accordance with an embodiment.

FIG. 13 is a perspective view of an example of a modular assembly unmanned aerial vehicle (UAV) robotic toy 1300 including multiple assembly modules 1302, 1304, and 1306 and connectors 1308 in accordance with an embodiment. As described above, modular assembly robotic toys may be assembled and customized to achieve a wide variety of structures, forms, and functions, for example, modular assembly robotic toy 100 illustrated in FIGS. 1A-1C. As another example, modular assembly UAV robotic toy 1300 includes a control module 1302 and four flight actuation modules 1304-1, 1304-2, 1304-3, and 1304-4. Each flight actuation module 1304 may be electrically and mechanically connected to control module 1302 via a respective connector 1308 and connection interface 1310 of control module 1302. A set of propellers 1306 may be attached to each flight actuation module 1304 and driven by a motor in a respective flight actuation module 1304. Control module 1302 and each flight actuation module 1304 may include spare connection interfaces 1310 to be used to connect additional assembly modules, accessories, or any other physical structures. In one example, a payload may be attached to the bottom of control module 1302, for example, a gimbal, a camera, or an additional battery pack. In this embodiment, modular assembly UAV robotic toy 1300 may not include a separate power module. Instead, the power module may be integrated into control module 1302 and/or flight actuation modules 1304. In some embodiments, a separate power module may be plugged into modular assembly UAV robotic toy 1300.

Structures and functions of control module 1302 and flight actuation modules 1304 may be the same as control module 302 and flight actuation modules 320, respectively, as described above in detail. As to connectors 1308, although the shape is different from that of connectors 110 in order to adapt the aerodynamic shape of a UAV, each connector 1308 still includes two open ends adapted to fitting into connection interfaces 1310 of two assembly modules, respectively, and to mechanically and electrically connect the two assembly modules as described above with respect to connectors 110. It is to be appreciated that in some embodiments, different connectors may be used to mechanically and electrically connect two assembly modules of modular assembly UAV robotic toy 1300, e.g., control module 1302 and flight actuation module 1304. For example, one end of the connector may be integrated with an assembly module and thus, the connector includes one open end adapted to fitting into connection interface 1310 of the other assembly module. In other words, the connector may be part of an assembly module and can be attached to and detached from another assembly module, as opposed to a separate component that can be detached from both assembly modules. In some embodiments, the connector may be mechanically connected to connection interface 1310 via any suitable means, such as magnets.

Connection Structure

Figure 14A:
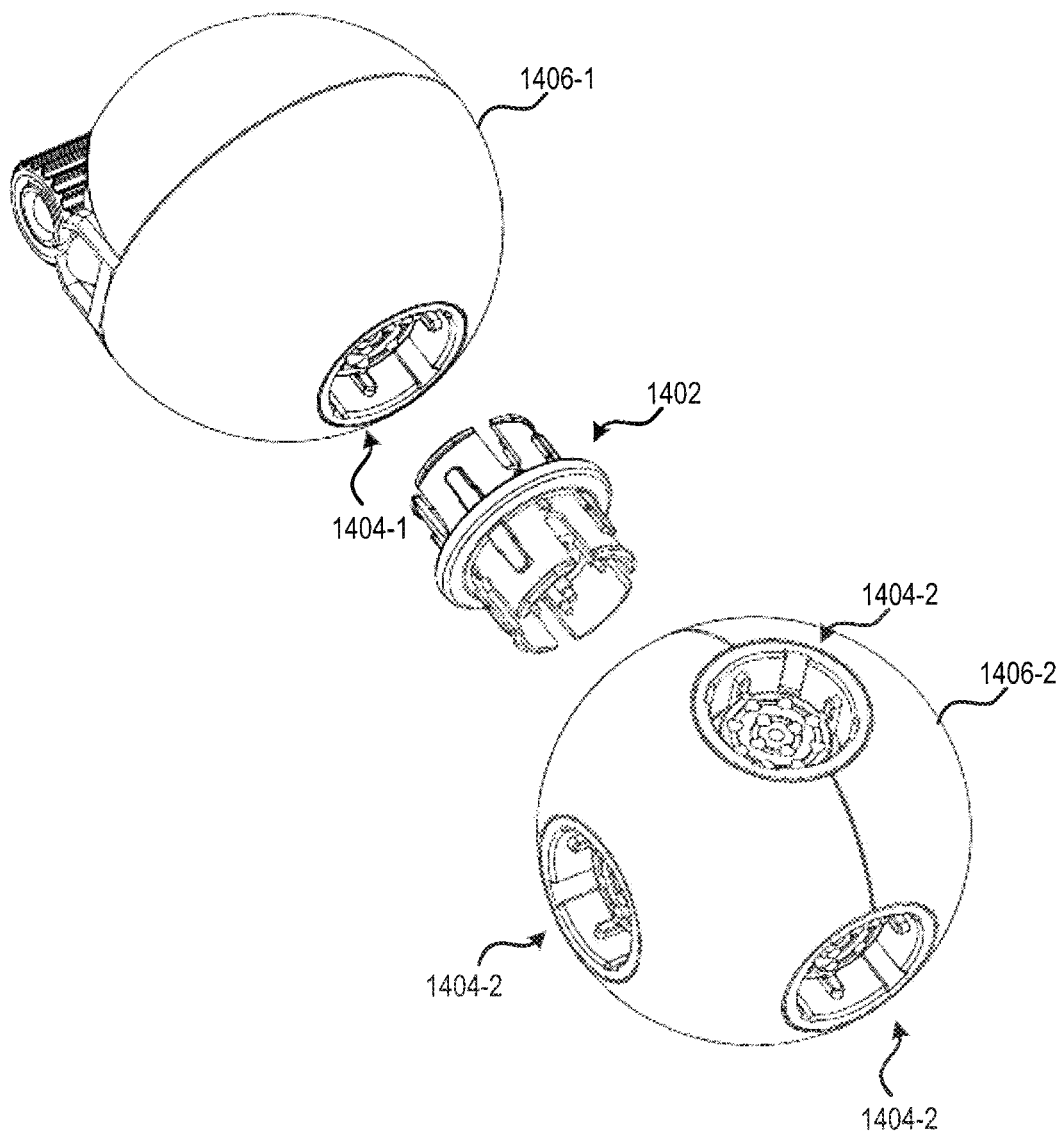
FIG. 14A-14B are perspective views of an example of a connection structure in accordance with an embodiment.
Figure 14B:
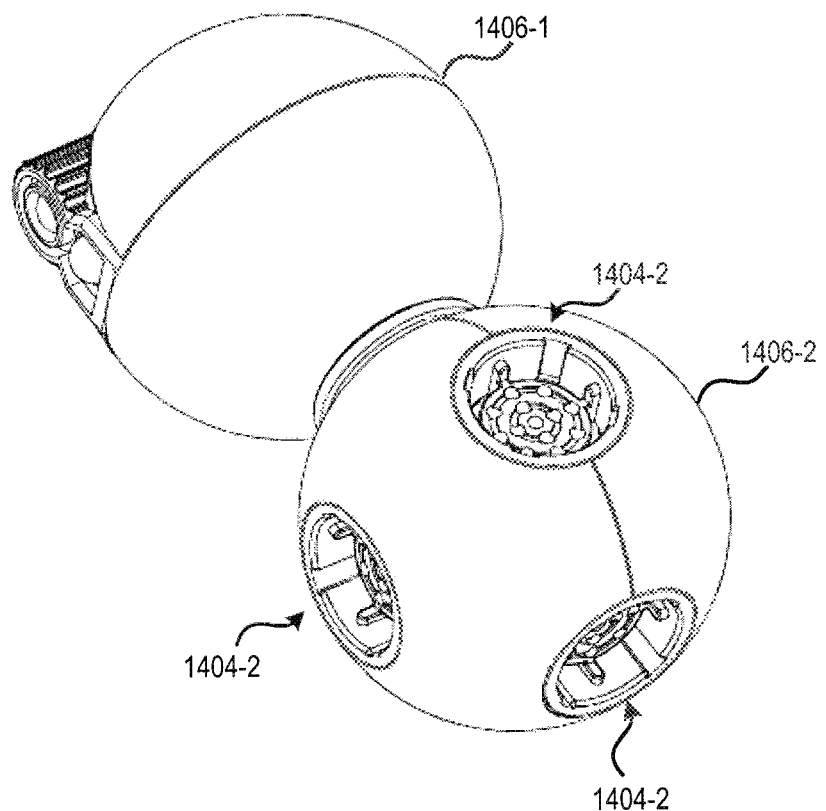

FIG. 14A-14B are perspective views of an example of a connection structure in accordance with an embodiment. In this embodiment, as shown in FIG. 14A, the connection structure includes a connector 1402, a first connection interface 1404-1 on a first assembly module 1406-1, and a second connection interface 1404-2 on a second assembly module 1406-2. Connector 1402 may be the same as connector 110 described above with respect to FIGS. 1A-1C, and each connection interface 1404 may be the same as connection interfaces described above with respect to FIGS.

1A-1C as well. As shown in FIG. 14A, connection interfaces 1404-1 and 1404-2 are parts of a color recognition module and a connector module, respectively. However, it is to be appreciated that connection interfaces 1404 can be parts of any assembly modules 202 described herein. As described above, the number of connection interfaces 1404 of an assembly module 202 is not limited. For example, first assembly module 1406-1, such as the color recognition module shown in FIG. 14A, may include a single connection interface 1404-1, while second assembly module 1406-2, such as the connector module shown in FIG. 14A, may include multiple connection interfaces 1404-2.

As shown in FIG. 14B, the two ends of connector 1402 are plugged into connection interfaces 1404-1 and 1404-2, respectively, so as to mechanically and electrically connect first and second assembly modules 1406-1 and 1406-2. As will be described below in detail, connector 1402 may be plugged into connection interfaces 1404-1 and 1404-2 at multiple orientations relative to one another. In some embodiments, connector 1402 may be plugged into connection interfaces 1404-1 and 1404-2 at any orientations relative to one another. Thus, a user may no longer need to align connector 1402 with each connection interface 1404 at a specific orientation to ensure mechanical and electrical connectivity. In this embodiment, spare connection interfaces 1404-2 on second assembly module 1406-2 may be used for connecting additional assembly modules to second assembly module 1406-2 via additional connectors 1402. In this embodiment, connector 1402 is detachable from each connection interface 1404 after being plugged into connection interfaces 1404-1 and 1404-2. The connection structure disclosed herein thus provides an easy way to assemble assembly modules 202 to build modular assembly robotic toys and dissemble the modular assembly robotic toys into separate assembly modules 202.

Figure 15:
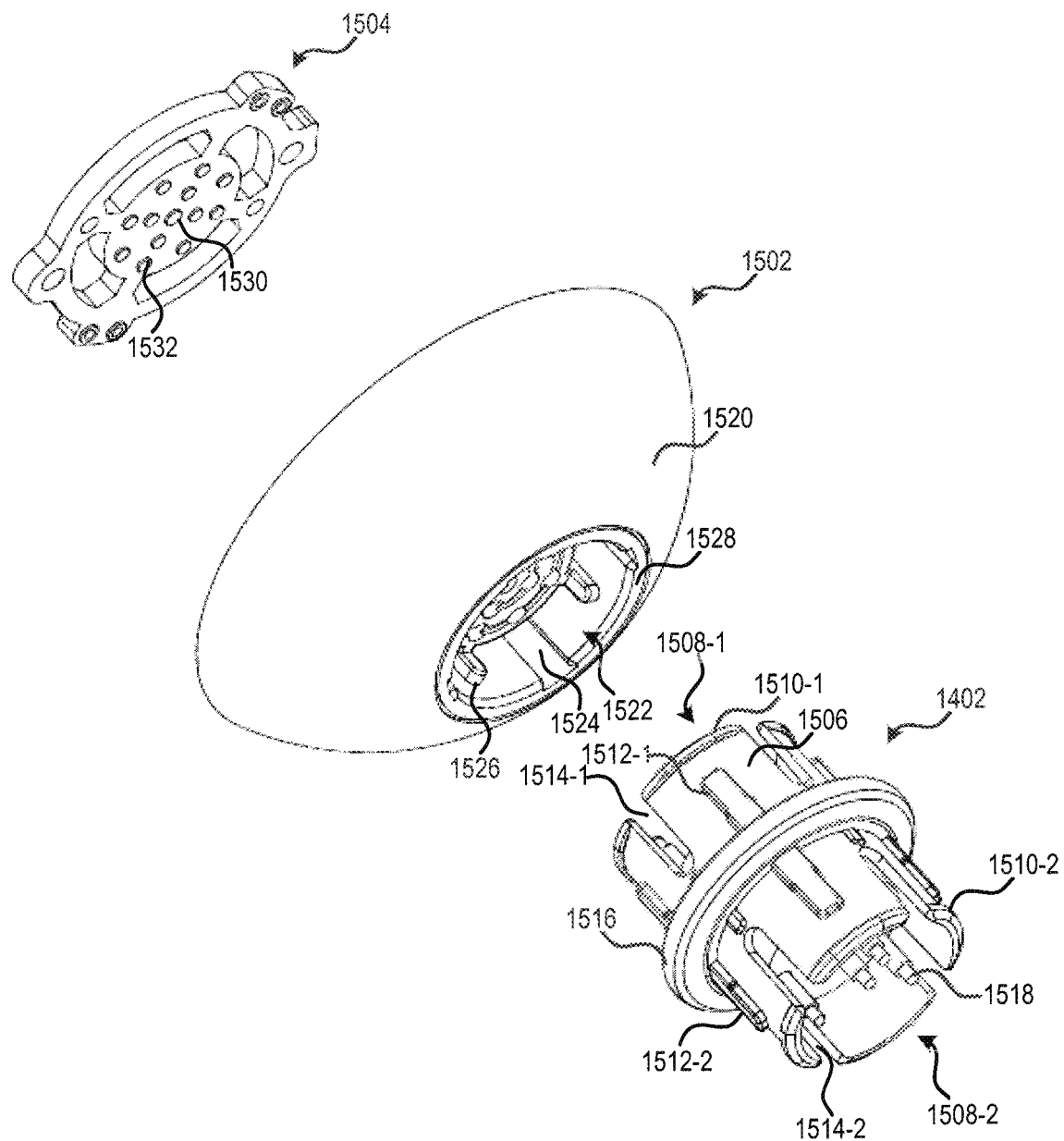
FIG. 15 is an exploded view of an example of a connection structure in accordance with an embodiment.

FIG. 15 is an exploded view of an example of a connection structure in accordance with an embodiment. In this embodiment, the connection structure includes connector 1402 and a connection interface having a casing 1502 and a circuit board 1504. It is to be appreciated that although one connection interface is illustrated in FIG. 15, another connection interface having the same structure as the connection interface shown in FIG. 15 can be part of the connection structure.

Figure 16A:
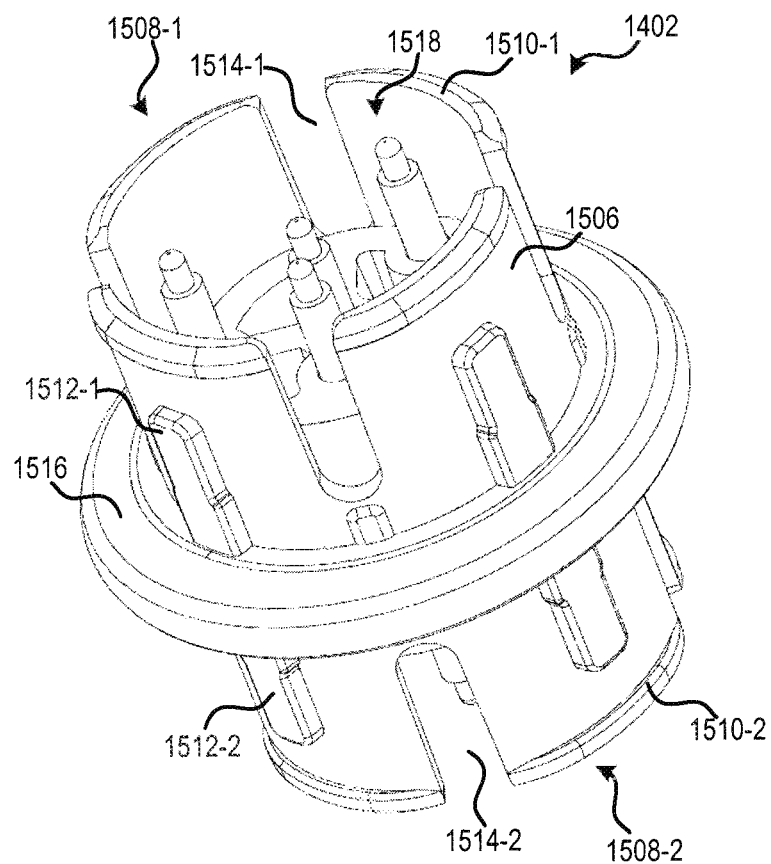
FIG. 16A is a perspective view of an example of a connector in accordance with an embodiment.

FIG. 16A is a perspective view of an example of connector 1402 in accordance with an embodiment. In this embodiment, connector 1402 includes a casing 1506 having two open ends 1508-1 and 1508-2, lock mechanisms including snaps 1510-1 and 1510-2, protrusions 1512-1 and 1512-2, and recesses 1514-1 and 1514-2, and a raised annular 1516. Each open end 1508 may be adapted to fitting into the connection interfaces 1404-1 and 1404-2. In this embodiment, casing 1506 is in a substantially cylindrical shape and includes two symmetric portions with respect to raised annular 1516. Casing 1506 may be made of any suitable materials, such as plastics. An inner space (not shown) is formed inside casing 1506 between two open ends 1508-1 and 1508-2. In this embodiment, connector 1402 further includes four pins 1518 arranged and fixed in the inner space of casing 1506.

Figure 16B:
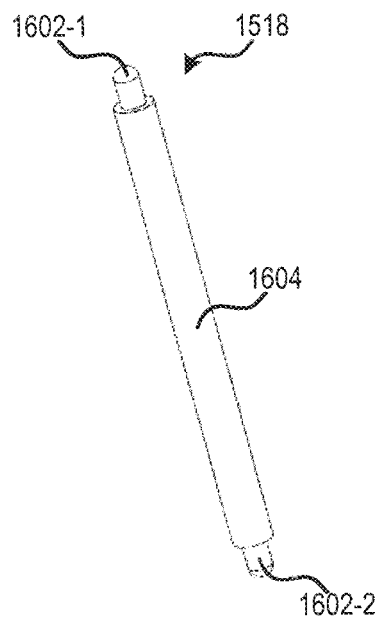
FIG. 16B is a perspective view of an example of a pin of the connector in FIG. 17A in accordance with an embodiment.

FIG. 16B is a perspective view of an example of pin 1518 of connector in FIG. 16A in accordance with an embodiment. In this embodiment, each pin 1518 includes two ends 1602-1 and 1602-2 and a body 1604. A spring (not shown) may be disposed in the inner space of body 1604 and connected between two ends 1602-1 and 1602-2. Each end 1602 of pin 1518 thus can move up and down because of the resilience of the spring. Each pin 1518, including ends 1602, body 1604, and spring, may be made of any suitable electrically conductive materials, such as copper or aluminum. Once each end 1602 of pin 1518 is in contact with a surface, e.g., a contact, end 1602 is pressed toward the surface by the spring to maintain reliable electrical connectivity. Two ends 1602-1 and 1602-1 of pin 1518 are exposed by open ends 1508-1 and 1508-2 of casing 1506, respectively. Each pin 1518 is in parallel with one another and in parallel with the central axis of casing 1506. Pins 1518 provide electrical connections between two connection interfaces when connector 1402 is plugged into the two connection interfaces. It is to be appreciated that the number of pins 1518 in this embodiment corresponds to the number of lines of bus 400 and thus, can be different in other examples. As shown in FIGS. 15 and 16A, in this embodiment, four pins 1518 include a center pin arranged along the central axis of casing 1506 and three peripheral pins arranged at concentric rings relative to the central axis of casing 1506.

In this embodiment, lock mechanisms provide mechanical connection and stability between the two connection interfaces when connector 1402 is plugged into the two connection interfaces. Snaps 1510-1 and 1510-2 are disposed on annular edges at open ends 1508-1 and 1508-2 of casing 1506, respectively. As shown in FIGS. 15 and 16A, snaps 1510 at each open end 1508 may be equally spaced apart by recesses 1514, which are formed on casing 1506. Protrusions 1512-1 and 1512-2 are disposed on the two symmetric portions of the outer surface of casing 1506 separated by raised annular 1516, respectively. As shown in FIGS. 15 and 16A, protrusions 1512 on each portion of the outer surface of casing 1506 may be equally spaced apart by recesses 1514 as well. It is to be appreciated that in some embodiments, lock mechanisms may include one or some of, but not all of, snaps 1510, protrusions 1512, and recesses 1514. In some embodiments, lock mechanisms other than snaps 1510, protrusions 1512, and recess 1514 may be formed in connector 1402.

Figure 18:
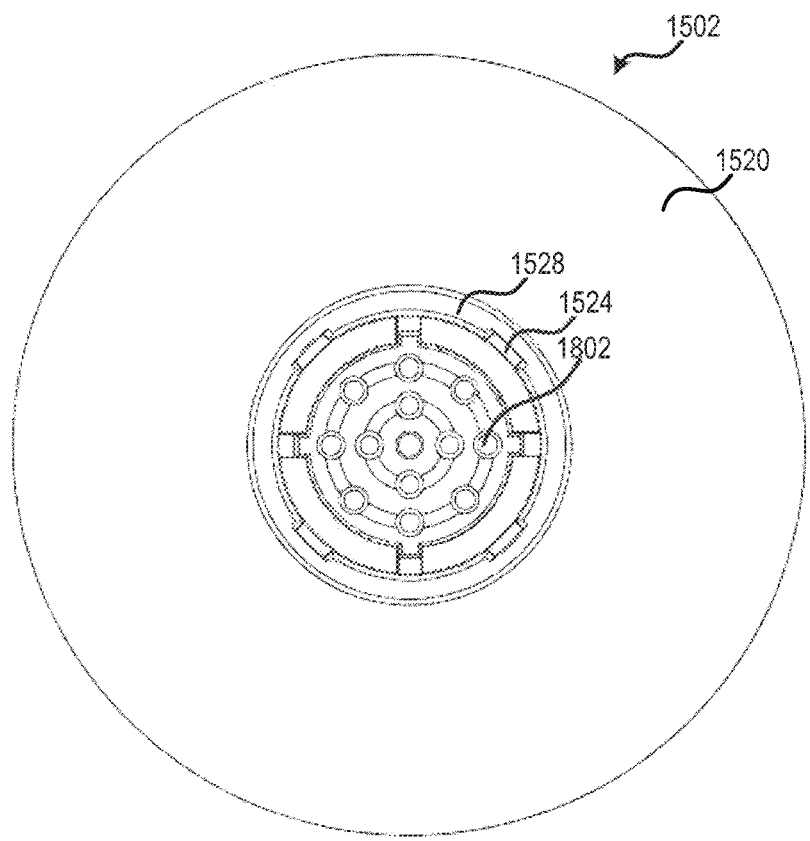
FIG. 18 is a plan view of an example of a connection interface in accordance with an embodiment.

Referring now to FIGS. 15 and 18, in this embodiment, casing 1502 of the connection interface includes a cover 1520, a hole 1522, lock mechanisms including recesses 1524, protrusions 1526, and a lower annular edge (not shown), and an upper annular edge 1528. Casing 1502 may be made of any suitable materials, such as plastics. In this embodiment, hole 1522 of casing 1502 is in a substantially cylindrical shape that fits the substantially cylindrical shape of connector 1402. Lock mechanisms provide mechanically connection and stability between the connection interface and connector 1402 when one end of connector 1402 is plugged into the connection interface. The lower annular edge and upper annular edge 1528 are disposed at two ends of hole 1522 of casing 1502, respectively. Recesses 1524 are formed in casing 1502. As shown in FIGS. 15 and 18, recesses 1524 may be equally spaced apart from one another. The number of recesses 1524 is the same as the number of protrusions 1512-1 on one portion of the outer surface of casing 1506. Protrusions 1526 are disposed on the inner surface of casing 1502. As shown in FIGS. 15 and 18, protrusions 1526 may be equally spaced apart by recesses 1524. The number of protrusions 1526 is the same as the number of recesses 1514-1 in one portion of casing 1506. It is to be appreciated that in some embodiments, lock mechanisms may include one or some of, but not all of, recesses 1524, protrusions 1526, and the lower annular edge. In some embodiments, lock mechanisms other than recesses 1524, protrusions 1526, and the lower annular edge may be formed in the connection interface.

As shown in FIG. 18, in this embodiment, guiding holes 1802 are formed on a panel that is arranged at the lower end of hole 1522 of casing 1502 and connected to the inner surface of casing 1502. When connector 1402 is plugged into the connection interface, a portion of each pin 1518, including end 1602-1, passes through one of guiding holes 1802 to reach circuit board 1504. The number of guiding holes 1802 in this embodiment is same as the number of contacts on circuit board 1504 and is larger than the number of pins 1518 of connector 1402.

Figure 17:
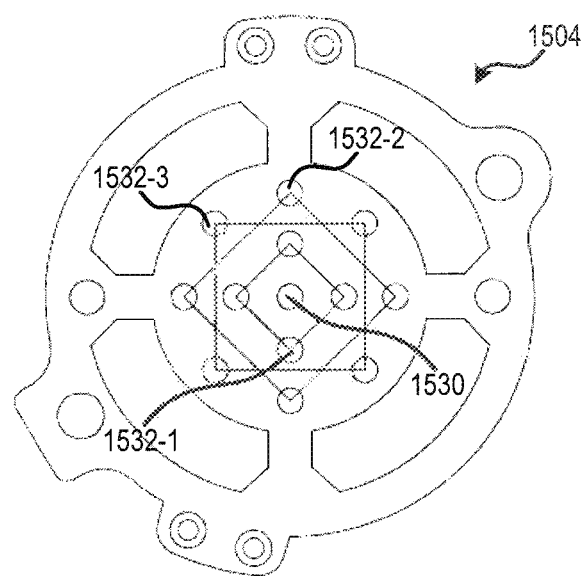
FIG. 17 is a plan view of an example of a circuit board of a connection interface in accordance with an embodiment.

Referring now to FIGS. 15 and 17, in this embodiment, circuit board 1504 of the connection interface includes a planar center contact 1530 arranged at the center of circuit board 1504 and planar peripheral contacts 1532 separately arranged at concentric rings on circuit board 1504. In this embodiment, as shown in FIG. 17, at the outermost ring on circuit board 1504, a first set of four peripheral contacts 1532-3 are electrically connected one another by circuit board 1504, e.g., by wires inside the circuit board 1504 or on the other side of circuit board 1504. Similarly, at the outermost ring on circuit board 1504, a second set of four peripheral contacts 1532-2 are electrically connected one another by circuit board 1504, e.g., by wires inside the circuit board 1504 or on the other side of circuit board 1504. The first and second sets of peripheral contacts 1532-3 and 1532-2 are electrically separate from each other. At the innermost ring on circuit board 1504, all four peripheral contacts 1532-1 are electrically connected one another by circuit board 1504, e.g., by wires inside the circuit board 1504 or on the other side of circuit board 1504. The set of peripheral contacts 1532-1 are electrically separate from the first and second sets of peripheral contacts 1532-3 and 1532-2. That is, four separate electrical contacts corresponding to center contact 1530, peripheral contacts 1532-1, peripheral contacts 1532-2, and peripheral contacts 1532-3 are formed on circuit board 1504. Each of the four separate electrical contacts is electrically connected to one of the four lines of bus 400. On the other hand, when connector 1402 is plugged into the connection interface, each of four pins 1518 of connector 1402 is in contact with a respective one of the four separate electrical contacts. Specifically, the center pin is in contact with center contact 1530, and each of the peripheral pins is in contact with one of the set of respective peripheral contacts 1532 depending on the orientation at which connector 1402 is plugged into the connection interface. In some embodiments, the set of four separate peripheral contacts 1532-1 in the innermost ring may be replaced by a single ring contact.

Figure 19:
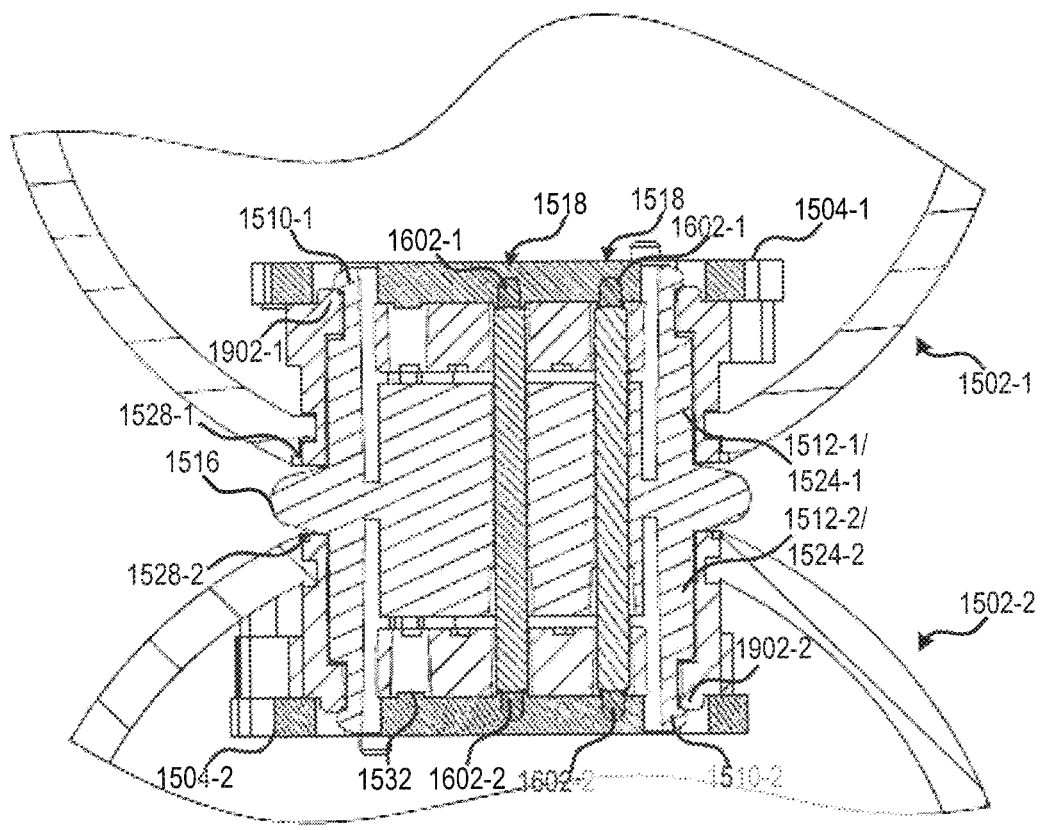
FIG. 19 is a cross-sectional view of an example of a connection structure in accordance with an embodiment.
Figure 20A:
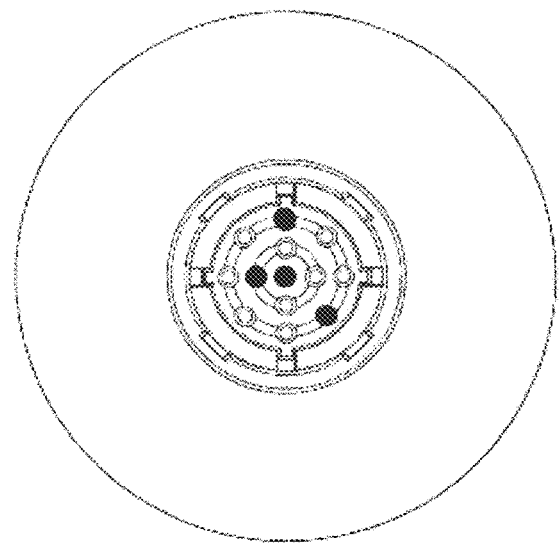
FIGS. 20A-20D are plan views of the connection interface in FIG. 19 in contact with pins of a connector at four orientations with 90 degrees offset, respectively, in accordance with an embodiment.
Figure 20B:
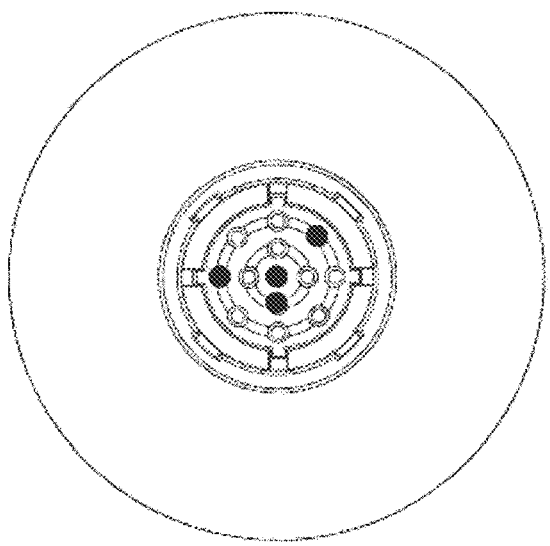
Figure 20C:
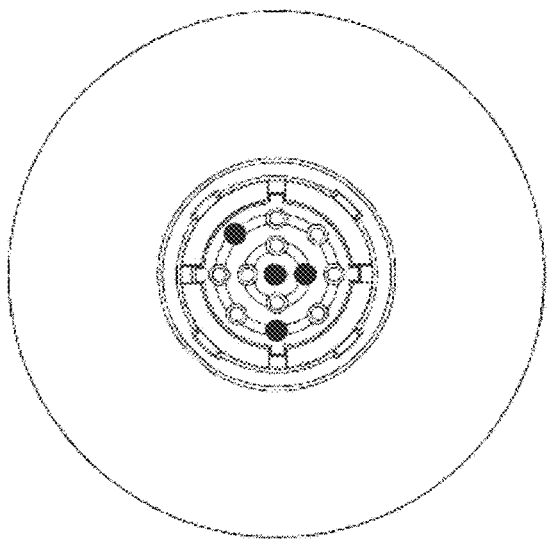
Figure 20D:
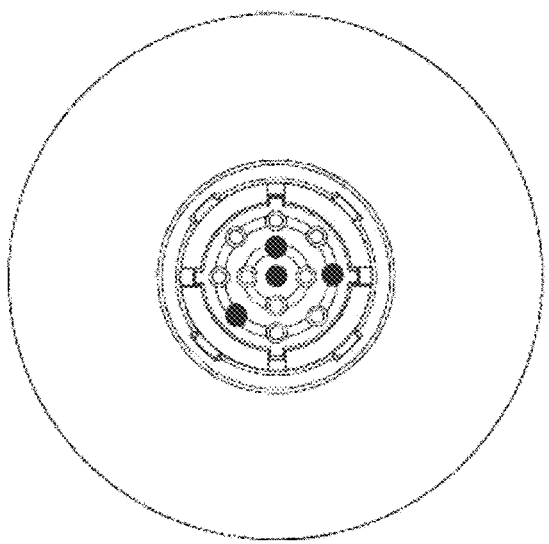

FIG. 19 is a cross-sectional view of an example of a connection structure in accordance with an embodiment. In this embodiment, connector 1402 is plugged into the two connection interfaces described above with respect to FIGS. 15-18 at one of a plurality of orientations. Pins 1518 of connectors 1402 are in contact with planar contacts of each connection interface so that the two connection interfaces are electrically connected. Specifically, one ends 1602-1 of each pin 1518 are in contact with planar contacts 1530 and 1532 on circuit board 1504-1 of one connection interface, and another ends 1602-2 of each pin 1518 are in contact with planar contacts 1530 and 1532 on circuit board 1504-2 of another connection interface. Each pin 1518 passes through one of guiding holes 1802 of each connection interface. Depending on the orientation at which connector 1402 is plugged into the connection interface, each peripheral pin of connector 1402 may pass through different guiding holes 1802 and in contact with different peripheral contacts 1532 on circuit board 1504.

FIGS. 20A-20D are plan views of the connection interface in contact with pins 1518 of connector 1402 at four orientations with 90 degrees offset, respectively, in accordance with an embodiment. In FIGS. 20A-20D, each solid dot represents one pin 1518 passing through guiding hole 1802 and is in contact with corresponding planar contact 1530 or 1532 on circuit board 1504. As described above, four pins 1518 include a center pin arranged along the central axis of casing 1506 and three peripheral pins arranged along the concentric rings relative to the center pin. In this embodiment, two peripheral pins that are electrically separate one another are arranged at the outermost ring relative to the center pin, and one peripheral pin is arranged at the innermost ring. As shown in FIGS. 20A-20D, regardless of the orientation, the center pin always passes through the center guiding hole and in contact with center contact 1530 on circuit board 1504.

As to the peripheral pin arranged at the innermost ring, the peripheral pin may pass through one of the four guiding holes at the innermost ring and be in contact with one of four peripheral contacts 1532-1 arranged at the innermost ring on circuit board 1504 depending on the orientation. In this embodiment, the four guiding holes and peripheral contacts 1532-1 are equally spaced apart at the innermost ring with 90 degrees offset. As to the two peripheral pins arranged at the outermost ring, each of the two peripheral pins may pass through one of four guiding pins with 90 degrees offset at the outermost ring and be in contact with one of four peripheral contacts 1532-2 or 1532-3 with 90 degrees offset at the outermost ring on circuit board 1504 depending on the orientation. That is, by arranging two sets of peripheral contacts 1532-2 and 1532-3 at the same outermost ring on circuit board 1504, each of which is spaced apart with 45 degrees offset, the two electrically-separate peripheral pins can be arranged at the same outermost ring to save space required for arranging pin 1518 in connector 1402. On the other hand, such arrangement can ensure electrical connectivity when connector 1402 is plugged into the connection interface at multiple orientations, thereby increasing the flexibility of the corresponding connection structure. It is to be appreciated that the number of orientations at which connector 1402 can be plugged into the connection interface is not limited to four as shown in this embodiment. In other examples, by changing the number of concentric rings for peripheral pins, guiding holes, and peripheral contacts, the number of peripheral pins, guiding holes, and peripheral contacts arranged at each concentric ring, and/or the angular offset between adjacent peripheral pins, guiding holes, and peripheral contacts arranged at each concentric ring, connector 1402 can be plugged into the connection interface at any suitable number of orientations.

Returning to FIG. 19, in addition to electrical connection, when connector 1402 is plugged into the two connection interfaces at one of the plurality of orientations relative to one another, the lock mechanisms of connector 1402 are interlocked with the lock mechanisms of each connection interface so that the two connection interfaces are mechanically connected as well. In this embodiment, when connector 1402 is plugged into the two connection interfaces, the central axis of hole 1522 of casing 1502 is aligned with the central axis of casing 1506. As shown in FIG. 19, snaps 1510-1 on one annular edge of casing 1506 are snapped-fit to lower annular edge 1902-1 of casing 1502-1 of one connection interface, and snaps 1510-2 on another annular edge of casing 1506 are snapped-fit to lower annular edge 1902-2 of casing 1502-2 of another connection interface. As shown in FIG. 19, each protrusion 1512-1 on one portion of the outer surface of casing 1506 is inserted into a respective recess 1524-1 in casing 1502-1 of one connection interface, and each protrusion 1512-2 on another portion of the outer surface of casing 1506 is inserted into a respective recess 1524-2 in casing 1502-2 of another connection interface. Although not shown in FIG. 19, in some embodiments, each protrusion 1526 on the inner surface of casing 1502 of a connection interface may be inserted into a respective recess 1514 in casing 1506 to further enhance the mechanical connection between two connection interfaces via connector 1402.

Lock mechanisms of connector 1402 and connection interfaces not only can provide mechanical stability to the corresponding structure, but also can guide connector 1402 to be plugged into the connection interfaces at certain orientations. In this embodiment, upper annular edge 1528-1 of casing 1502-1 of one connection interface abuts against one side of raised annular 1516 of casing 1506 of connector 1402, and upper annular edge 1528-2 of casing 1502-2 of another connection interface abuts against another side of raised annular 1516, which may provide additional mechanical stability and axial guidance to the corresponding connection structure. In this example, the number of possible orientations at which connector 1402 can be plugged into the two connection interfaces is the same as the number of recesses 1524 in casing 1502, the number of recesses 1514 in casing 1506, the number of protrusions 1526 on casing 1502, and the number of protrusions 1512 on casing 1506. For example, each of recesses 1524 or 1514 is 90 degrees offset from adjacent recesses 1524 or 1514, and each of protrusions 1526 or 1512 is also 90 degrees offset from adjacent protrusions 1526 or 1512. It is to be appreciated that the number of orientations at which connector 1402 can be plugged into the connection interface is not limited to four as shown in this embodiment. In other examples, by changing the number of lock mechanisms and/or the angular offset between adjacent lock mechanisms, connector 1402 can be plugged into the connection interface at any suitable number of orientations.

Figure 21A:
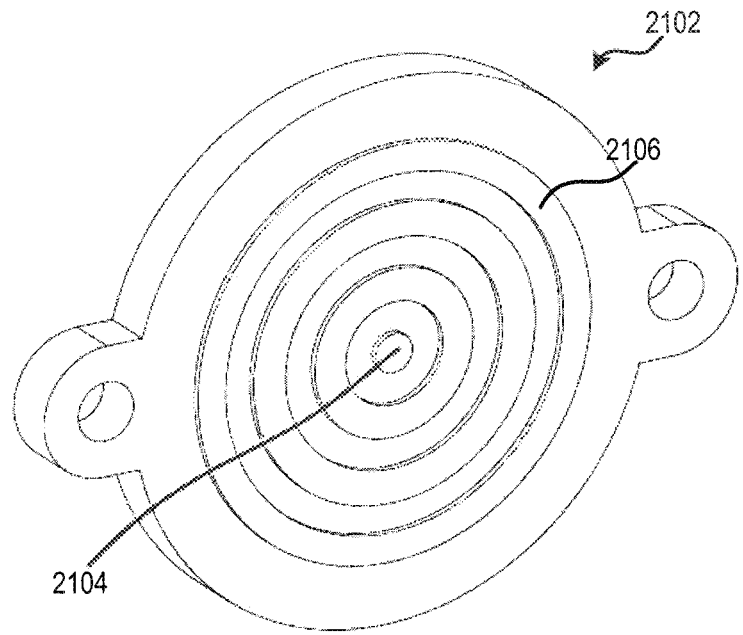
FIG. 21A-21B are perspective views of various examples of a circuit board having ring contacts thereon in accordance with an embodiment.
Figure 21B:
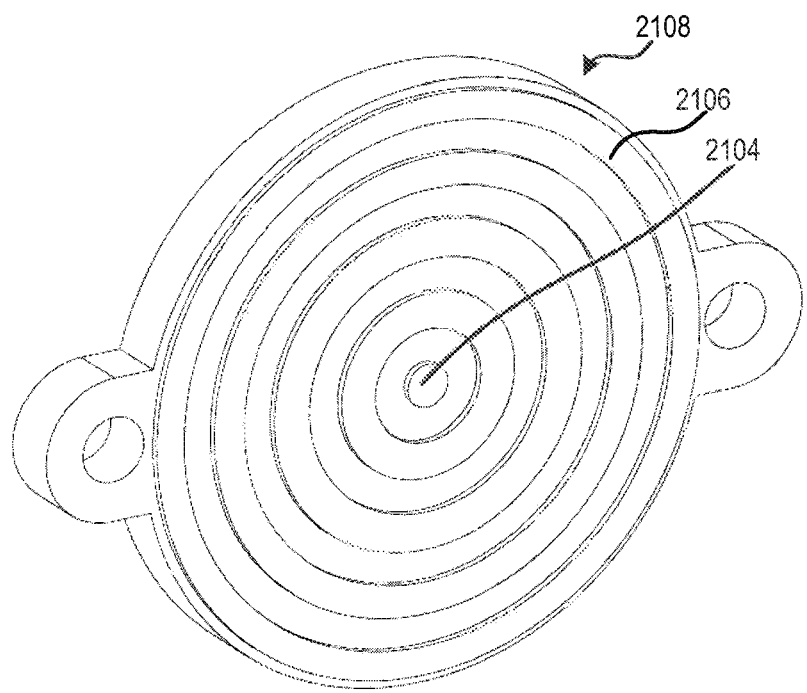

FIG. 21A-21B are perspective views of various examples of a circuit board 2102 or 2108 having ring contacts 2106 thereon in accordance with an embodiment. In this embodiment, a plurality of ring contacts 2106, each arranged at one of concentric rings on circuit board 2102 or 2108, replace peripheral contacts 1532 illustrated in FIG. 17. Similar to the embodiment described with respect to FIG. 17, a center contact 2104 is arranged at the center of circuit board 2102 or 2108. In this embodiment, a corresponding connector includes a center pin arranged along the central axis of casing, and a plurality of peripheral pins arranged at concentric rings relative to the central axis. The number of ring contacts 2106 in this embodiment is the same as the number of peripheral pins of the corresponding connector. For example, in FIG. 21A, circuit board 2102 includes three ring contacts 2106 and thus, the corresponding connector includes three peripheral contacts, each of which can be in contact with a respective ring contact 2106. In FIG. 21B, circuit board 2108 includes four ring contacts 2106 and thus, the corresponding connector includes four peripheral contacts, each of which can be in contact with a respective ring contact 2106.

Compared with the embodiment with respect to FIGS. 15-20 in which some peripheral pins are arranged at the same outermost ring, the space required to arrange the peripheral pins in the connector and the peripheral contacts on circuit board 2102 or 2108 may be increased in this embodiment. On the other hand, the arrangement disclosed in this embodiment can ensure electrical connectivity between the connector and the connection interface when the connector is plugged at any orientations relative to the connection interface, i.e., can achieve 360 degrees rotation. Also, the arrangement disclosed in this embodiment is simple for adding more electrical contacts between the connector and the connection interface, i.e., by adding additional ring contacts at outer concentric rings on the circuit board 2102 or 2108 of the connection interface and adding corresponding peripheral pins to the connector. It is to be appreciated that in this embodiment, lock mechanisms of the corresponding connector and connection interface may be different from the lock mechanisms described in the embodiment with respect to FIGS. 15-20 to achieve "360 degrees rotation" of the connection structure in this embodiment.

Figure 22A:
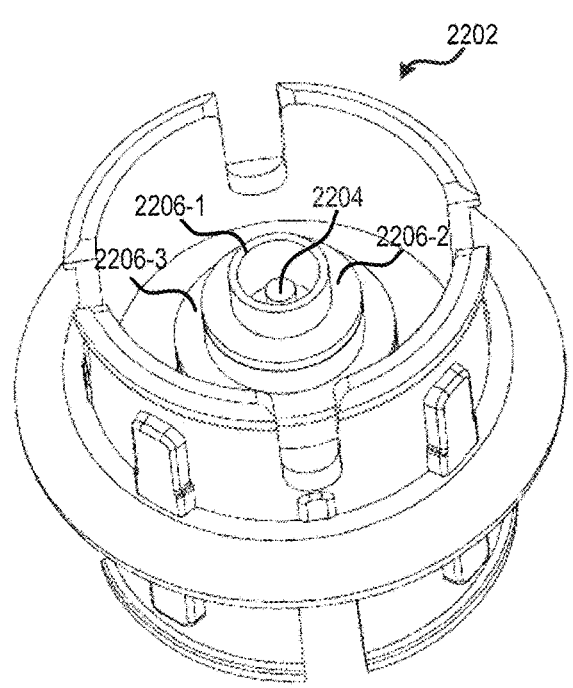
FIG. 22A is a perspective view of another example of a connector in accordance with an embodiment.
Figure 22B:
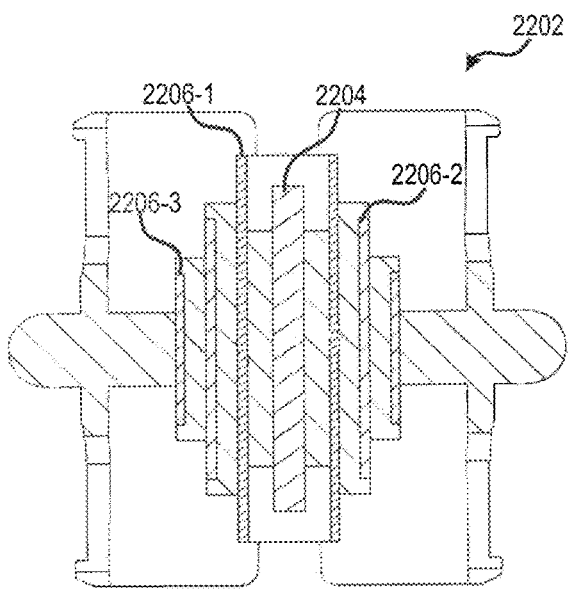
FIG. 22B is a cross-sectional view of the connector in FIG. 22A in accordance with an embodiment.
Figure 22C:
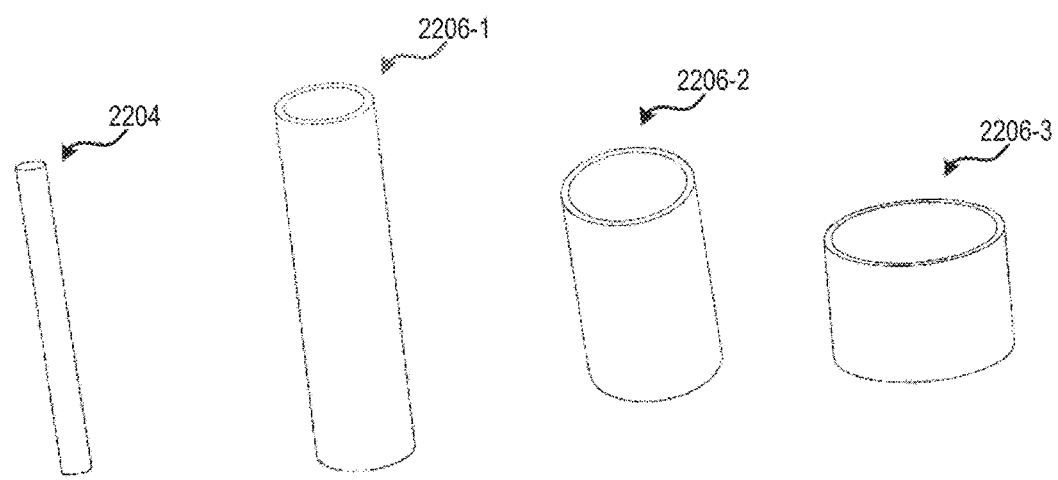
FIG. 22C is a perspective view of contacts of the connector in FIG. 22A in accordance with an embodiment.

FIGS. 22A and 22B are perspective view and cross-sectional view, respectively, of another example of a connector 2202 in accordance with an embodiment. In this embodiment, casing and mechanical locks thereon have the same structures as the ones described in the embodiment with respect to FIGS. 15-20 and thus, will not be repeated again. In this embodiment, connector 2202 includes a center pin 2204 and three concentric ring contacts 2206-1, 2206-2, and 2206-3. Center pin 2204 is arranged along the central axis of the casing, and each ring contact 2206 is arranged concentric to center pin 2204 (the central axis). Each of center pin 2204 and ring contacts 2206 includes two ends, each of which is exposed by one of two open ends of the casing of connector 2202, respectively. FIG. 22C is a perspective view of contacts 2204 and 2206 of connector 2202 in accordance with an embodiment. As shown in FIGS. 22B and 22C, the lengths of ring contacts 2206 are different. For example, ring contact 2206-1 is arranged at the innermost ring and has the largest length among three ring contacts 2206; ring contact 2206-2 is arranged at the intermediate ring and has the second largest length among three ring contacts 2206; ring contact 2206-3 is arranged at the outermost ring and has the smallest length among three ring contacts 2206. In this embodiment, center pin 2204 has the length larger than those of ring contacts 2206-2 and 2206-3 but smaller than that of ring contact 2206-1. In this embodiment, because three ring contacts 2206 are arranged concentrically, innermost ring contact 2206-1 has the smallest diameter, and outermost ring contact 2206-3 has the largest diameter among three ring contacts 2206. Center pin 2204 and each ring contact 2206 may be made of any suitable electrically conductive materials, such as copper or aluminum.

Figure 23:
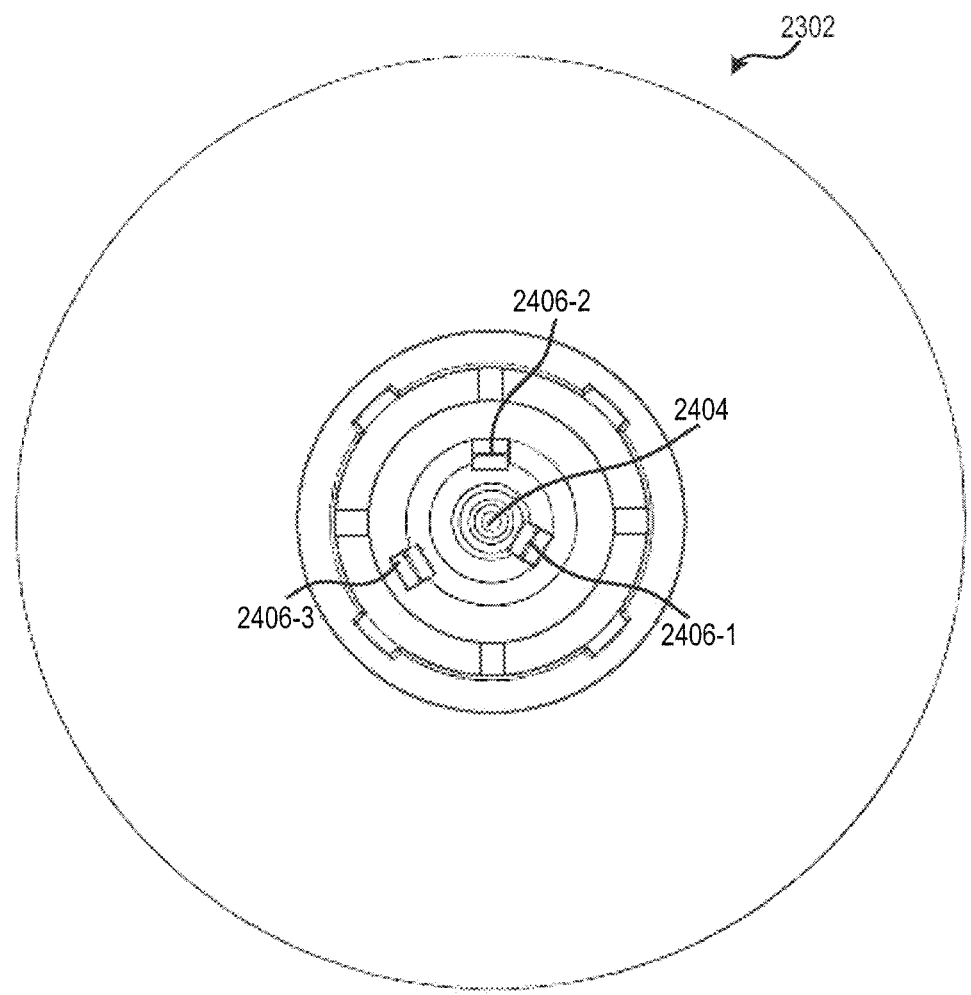
FIG. 23 is a plan view of another example of a connection interface in accordance with an embodiment.
Figure 24A:
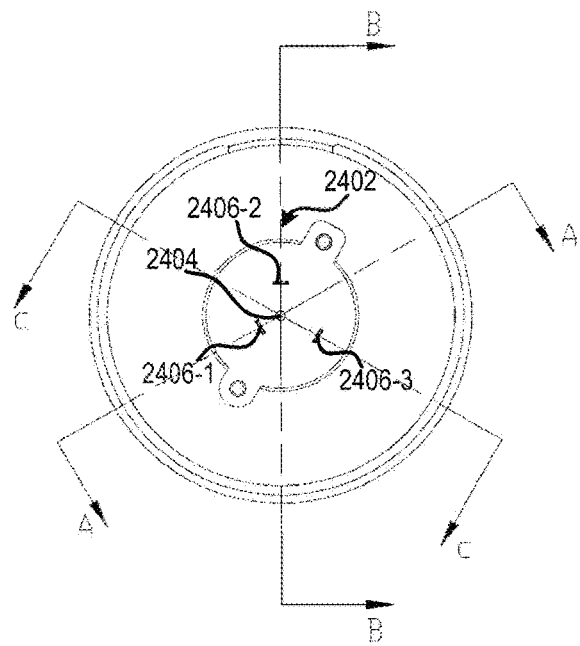
FIG. 24A is a plan view of another example of a circuit board of the connection interface in FIG. 23 in accordance with an embodiment.

FIG. 23 is a plan view of another example of a connection interface in accordance with an embodiment. FIG. 24A is a plan view of another example of a circuit board 2402 of the connection interface in FIG. 23 in accordance with an embodiment. The connection interface in this embodiment can be used with connector 2202 illustrated in FIGS. 22A-22C. The connection interface may include a casing 2302 and circuit board 2402. In this embodiment, mechanical locks on casing 2302 have the same structures as those described in the embodiment with respect to FIGS. 15-20 and thus, will not be repeated again. In this embodiment, instead of have guiding holes 1802 arranged at the center and concentric rings on the panel as shown in FIG. 18, a center guiding hole and three ring openings are formed on the panel to allow corresponding center pin 2204 and ring contacts 2206 to pass through, respectively. In this embodiment, a center contact 2404 and three peripheral contacts 2406-1, 2406-2, and 2406-3 are arranged on circuit board 2402. Center contact 2404 is arranged at the center of circuit board 2402, and each peripheral contact 2406 is arranged at a different distance from center contact 2404. In other words, each peripheral contact 2406 is arranged at a respective concentric ring. Specifically, peripheral contact 2406-1 is arranged in the innermost ring and has the shortest distance from center pin 2404 among three peripheral contacts 2406; peripheral contact 2406-2 is arranged in the intermediate ring and has the second shortest distance from center pin 2404 among three peripheral contacts 2406; peripheral contact 2406-3 is arranged in the outermost ring and has the longest distance from center pin 2404 among three peripheral contacts 2406.

Figure 24B:
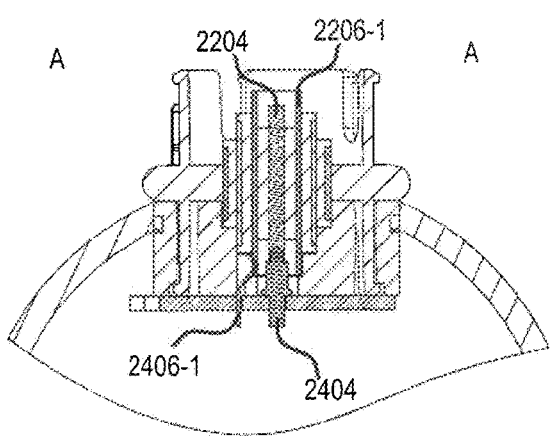
FIG. 24B-24D are cross-sectional views of another example of a connection structure including the connector in FIG. 22A in contact with the connection interface in FIG. 23 in accordance with an embodiment.
Figure 24C:
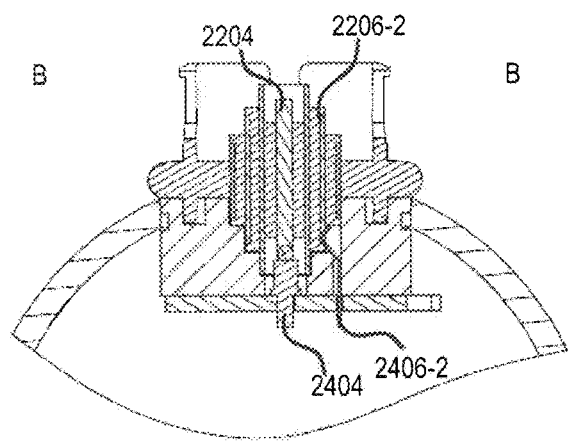
Figure 24D:
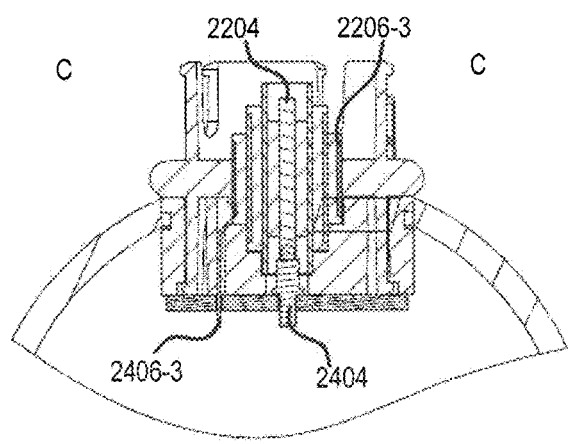

FIG. 24B-24D are cross-sectional views of another example of a connection structure including connector 2202 in FIG. 22A in contact with the connection interface in FIG. 23 in accordance with an embodiment. In this embodiment, when connector 2202 is plugged into the connection interface, center contact 2404 may pass through the center guiding hole in casing 2302 (see FIG. 23) to be in contact with center pin 2204 of connector 2202, and each peripheral contact 2406 may pass through a respective ring opening in casing 2302 (see FIG. 23) to be in contact with a respective ring contact 2206. As a result, four electrical contacts are formed by the connection structure, which correspond to the four lines of bus 400. To ensure reliable electrical connectivity, in this embodiment, one or more of center contact 2404 and peripheral contacts 2406 are deformable so as to be pressed onto a respective contact 2204 or 2206 of connector 2202 when connector 2202 is plugged into the connection interface. For example, center contact 2404 may include an end connected to a spring as shown in FIGS. 24B-24D. Each peripheral contact 2406 may include a resilient zigzag portion that can deform under pressure.

The arrangement disclosed in this embodiment with respect to FIGS. 22-24 can ensure electrical connectivity between connector 2202 and the connection interface when the connector is plugged at any orientation relative to the connection interface, i.e., can achieve 360 degrees rotation. Also, the arrangement disclosed in this embodiment is simple for adding more electrical contacts between connector 2202 and the connection interface, i.e., by adding additional peripheral contacts at outer concentric rings on circuit board 2402 of the connection interface and adding corresponding ring contacts to connector 2202. Moreover, as described below, other structures of connector 2202 and the connection interface in this embodiment, such as the lock mechanisms, are the same as the corresponding structures in the embodiment with respect to FIGS. 15-20. Similar to the embodiment with respect to FIGS. 15-20, when connector 2202 is plugged into two connection interfaces at multiple orientations relative to one another, the lock mechanisms of connector 2202 are interlocked with the lock mechanism of each connection interface so that the two connection interfaces are mechanically connected. In this embodiment, connector 2202 is detachable from each connection interface after being plugged into the connection interfaces. The connection structure disclosed herein thus provides an easy way to assemble assembly modules to build modular assembly robotic toys and dissemble the modular assembly robotic toys into separate assembly modules.

Assembly Module Registration and Status Update

Figure 25:
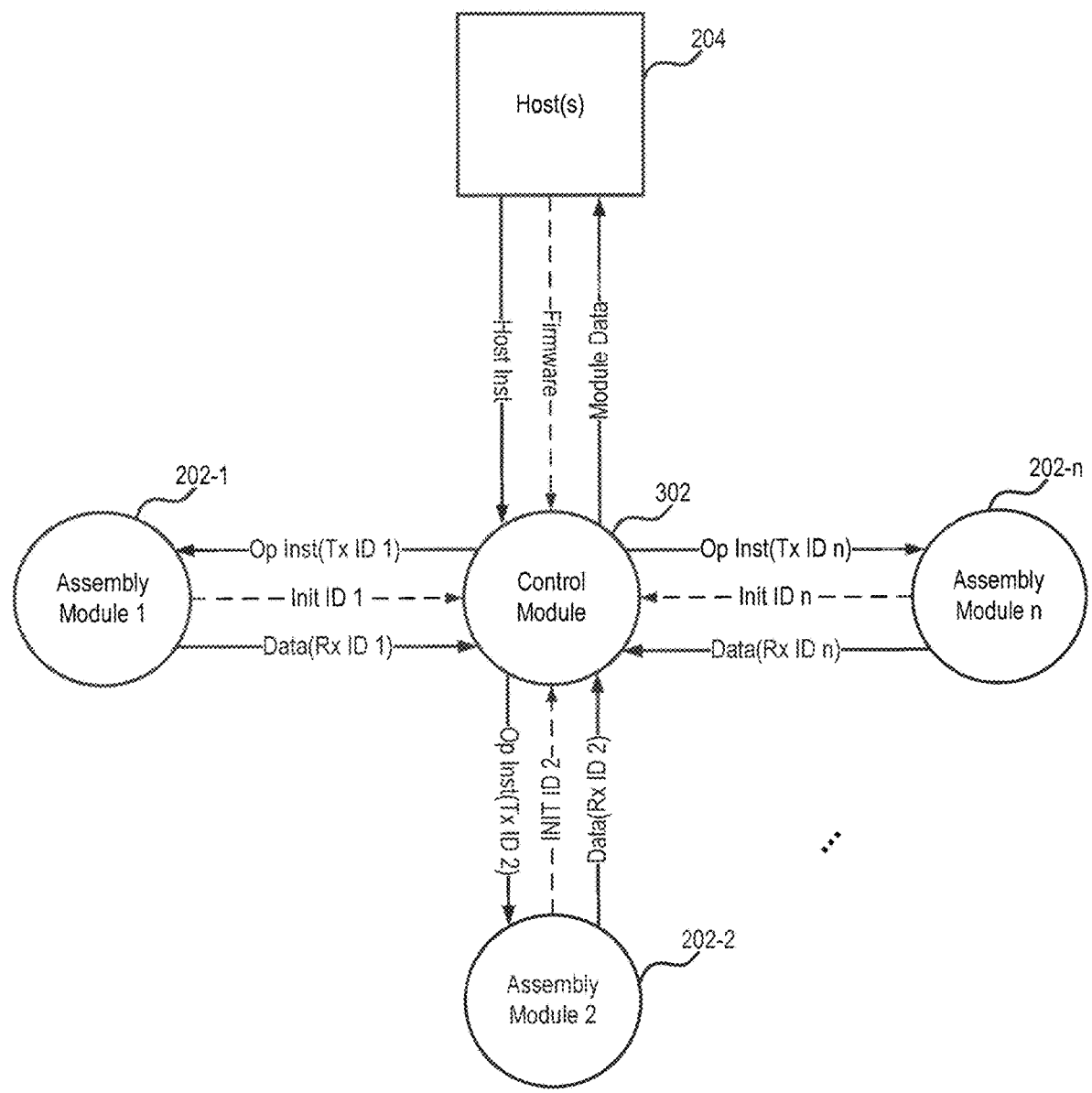
FIG. 25 is a depiction of an example of communication between a control module and multiple assembly modules and hosts in accordance with an embodiment.

FIG. 25 is a depiction of an example of communication between control module 302 and multiple assembly modules 202 and hosts 204 in accordance with an embodiment. In this embodiment, control module 302 may perform bidirectional communication with hosts 204 using USB and/or Bluetooth. In one example, host instructions generated by hosts 204, for example, control instructions, may be transmitted to control module 302 using BLE technologies. In another example, host instructions generated by hosts 204, for example, programming instructions, may be transmitted to control module 302 using USB. Error detection and correction codes, such as cyclic redundancy check (CRC) code, may be added to the raw data of host instructions to ensure reliable delivery of host instructions. On the other hand, module data, e.g., sensor signals obtained by sensor modules 304 and status data of each assembly module 202, may be transmitted from control module 302 to hosts 204 using BLE technologies.

In this embodiment, firmware may be transmitted from hosts 204 to control module 302 using BLE or USB as well. As will be described below in detail, in some embodiments, the firmware file may be divided into multiple data packages with the same or different size, each of which includes a header and an error detection and correction code. Each data package may be transmitted in sequence to control module 302 and checked for data error. An end data package may be added to indicate the end of the transmission of the firmware data package stream. In some embodiments, the firmware file may be encrypted using information that is unique to control module 302 to ensure that only the correct control module 302 can decrypt and update the received firmware.

In this embodiment, as described above, control module 302 may perform bidirectional communication with any assembly module 202 in the modular assembly robotic toy via bus 400. For example, bus 400 may be a CAN bus, and CAN data transmission and ID allocation protocols may be used for communication between control module 302 and assembly modules 202. In this embodiment, each assembly module 202 includes an initial ID that can uniquely identify assembly module 202. The initial ID may be stored in persistent storage 616, e.g., an ROM or a flash, of corresponding assembly module 202 and cannot be changed. In some embodiments, a module type ID that is indicative of the type of corresponding assembly module 202 may be part of the initial ID or may be derived from the initial ID. The same type of assembly modules, e.g., all power modules 310 or all connector modules 312, may have the same module type ID. The initial ID may be used by control module 302 and hosts 204 to identify corresponding assembly module 202 and updating status (e.g., online or offline) of assembly module 202. In some embodiments, the initial ID may be used as the communication address of corresponding assembly module 202 before a communication ID is assigned to assembly module 202.

In this embodiment, a communication ID that is used as the communication address (e.g., source or destination address) via bus 400 may be generated based on the initial ID and assigned to corresponding assembly module 202 by control module 302. In some embodiments, a communication ID may include a transmission ID and a receiving ID. For example, the transmission ID may be used when a message is transmitted from control module 302 to corresponding assembly 202, and the receiving ID may be used when a message is received by control module 302 from corresponding assembly module 202. In some embodiments, the receiving ID may be derived from the corresponding transmission ID. Thus, control module 302 may only need to provide the transmission ID to corresponding assembly module 202, and assembly module 202 can derive the corresponding receiving ID based on the received transmission ID. In one example, the receiving ID may be the transmission ID+0x0100. For example, if the transmission ID is 0x0060, then the receiving ID is 0x0160.

In this embodiment, control module 302 may transmit operation instructions to each assembly module 202 using the transmission ID of corresponding assembly module 202 through the two data lines of bus 400. The operation instructions may be transmitted in the form of data messages, each of which includes the transmission ID of corresponding assembly module 202 as the destination address. TABLE 1 below shows one example of a message of operation instructions transmitted from control module 302 to infrared sensor module 314.

TABLE 1

| Byte | Field | Value |
|---|---|---|
| 0 | Tx ID | 0x0C |
| 1 | Working Mode | 1: Active Mode |
| 2 | Emitting Mode | 0: Repeated Emitting<br>1: Single Emitting |
| 3 | Interval (Repeated Emitting) | Low Byte |
| 4 | | High Byte |
| 5 | N/A | N/A |
| 6 | N/A | N/A |
| 7 | N/A | N/A |

On the other hand, each assembly module 202 may transmit module data, e.g., sensor signals or status data, to control module 302 through the two data lines of bus 400. The module data may be transmitted in the form of data messages, each of which includes the receiving ID of corresponding assembly module 202 to identify the source of the message. TABLE 2 below shows one example of a message of module data transmitted from power module 310 to control module 302.

TABLE 2

| Byte | Field | Value |
|---|---|---|
| 0 | Rx ID | 0x01 |
| 1 | Power Level Low Byte | |
| 2 | Power Level High Byte | |
| 3 | N/A | N/A |
| 4 | N/A | N/A |
| 5 | N/A | N/A |
| 6 | N/A | N/A |
| 7 | N/A | N/A |

Figure 26:
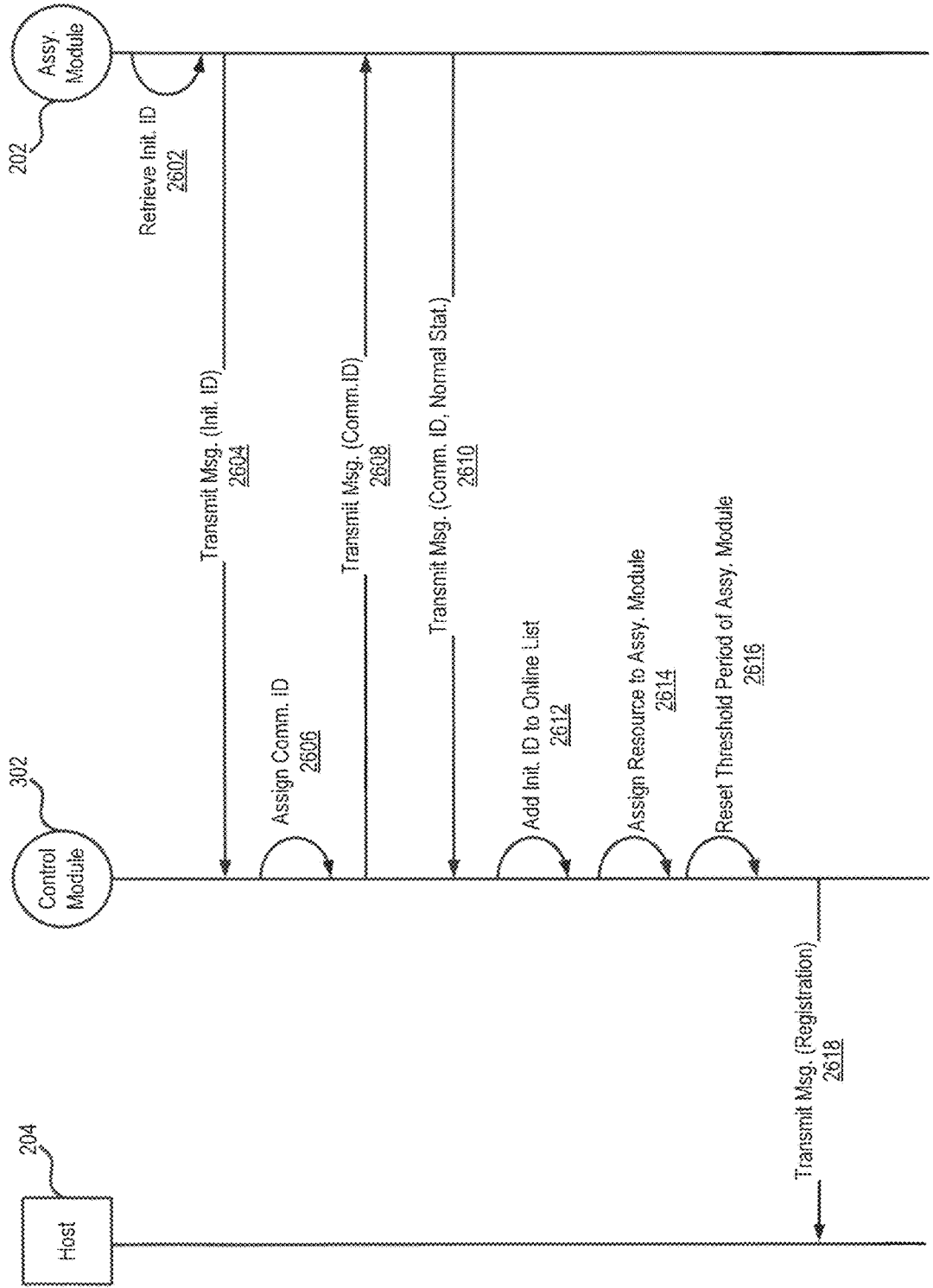
FIG. 26 is an event diagram illustrating an example of a method for registering an assembly module in accordance with an embodiment.

When an assembly module 202 is first time coupled into a modular assembly robotic toy, assembly module 202 may need to be registered as part of the modular assembly robotic toy by control module 302. For example, for modular assembly robotic toy 100 illustrated in FIGS. 1A-1C, when a user first time plugs infrared sensor module 112 into modular assembly robotic toy 100 to add the object detection capability, newly-added infrared sensor module 112 may need to be registered as part of modular assembly robotic toy 100. FIG. 26 is an event diagram illustrating an example of registering assembly module 202 in accordance with an embodiment. In this embodiment, registration of new assembly module 202 may be informed to host 204 by control module 302 so that host 204 can manage all registered assembly modules 202 of the modular assembly robotic toy and provide the registration information to the user and/or server 206.

At 2602, assembly module 202 may retrieve the initial ID thereof. For example, the initial ID that is unique to assembly module 202 may be stored into persistent storage 616 of assembly module 202 when assembly module 202 was manufactured, which cannot be modified afterwards. In some embodiments, the initial ID may be stored at a predefined address with a predefined length in persistent storage 616, and assembly module 202 may retrieve the initial ID by reading data from the predefined address with the predefined length. If no data is stored at the predefined address, then assembly module 202 cannot work. In some embodiments, a separate indicator may be stored in persistent storage 616, and assembly module 202 may first read the indicator to see if the initial ID has been properly assigned and stored. This process may be automatically triggered when assembly module 202 is plugged into the modular assembly robotic toy and powered up by the power signals from the power lines of bus 400.

At 2604, assembly module 202 may transmit a module initiation message including the retrieved initial ID to control module 302 via the data lines of bus 400. TABLE 3 below illustrates one example of the module initiation message transmitted from assembly module 202 to control module 302. In this example, the field "Flag" indicates that the six-byte initial ID starts from the next byte of the message. In some embodiments, the module initiation message may also include the module type ID of assembly module 202.

TABLE 3

| Byte | Field | Value |
|---|---|---|
| 0 | Flag | 0x1D |
| 1 | Initial | |
| 2 | ID | |
| 3 | | |
| 4 | | |
| 5 | | |
| 6 | | |
| 7 | N/A | N/A |

At 2606, after receiving the module initiation message from assembly module 202, control module 302 may assign a communication ID to assembly module 202, which can be used for communication between assembly module 202 and control module 302 via bus in the future. The communication ID may be generated based on information in the module initiation message, for example, the initial ID and/or the module type ID of assembly module 202. For example, control module 302 may generate the communication ID based on the module type ID if assembly module 202 is the only assembly module of the same type that has been registered with the modular assembly robotic toy. If there is more than one assembly module 202 of the same type, i.e., the module type ID is no longer unique, then control module 302 may generate the communication ID based on the initial ID of assembly module 202, which uniquely identifies corresponding assembly module 202 as described above. In some embodiments, a certain range of commutation IDs may be reserved for each type of assembly modules 202. For example, communication IDs for movement modules 318 may be in the range from 0x31 to 0x3F. In some embodiments, the commutation ID may include a transmission ID and a receiving ID as described above.

At 2608, control module 302 may transmit an ID assignment message including the assigned communication ID to assembly module 202 via the data lines of bus 400. In some embodiments, if the communication ID includes both transmission ID and receiving ID, the ID assignment message may include both transmission and receiving IDs or the transmission ID only (if the receiving ID can be derived from the transmission ID). TABLE 4 below illustrates one example of the ID assignment message transmitted from control module 302 to assembly module 202. As described above, in this example, the ID assignment message includes the initial ID of assembly module 202 as the destination address of the message. The initial ID may not be used in future communication between assembly module 202 and control module 302 after the communication ID is delivered to assembly module 202.

TABLE 4

| Byte | Field | Value |
|---|---|---|
| 0 | Flag | 0x1D |
| 1 | Initial | |
| 2 | ID | |
| 3 | | |
| 4 | | |
| 5 | | |
| 6 | | |
| 7 | Comm. ID | |

At 2610, after receiving the ID assignment message including the assigned communication ID from control module 302, assembly module 202 may start to periodically transmit "heartbeat" messages indicative of normal status of assembly module 202 to control module 302. Each heartbeat message may include the communication ID, for example, the receiving ID, to identify the source of the message.

At 2612, once control module 302 receives the first heartbeat message from corresponding assembly module 202 and identifies that assembly module 202 has not been registered before with the modular assembly robotic toy, control module 302 may add the initial ID of corresponding assembly module 202 to an online module list. The online module list may include initial IDs of all assembly modules 202 that have registered with the modular assembly robotic toy and that are currently coupled to the modular assembly robotic toy. At 2614, control module 302 may also assign resources to assembly module 202. At 2616, control module 302 may reset the value of the threshold period of assembly module 202. The value of the threshold period may continuously decrease as time goes by. The threshold period may be used by control module 302 to determine whether corresponding assembly module 202 is decoupled from the modular assembly robotic toy (i.e., becomes offline). Newly-added assembly module 202 is then considered being registered with the modular assembly robotic toy by control module 302.

At 2618, once the registration processes of assembly module 202 are completed, control module 302 may transmit a module registration message to host 204 indicating that assembly module 202 is registered. In some embodiments, host 204 may update a registration list to include assembly module 202 and present a message to the user informing the registration of assembly module 202.

Figure 27:
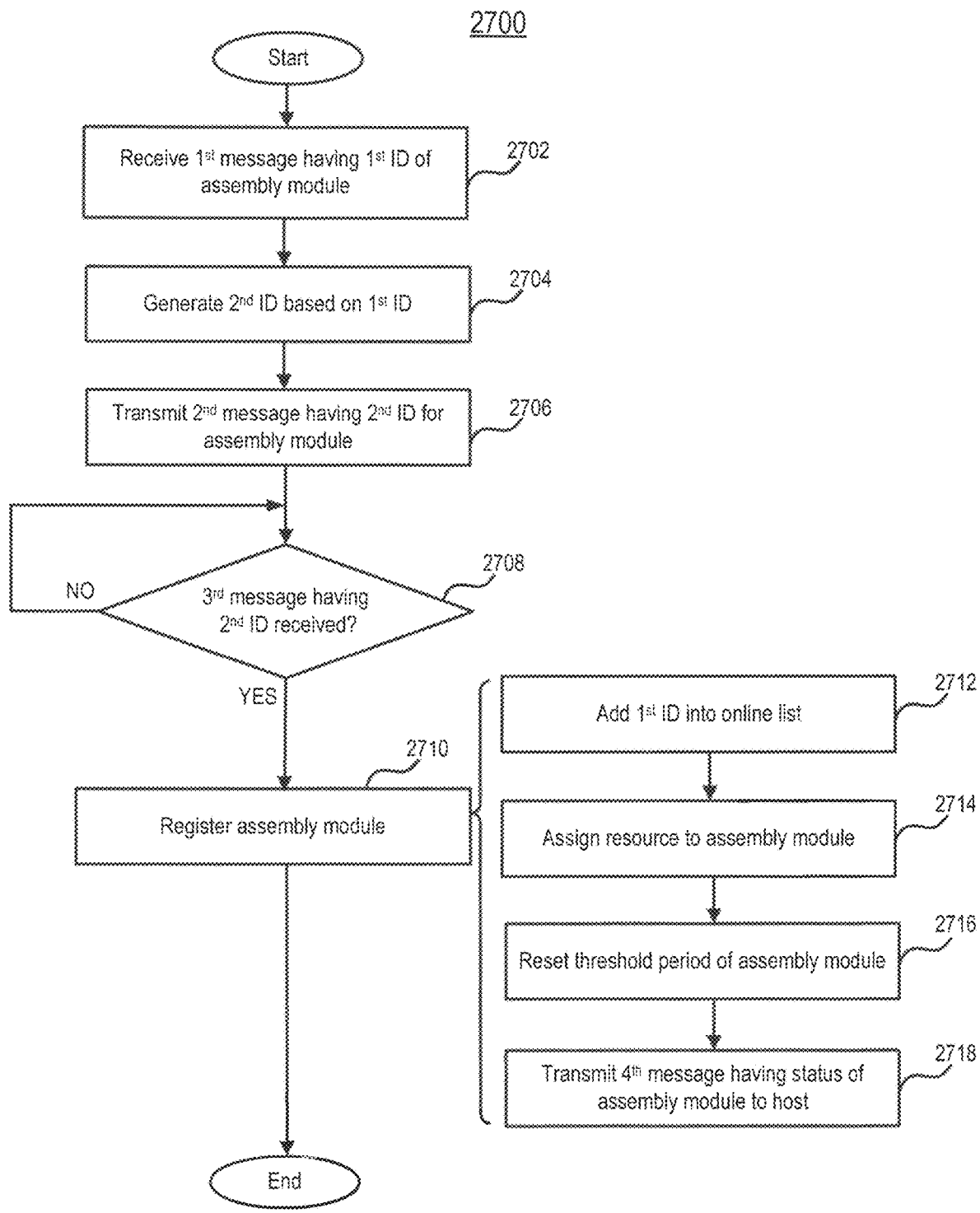
FIG. 27 is a flow chart illustrating an example of a method for registering an assembly module in accordance with an embodiment.

FIG. 27 is a flow chart illustrating an example of a method 2700 for registering assembly module 202 in accordance with an embodiment. It will be described with reference to the above figures. However, any suitable circuit, logic, unit, or module may be employed. Method 2700 can be performed by any suitable circuit, logic, unit, or module that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 27, as will be understood by a person of ordinary skill in the art.

Starting at 2702, control module 302 may receive a first message having a first ID of assembly module 202. The first ID may be stored in persistent storage 616 of assembly module 202 and uniquely identify assembly module 202. In some embodiments, the first message may further include a third ID that is indicative of the type of assembly module 202. The third ID may be either separate from the first ID, a part of the first ID, or can be derived from the first ID.

At 2704, control module 302 may generate a second ID for assembly module 202 based on the first ID of assembly module 202. The second ID may be used for future communication between control module 302 and assembly module 202. In some embodiments, the second ID may be generated based on both the first ID and the third ID or based on the third ID alone. In some embodiments, the second ID may include two sub-IDs, e.g., a transmission ID and a receiving ID, or may be one of the transmission and receiving IDs. At 2706, control module 302 may transmit a second message having the second ID to assembly module 202. In some embodiments, the second message may include the first ID and/or the third ID of assembly module 202 as well.

At 2708, control module 302 may determine whether a third message having the second ID for assembly module 202 is received from assembly module 202. In some embodiments, the third message further includes a normal status indicator and is periodically transmitted by assembly module 202 to control module 302. In other words, the third message may be a heartbeat message. The second ID was assigned by control module 302 to assembly module 202 and transmitted to assembly module 202 for future communication between control module 302 and assembly module 202, including heartbeat messages. If no third message is received, then control module 302 may continue checking the receipt of the third message. If the third message is received, then at 2710, control module 302 may register assembly module 202 as a new assembly module of the modular assembly system, e.g., a robotic toy.

An embodiment of 2710 shall now be described in greater detail. Specifically, at 2712, control module 302 may add the first ID of assembly module 202 into an online module list. That is, assembly module 202 may be associated with a status as being coupled to the modular assembly system. At 2714, control module 302 may assign resources to assembly module 202. At 2716, control module 302 may reset the threshold period of assembly module 202. At 2718, control module 302 may transmit a fourth message having the status of assembly module 202 to host 204. The status may indicate that assembly module 202 is coupled to the modular assembly system and registered as a new assembly module of the modular assembly system.

Figure 28:
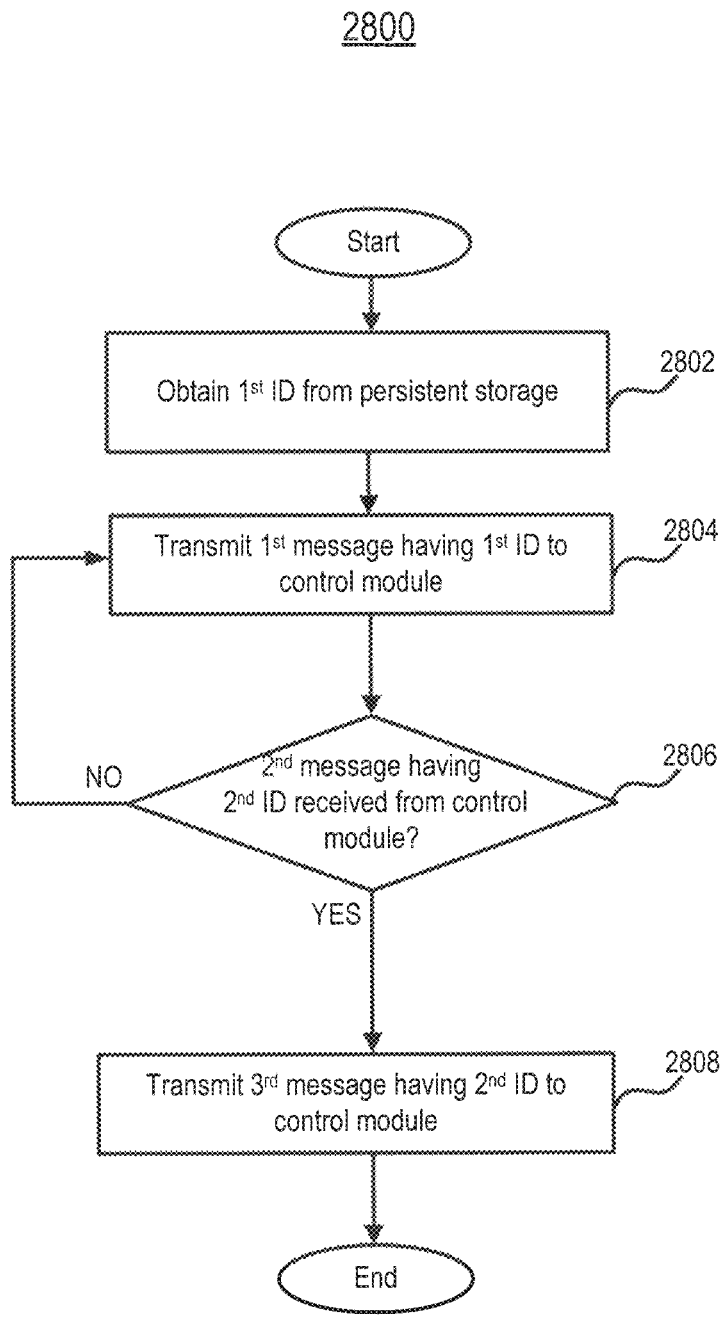
FIG. 28 is a flow chart illustrating another example of a method for registering an assembly module in accordance with an embodiment.

FIG. 28 is a flow chart illustrating another example of a method 2800 for registering assembly module 202 in accordance with an embodiment. It will be described with reference to the above figures. However, any suitable circuit, logic, unit, or module may be employed. Method 2800 can be performed by any suitable circuit, logic, unit, or module that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 28, as will be understood by a person of ordinary skill in the art.

Starting at 2802, assembly module 202 may obtain the first ID from persistent storage 616. In some embodiments, 2802 may be automatically performed in response to assembly module 202 being powered-up. At 2804, assembly module 202 may transmit the first message having the first ID to control module 302. The first message may include the third ID that is indicative of the type of assembly module 202. At 2806, assembly module 202 may determine whether the second message having the second ID is received from control module 302. If no second message is received, then assembly module 202 may continue checking the receipt of the second message. If the second message is received, then at 2808, assembly module 202 may transmit the third message having the second ID to control module 302. In some embodiments, assembly module 202 may periodically transmit heartbeat messages including the second ID that is indicative of the source of the heartbeat messages to control module 302.

Figure 29:
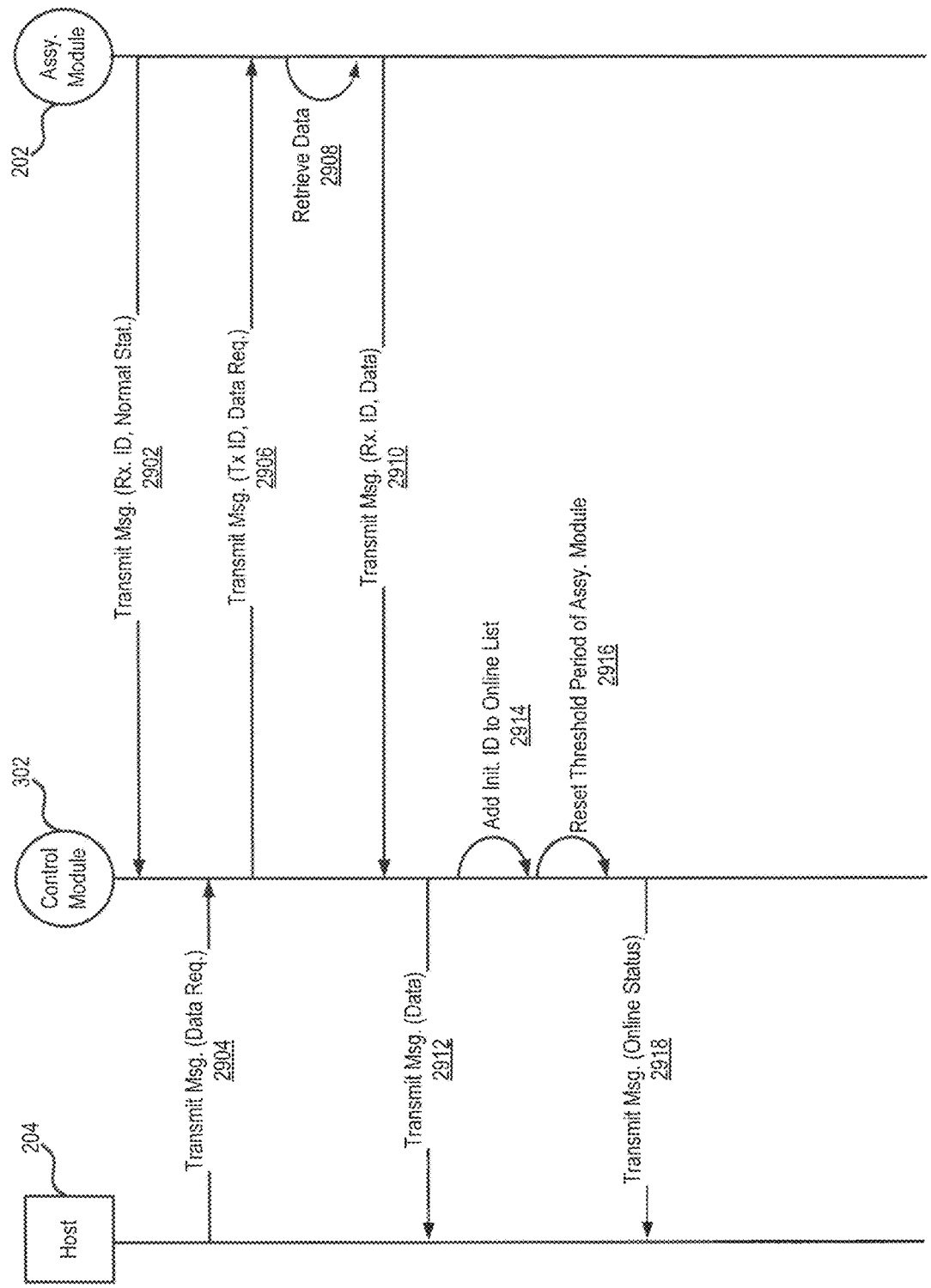
FIG. 29 is an event diagram illustrating an example of a method for updating a status associated with an assembly module in accordance with an embodiment.

In some situations, a registered assembly module of a modular assembly system may be intentionally or accidently decoupled from the modular assembly system due to, for example, loose connectors, poor contacts, etc. Thus, it may be desirable to effectively and efficiently detect and update the status (e.g., online or offline) of each registered assembly module of the modular assembly system without turning off the power of the modular assembly system. For example, for modular assembly robotic toy 100 illustrated in FIGS. 1A-1C, when registered infrared sensor module 112 is accidentally decoupled from modular assembly robotic toy 100, control module 102 may quickly detect such an event and update the status of infrared sensor module 112 as being offline. When infrared sensor module 112 is plugged back into modular assembly robotic toy 100, control module 102 may also quickly detect such an event and update the status of infrared sensor module 112 as being online. FIG. 29 is an event diagram illustrating an example of updating a status associated with assembly module 202 in accordance with an embodiment. In this embodiment, status update of assembly module 202 may be informed to host 204 by control module 302 so that host 204 can manage the status of all registered assembly modules 202 of the modular assembly robotic toy and provide the status information to the user and/or server 206.

At 2902, assembly module 202 may periodically transmit heartbeat messages that are indicative of normal status of assembly module 202 to control module 302. Each heartbeat message may include the communication ID, for example, the receiving ID, to identify the source of the message. In some embodiments, the transmission of heartbeat messages may be an independent process that is unconditionally performed irrespective of other events or processes in this embodiment. In some embodiments, the transmission of heartbeat messages may be dependent upon other events or the outcome of other processes in this embodiment as will be described below in detail.

At 2904, host 204 may transmit a data request message to control module 302 requesting data from an assembly module 202. For example, host 204 may request status data or sensor signals from sensor modules 304. At 2906, in response to receiving the data request message, control module 302 may transmit a data request message to corresponding assembly module 202 via the data lines of bus 400 for requesting the data from assembly module 202. The data request message may include the transmission ID assigned to assembly module 202 as the destination address of the data request message as described above.

At 2908, in response to receiving the data request message from control module 302, assembly module 202 may retrieve the requested data, e.g., from persistent storage 616, memory 604, and/or any other suitable components. At 2910, assembly module 202 may transmit a data message to control module 302 via the data lines of bus 400. The data message may include the requested data and the receiving ID of assembly module 202 that is indicative of the source of the data message. At 2912, in response to receiving the data message from assembly module 202 and identifying the source of the data message based on the receiving ID, control module 302 may transmit a data message including the requested data to host 204. In some embodiments, if assembly module 202 keeps transmitting data messages to control module 302 in a time interval, assembly module 202 may skip transmitting the heartbeat messages to control module 302 because the data messages may also indicate the normal status of assembly module 202.

At 2914, in response to receiving either the heartbeat message at 2902 or the data message at 2910 from assembly module 202, control module 302 can determine that assembly module 202 is currently coupled to the modular assembly robotic toy (i.e., online) and thus, add the initial ID of corresponding assembly module 202 to the online module list. In some embodiments, the communication ID assigned to assembly module 202 may be recorded as well in the online module list. At 2916, control module 302 may also reset the value of the threshold period of assembly module 202. At 2918, control module 302 may transmit a status message to host 204, which indicates the online status of corresponding assembly module 202. In some embodiments, host 204 may update an online module list to include assembly module 202 and present a message to the user informing the online status of assembly module 202.

Figure 30:
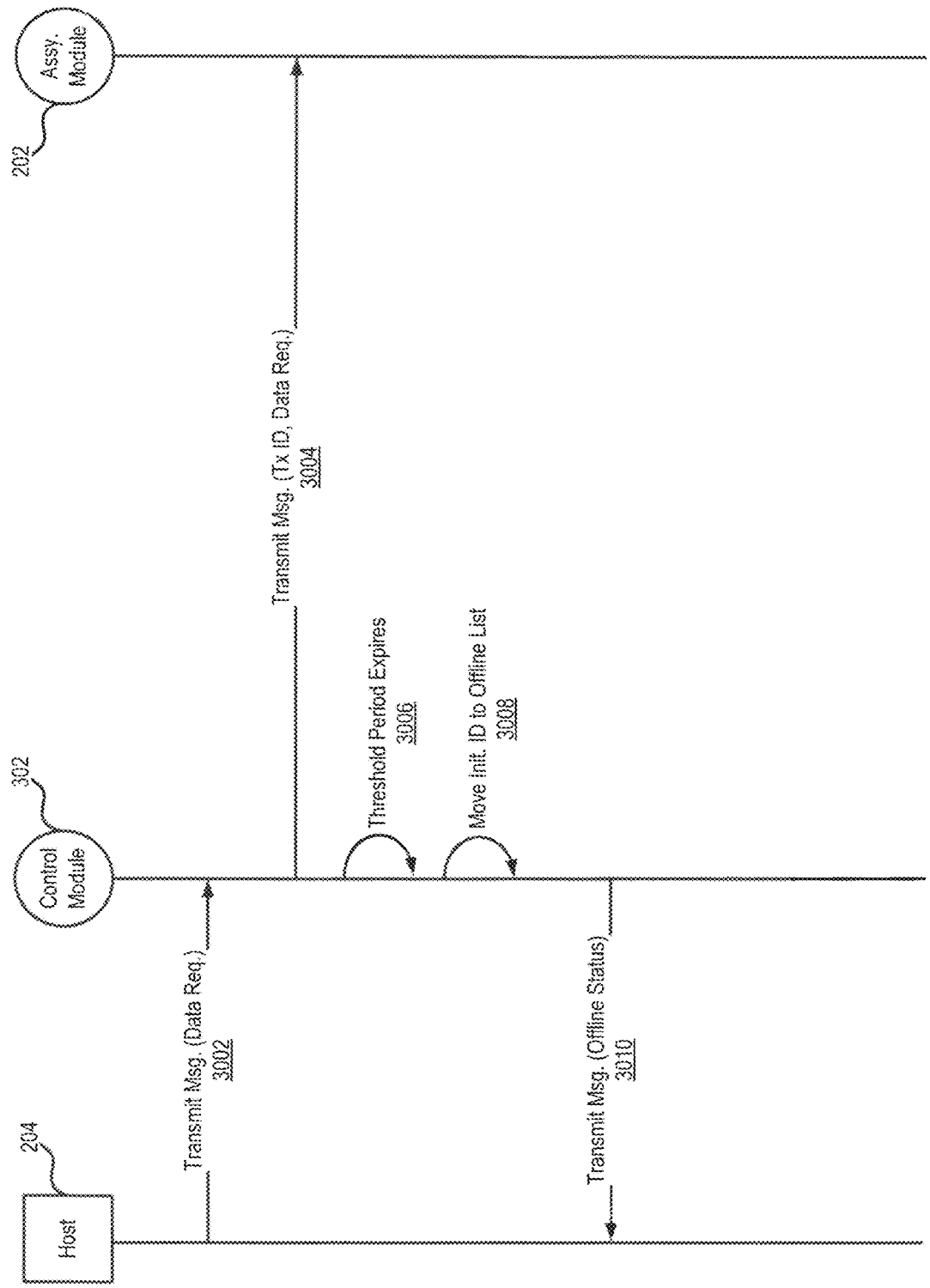
FIG. 30 is an event diagram illustrating another example of a method for updating a status associated with an assembly module in accordance with an embodiment.

FIG. 30 is an event diagram illustrating another example of updating a status associated with assembly module 202 in accordance with an embodiment. At 3002, host 204 may transmit a data request message to control module 302 for requesting data from assembly module 202. For example, host 204 may request status data or sensor signals from sensor modules 304. At 3004, in response to receiving the data request message, control module 302 may transmit a data request message to corresponding assembly module 202 via the data lines of bus 400 requesting the data from assembly module 202. The data request message may include the transmission ID assigned to assembly module 202 as the destination address of the data request message as described above.

At 3006, control module 302 neither receives a data message from assembly module 202 as a response to the data request message transmitted at 3004 nor receives a heartbeat message from assembly module 202 until the threshold period of corresponding assembly module 202 expires. Control module 302 thus may determine that assembly module 202 is currently decoupled from the modular assembly robotic toy (i.e., becomes offline). At 3008, control module 302 may move the initial ID of assembly module 202 to an offline module list. In some embodiments, the communication ID assigned to assembly module 202 may be recorded in the offline module list as well. In some embodiments, control module 302 may not transmit the data request message to assembly module 202 at 3004. At 3006, if control module 302 does not receive a heartbeat message from assembly module 202 until the threshold period of assembly module 202 expires, control module 302 may also move the initial ID of assembly module 202 to the offline module list. At 3010, control module 302 may transmit a status message to host 204, which indicate the offline status of corresponding assembly module 202. In some embodiments, host 204 may update an offline module list to include assembly module 202 and present a message to the user informing the offline status of assembly module 202.

Figure 31:
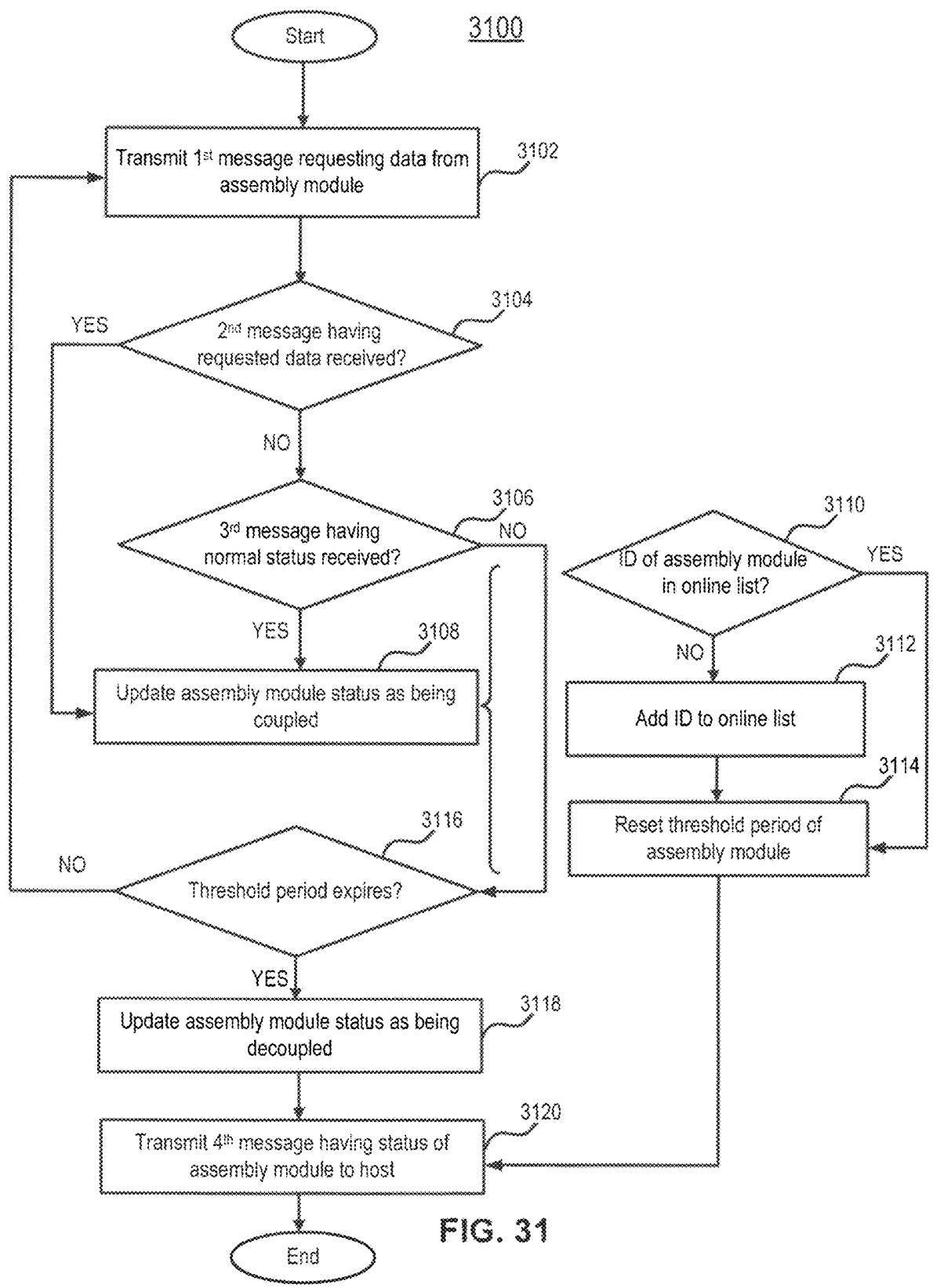
FIG. 31 is a flow chart illustrating an example of a method for updating a status associated with an assembly module in accordance with an embodiment.

FIG. 31 is a flow chart illustrating an example of a method 3100 for updating a status associated with assembly module 202 in accordance with an embodiment. It will be described with reference to the above figures. However, any suitable circuit, logic, unit, or module may be employed. Method 3100 can be performed by any suitable circuit, logic, unit, or module that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 31, as will be understood by a person of ordinary skill in the art.

Starting at 3102, control module 302 may transmit a first message to assembly module 202 requesting data from assembly module 202. The first message may include a communication ID assigned to assembly module 202 as the destination address. As described above, the communication ID may be generated by control module 302 based on the initial ID of assembly module 202. In some embodiments, the first message may be generated in response to receiving a data request message from host 204.

At 3104, control module 302 may determine whether a second message including the requested data is received from assembly module 202. If control module 302 does not receive the second message from assembly module 202, then at 3106, control module 302 may determine whether a third message including a normal status indicator, e.g., a heartbeat message, is received from assembly module 202. If control module 302 also does not receive the third message from assembly module 202, then control module 302 may check whether the threshold period of assembly module 202 expires. If the threshold period expires, then at 3118, control module 302 may update status of assembly module 202 as being decoupled from the modular assembly system (i.e., offline). If at 3116, the threshold period has not expired, then method 3100 returns to 3102.

If control module 302 receives the second message at 3104 or receives the third message at 3106 from assembly module 202, then at 3108, control module 302 may update the status of assembly module 202 as being coupled to the modular assembly system (i.e., online). An embodiment of 3108 shall now be described in greater detail. Specifically, at 3110, control module 302 may determine whether the initial ID and/or communication ID of assembly module 202 is in the online module list. If the initial ID and/or communication ID of assembly module 202 is not in the online module list (meaning that, for example, assembly module 202 may be quickly re-plugged into the modular assembly system after being decoupled from the modular assembly system), then at 3112, control module 302 may add the initial ID and/or communication ID of assembly module 202 into the online module list. In some embodiments, resources previously assigned to assembly module 202 may be resumed. At 3114, control module 302 may also reset the value of the threshold period of assembly module 202. If at 3110, the initial ID and/or communication ID of assembly module 202 is in the online module list (meaning that, for example, assembly module 202 remains being plugged into the modular assembly system), control module 302 may skip 3112 and reset the value of the threshold period of assembly module 202 at 3114.

After 3118 or 3114, control module 302 may transmit a fourth message including the current status of assembly module 202, either online or offline, to host 204 at 3120. In some embodiments, host 204 may update the online module list or the offline module list to include assembly module 202 accordingly and present a message to the user informing the current online or offline status of assembly module 202.

Figure 32:
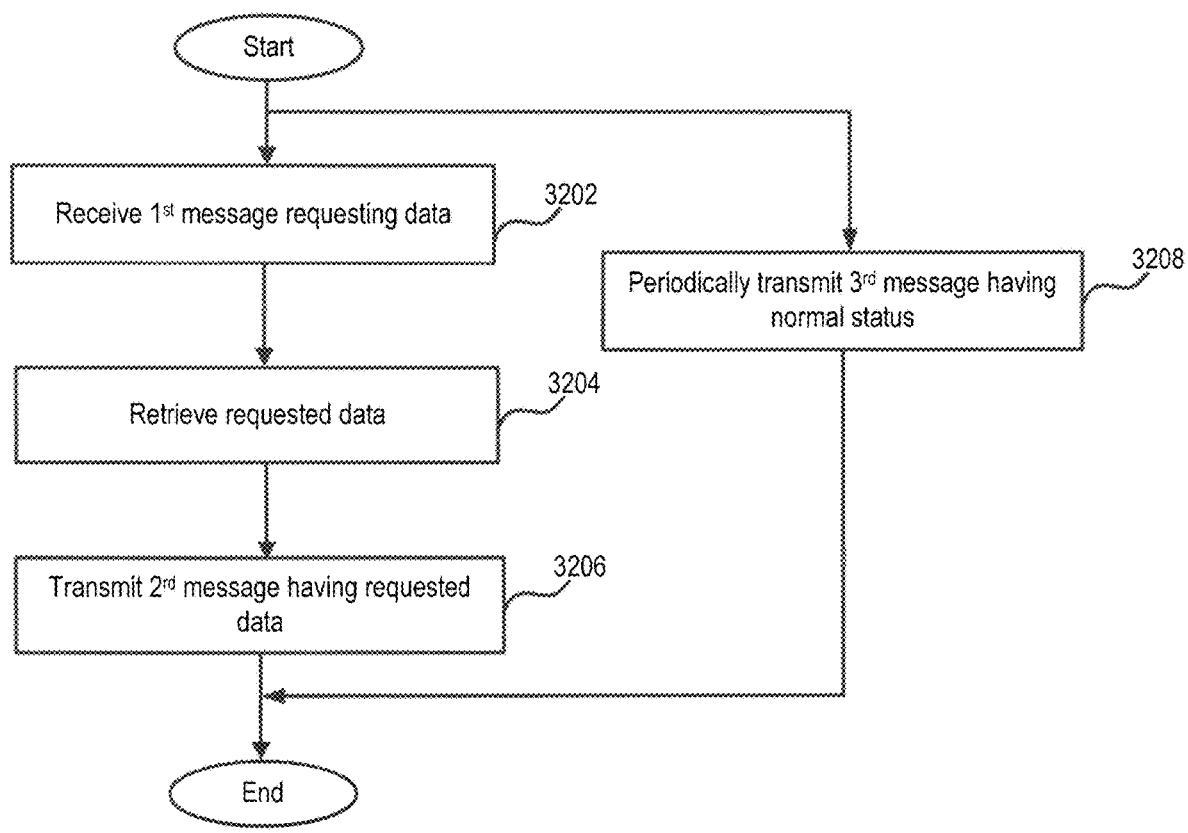
FIG. 32 is a flow chart illustrating another example of a method for updating a status associated with an assembly module in accordance with an embodiment.

FIG. 32 is a flow chart illustrating another example of a method 3200 for updating a status associated with assembly module 202 in accordance with an embodiment. It will be described with reference to the above figures. However, any suitable circuit, logic, unit, or module may be employed. Method 3200 can be performed by any suitable circuit, logic, unit, or module that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 32, as will be understood by a person of ordinary skill in the art.

Starting at 3202, assembly module 202 may receive the first message from control module 302 requesting data from assembly module 202. At 3204, assembly module 202 may retrieve the requested data. At 3206, assembly module 202 may transmit the second message including the requested data to control module 302. In parallel, at 3208, assembly module 202 may periodically transmit the third message including the normal status indicator to control module 302. It is to be appreciated that as described above, in some embodiments, assembly module 202 may skip transmitting the third message to control module 302 if the second message has been transmitted to control module 302 within a time period. In some embodiments, each of the second message and the third message may also include a communication ID assigned by control module 302 to assembly module 202 that indicates the source of the second message or third message.

Control Module Firmware Update

Figure 33:
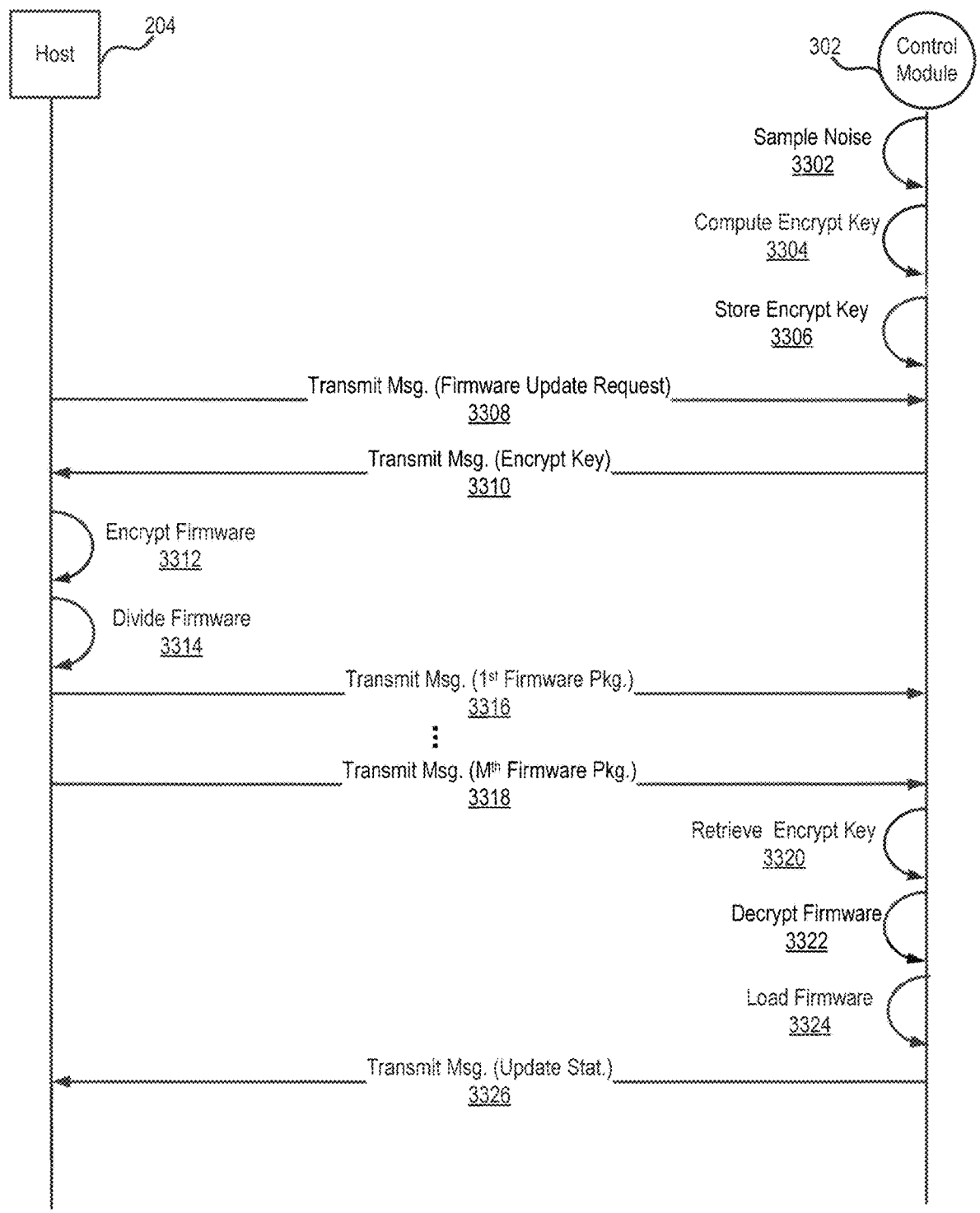
FIG. 33 is an event diagram illustrating an example of a method for updating firmware on a control module in accordance with an embodiment.
Figure 34:
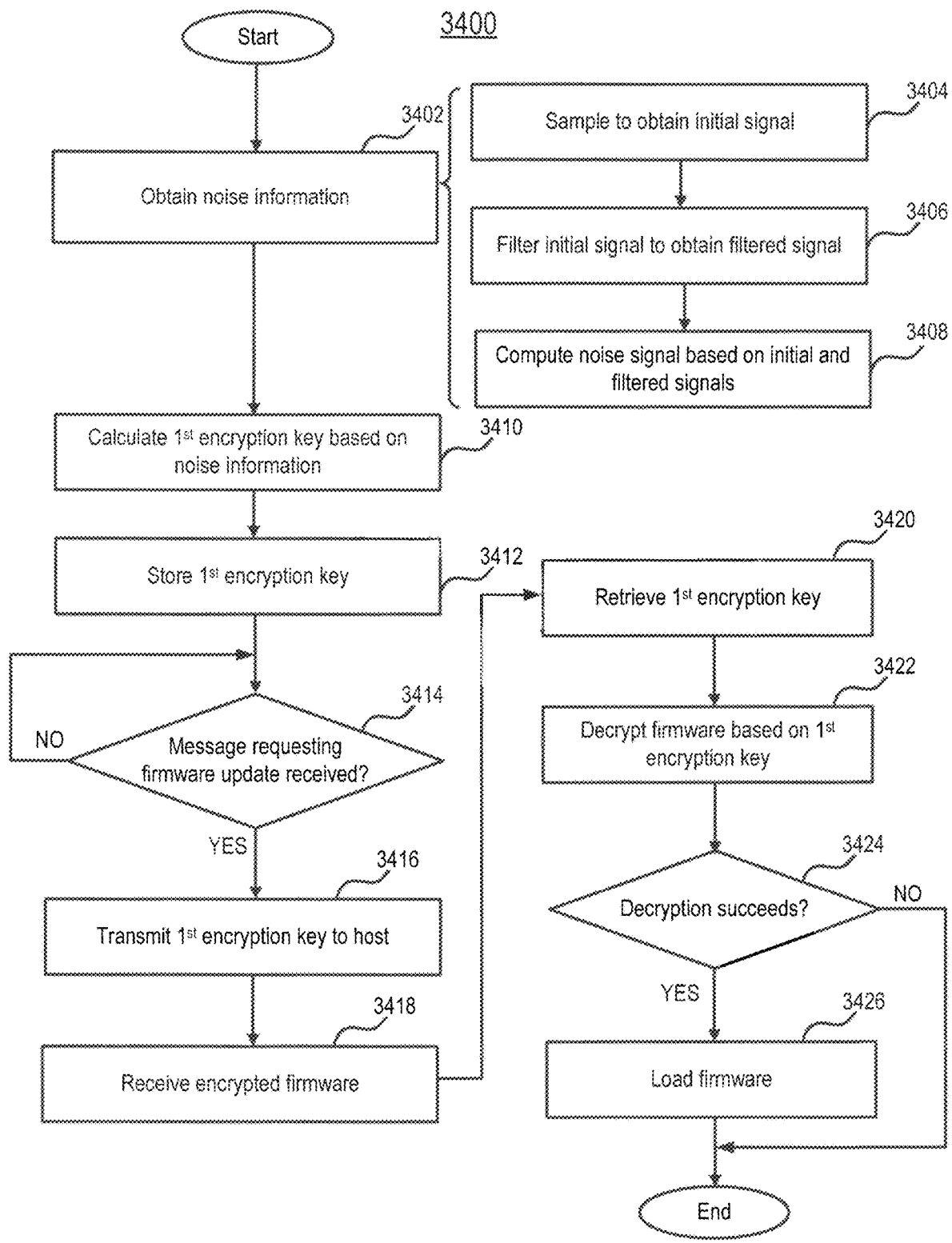
FIG. 34 is a flow chart illustrating an example of a method for updating firmware on a control module in accordance with an embodiment.
Figure 35:
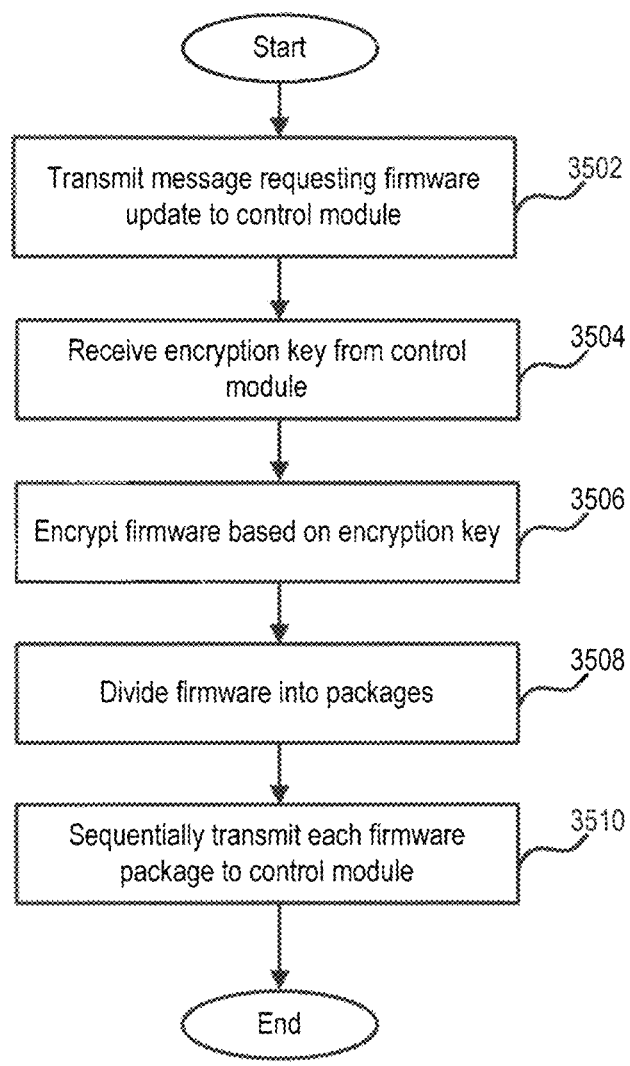
FIG. 35 is a flow chart illustrating another example of a method for updating firmware on a control module in accordance with an embodiment.

In some situations, it may be desirable to update firmware of assembly modules 202, such as control modules 302. In one example, bugs detected in previous version of firmware may be fixed in the updated firmware. In another example, new functions may be added to the updated firmware. In still another example, an assembly module 202 may become a different type of assembly module 202 by downloading a different firmware. In any event, there is a risk that the firmware downloaded by a particular assembly module 202 is not for the assembly module 202, either by mistakes or by batching downloading from malicious copying. FIGS. 33-35 disclose examples of updating firmware on control module 302 in a secure way to ensure that the firmware to be updated is for the correct control module.

FIG. 33 is an event diagram illustrating an example of updating firmware on control module 302 in accordance with an embodiment. At 3302, control module 302 may sample noise signals of control module 302 itself. It is understood that certain noise signals, e.g., Gaussian white noise, are random signals at any time and thus, may be unique to the source of the noise signals, e.g., control module 302 in this example. It is to be appreciated that in some embodiments, the sampled signals may not be limited to noise signals and may be any signals that is unique to control module 302. In this embodiment, control module 302 may first sample certain components of control module 302, e.g., the power supply, to obtain an initial signal, e.g., a power signal. In one example, the sampling may be performed by analog-to-digital conversion (ADC). Control module 302 then may filter the initial signal for removing noise signal to obtain a filter signal, e.g., a filtered power signal. The filtering may be performed by Kalman filtering, first-order lag or low-pass filtering, weighted average recursive filtering, Butterworth filtering, Chebyshev filtering, or any other suitable filters. Control module 302 may compute a noise signal based on the initial and filtered signals. For example, the value of the noise signal may be obtained by subtracting the value of the initial signal by the value of the filtered signal.

At 3304, control module 302 may compute an encryption key based on the noise signal. For example, modulo operation may be used for calculating the encryption key. In one example, the value of the noise signal may modulo 16 (NoiseValue % 16) to obtain the encryption key. In some embodiments, the length of the encryption key may be checked to see if it meets the security requirement. If the length of the encryption key does not meet the security requirement, different modulo operation may be applied to generate another encryption key. At 3306, control module 302 may store the encryption key, for example, in persistent storage 716. It is to be appreciated that the encryption key may be stored in any suitable storage.

It is to be appreciated that in some embodiments, an encryption key may be generated by other approaches. In one example, any suitable computational random-number generator (RNG) may be used by control module 302 to generate the encryption key, such as linear congruential generator, middle square method, Mersenne Twister algorithm, CryptGenRandom, probability density function, or any pseudorandom number generators (PRNGs), etc. In another example, the initial ID of control module 302 or any IDs of any components of control module 302, e.g., the ID of processor 702, may be used by control module 302 to generate the encryption key.

At 3308, host 204 may transmit a firmware update request message to control module 302. It is to be appreciated that 3308 may occur before 3302. In other words, in some embodiments, control module 302 may sample noise signals to generate the encryption key in response to receiving the firmware update request message. In some embodiments, control module 302 may perform 3302 regardless of whether the firmware update request message being received. For example, control module 302 may automatically perform 3302 the first time when control module 302 is powered-up. In any event, at 3310, control module 302 may transmit an encryption key message to host 204. Control module 302 may retrieve the encryption key stored in persistent storage 716 and include the encryption key in the encryption key message.

At 3312, host 204 may encrypt the firmware to be updated based on the received encryption key. Any suitable encryption algorithms may be used by host 204 for encryption, such as but not limited to, advanced encryption standard (AES), data encryption standard (DES), or triple DES (3DES). At 3314, host 204 may divide the firmware file into M data packages. In this embodiment, each data package may have the same size and include a header and an error detection and correction code. TABLE 5 below illustrates one example of the firmware data package. In TABLE 5, the header includes the flag, package size, and package number. The package size does not count the header and error detection and correction code, but includes the package number and data. The size of data is the package size minus two bytes.

TABLE 5

| Flag | | | Package Size | | | Package No. | | Data | CRC | |
| --- | --- | --- | --- | --- | --- | --- | --- | --- | --- | --- |
| Byte 0 0 × 42 | Byte 1 0 × 4C | Byte 2 | Byte 3 | Byte 4 | Byte 5 | Byte 6 | Byte 7 | ... | Byte N-1 | Byte N |
| | | | Package size | | | Package No. | | Data | CRC16 | |

At 3316, host 204 may transmit the first firmware data package to control module 302. In this embodiment, control module 302 may check the first firmware data package based on the CRC16 code. If the CRC check is passed, control module 302 may send a message notifying host 204 to continue to transmit the next firmware data package. If the CRC check is failed, control module 302 may send a message notifying host 204 to resend the previous firmware data package. In some embodiments, the firmware update process may be aborted if no response is received from host 204 within a certain period after notifying host 204 to resend the previous firmware data package or if the CRC check has failed for a certain number of times. The same processes may be repeated until at 3318, host 204 may transmit the last (e.g., Mth) firmware data package to control module 302. That is, host 204 may transmit each of the M firmware data packages in sequence to control module 302. It is to be appreciated that in some embodiments, CRC check may be skipped, and host 204 may continue transmitting each firmware data package without waiting for notification from control module 302.

At 3320, after receiving all the firmware data packages, i.e., the entire firmware file, control module 302 may retrieve the encryption key, for example, from persistent storage 716 or any storage where the encryption key can be stored. At 3322, control module 302 may decrypt the firmware file using the retrieved encryption key. If the retrieved encryption key matches the encryption key that is used by host 204 to encrypt the firmware file, i.e., the firmware file is transmitted to the correct control module, then the firmware file can be decrypted (i.e., the decryption is successful). At 3324, control module 302 may load the firmware to complete the firmware update process. Otherwise, if the decryption fails, for example, because the retrieved encryption key does not match the encryption key used for encrypting the firmware file by host 204 or because control module 302 cannot retrieve any encryption key, then the firmware update process fails. In any event, at 3326, control module 302 may transmit a firmware update status message to host 204 to report whether the firmware update is successful or not.

FIG. 34 is a flow chart illustrating an example of a method 3400 for updating firmware on control module 302 in accordance with an embodiment. It will be described with reference to the above figures. However, any suitable circuit, logic, unit, or module may be employed. Method 3400 can be performed by any suitable circuit, logic, unit, or module that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 34, as will be understood by a person of ordinary skill in the art.

Starting at 3402, control module 302 may obtain noise information sampled from control module 302 itself. An embodiment of 3402 shall now be described in greater detail. Specifically, at 3404, control module 302 may sample certain components, such as the power supply, to obtain an initial signal, for example, using ADC. At 3406, control module 346 may filter the initial signal to obtain a filter signal, for example, using Kalman filtering. At 3408, control module 302 may compute a noise signal based on the initial and filter signals, for example, using subtraction operation. At 3410, control module 302 may calculate a first encryption key based on the noise information. For example, the calculation may be performed by modulo operation on the noise signal. At 3412, control module 302 may store the first encryption key in persistent storage 716 of control module 302.

At 3414, control module 302 may determine whether a message requesting firmware update is received from host 204. If the message is not received, control module 302 may continue checking until the message is received. At 3416, control module 302 may transmit the first encryption key to host 204.

At 3418, control module 302 may receive encrypted firmware from host 204. The firmware may be encrypted by host 204 based on a second encryption key. In some embodiments, the encrypted firmware may be divided into multiple data packages that are sequentially transmitted to control module 302 from host 204. The size of each data package may be the same. After receiving the encrypted firmware, e.g., all the data packages, at 3420 control module 302 may retrieve the first encryption key from persistent storage 716 of control module 302. At 3422, control module 302 may decrypt the firmware based on the retrieved first encryption key. At 3424, control module 302 may determine whether the decryption succeeds. In this embodiment, if the first encryption key matches the second encryption key, then the decryption succeeds. At 3426, control module 302 may load the decrypted firmware to complete the firmware update process. Otherwise, the decryption fails, and the firmware update process fails.

FIG. 35 is a flow chart illustrating another example of a method 3500 for updating firmware on control module 302 in accordance with an embodiment. It will be described with reference to the above figures. However, any suitable circuit, logic, unit, or module may be employed. Method 3500 can be performed by any suitable circuit, logic, unit, or module that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 35, as will be understood by a person of ordinary skill in the art.

Starting at 3502, host 204 may transmit a message request firmware update to corresponding control module 302 at which the firmware update is to be performed. At 3504, host 204 may receive an encryption key from control module 302. The encryption key may be calculated based on noise information sampled from control module 302, such as the power supply of control module 302. At 3506, host 204 may encrypt the firmware based on the received encryption key using any suitable encryption algorithms, such as AES, DES, or 3DES. At 3508, host 204 may divide the firmware into multiple data packages. For example, the size of each package may be the same. At 3510, host 204 may sequentially transmit each firmware data package to control module 302. In some embodiments, host 204 may further receive the firmware update status (e.g., success or failure) from control module 302.

Host Applications

The functions of modular assembly systems disclosed herein (e.g., modular assembly robotic toys) can be customized by users via host applications running on hosts 204, and the behaviors of the modular assembly systems can be controlled by the users at runtime via the host applications running on hosts 204 as well. For example, control application 1214, programming application 1216, and firmware update application 1218 described above with respect to FIG. 12 are examples of the host applications running on hosts 204. Embodiments of control application 1214 and programming application 1216 shall now be described in greater detail with respect to FIGS. 36-42.

Figure 36:
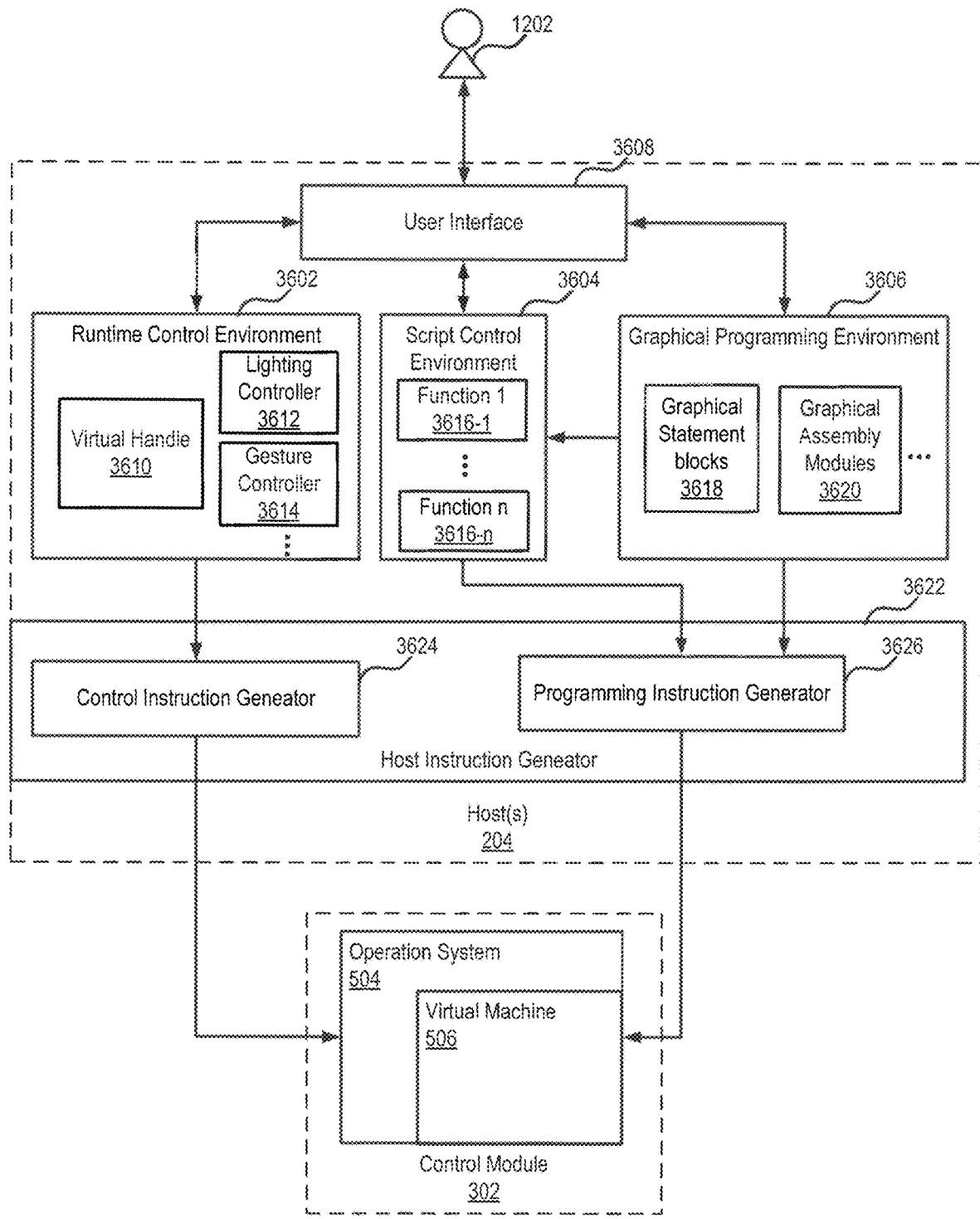
FIG. 36 is a block diagram illustrating an example of applications running on hosts in accordance with an embodiment.

FIG. 36 is a block diagram illustrating an example of applications running on hosts 204 in accordance with an embodiment. It is to be appreciated that applications 3602, 3604, and 3606 disclosed herein may run on a single host 204 or on multiple hosts 204. For the illustrative purpose only, applications 3602, 3604, and 3606 in this embodiment will be described as running on a single host 204. It is also to be appreciated that some applications 3602, 3604, and 3606 may be integrated into a single application. For example, script control environment 3604 may be integrated with runtime control environment 3602 to form control application 1214 or may be integrated with graphical programming environment 3606 to form programming application 1216. As shown in FIG. 36, a user interface 3608 may be rendered by host 204 to serve as the interface between user 1202 and any of applications 3602, 3604, and 3606. In addition, a host instruction generator 3622 may run on host 204 for generating host instructions based on user inputs to any of applications 3602, 3604, and 3606 and providing host instructions to operating system 504 and/or virtual machine 506 running on control module 302.

In this embodiment, runtime control environment 3602 may allow user 1202 to interactively control operations of the modular assembly system at runtime when the modular assembly system in on operation. Runtime control environment 3602 may include a virtual handle 3610, a lighting controller 3612, and a gesture controller 3614. Interactions between user 1202 and any functional components of runtime control environment 3602 may be recorded and forwarded to a control instruction generator 3624 in host instruction generator 3622 to generate corresponding control instructions. The control instructions may be transmitted from host 204 to operating system 504 of control module 302 and converted into operation instructions for each corresponding assembly module 202 of the modular assembly system. For example, the control instruction may be transmitted to control module 302 using BLE technologies.

In this embodiment, virtual handle 3610 may allow user 1202 to control motion of the modular assembly system by interacting with virtual handle 3610. In some embodiments, virtual handle 3610 may mimic the appearance of one of assembly modules 202 of the modular assembly system. For example, movement module 318 may be substantially ball-shaped, and virtual handle 3610 may mimic the ball shape of movement module 318 when virtual handle 3610 is rendered on the display screen of host 204. User 1202 may interact with virtual handle 3160 in various manners. In one example, the display screen of host 204 may be a touch screen so that user 1202 can touch different portions of virtual handle 3160 and/or use different touch gestures to control the actions of actuator modules 306, e.g., moving forward, backward, upward, and downward, turning left and right, or tilting forward and backward. In another example, host 204 may be a mobile or portable device having inertial sensors, such as gyroscopes and accelerometers. Host 204 thus can sense motion of the mobile device caused by user 1202 (e.g., capturing the angle in which the mobile device is tilted by user 1202), and virtual handle 3610 can control the actions of actuator modules 306 by mimicking the motion or pose (e.g., tilting angles) of the mobile device. For example, user 1202 may first keep the mobile device flat to set a zero angle point. Then virtual handle 3160 can control actuator modules 306 to move forward or backward when the mobile device is tilted forward or backward, respectively, and control actuator modules 306 to turn left or right when the mobile device is tilted left or right, respectively. It is to be appreciated that in some embodiments, user 1202 may interact with virtual handle 3610 in any other suitable manners, such as voice commands, eyeball movement, or head, body, hand, and finger gestures, to name a few. It is to be appreciated that in some embodiments, virtual handle 3610 may be presented on a display screen of an assembly module 202 of the modular assembly system, such as control modules 302 or analyzing modules 308. For example, voice command recognition or user gesture recognition may be performed, at least partially, by analyzing modules 308.

In this embodiment, lighting controller 3612 may allow user 1202 to control lighting of the modular assembly system. In this embodiment, lights may be arranged on one or more assembly modules 202, such as control modules 302 and movement modules 318. User 1202 may set the lighting scheme of the modular assembly system, for example, the color of lights, the lighting duration and interval, synchronization of lighting on different assembly modules, etc. Gesture controller 3614 may allow user 1202 to control the modular assembly system, or one or more assembly modules 202 thereof to present certain gestures. It is to be appreciated that additional functional components may be included in runtime control environment 3602 to facilitate user 1202 to control the modular assembly system at runtime.

In this embodiment, script control environment 3604 may allow user 1202 to designate a function or behavior corresponding to the particular modular assembly system. In this embodiment, script control environment 3604 may provide a set of predefined base functions 3616-1, . . . , 3616-n to user 1202 for selection. Each predefined base function 3616 may correspond to one of modular assembly systems and include a series of actions for each assembly module 202 of the specific modular assembly system. User 1202 may further modify or configure the selected base function 3616 to designate the desired function or behavior to be performed by the particular modular assembly system. In this embodiment, programming instruction generator 3626 in host instruction generator 3622 may generate corresponding programming instructions, e.g., Lua scripts, based on the modified or configured base function 3616. Host 204 may transmit the programming instructions to virtual machine 506 of control module 302 prior to the modular assembly system performs the function or behavior designated by user 1202. For example, the programming instructions may be transmitted to control module 302 using BLE technologies. Virtual machine 506 may convert the programming instructions into operation instructions for each assembly module 202 of the modular assembly system to perform the series of actions set in the modified or configured base function 3616. As described above, in some embodiments, a physical switch on control module 302 may be used to interrupt the execution of the programming instructions by virtual machine 506 of control module 302. For example, the programming instructions may not be executed by control module 302 until the physical switch is triggered.

Each base function 3616 may be predefined based on a specific modular assembly system, i.e., the particular assembly modules plugged into the modular assembly system. Base functions 3616 may include, for example, self-balancing, tracking, color recognition, obstacle avoidance, and following. For example, the specific modular assembly system for the self-balancing base function may include at least control module 302 with gyroscopes and movement modules 318. The self-balancing base function allows the modular assembly system to keep balance while moving. Specifically, the gyroscopes on control module 302 may detect the titling angle of the modular assembly system at runtime, and control module 302 may control movement modules 318 to maintain balance based on the real-time tilting angle of the modular assembly system. In another example, the specific modular assembly system for the tracking base function may include at least color recognition module 316 and movement modules 318. The tracking base function allows the modular assembly system to move along a colored path. Specifically, a path with a particular color may be drawn on the ground, and color recognition module 316 may recognize the particular colored path and provide the sensor signals to control module 302. Control module 302 then may control movement modules 318 to move along the colored path.

In this embodiment, graphical programming environment 3606 may facilitate user 1202 to input programs, e.g., statement blocks, prior to the modular assembly system (e.g., control module 302) on operation. Graphical programming environment 3606 may include graphical statement blocks 3618 and graphical assembly modules 3620. Interactions between user 1202 and any functional components of graphical programming environment 3606 may be recorded and forwarded to programming instruction generator 3626 in host instruction generator 3622 to generate corresponding programming instructions. The programming instructions may be transmitted by host 204 to virtual machine 506 of control module 302 and converted into operation instructions for each corresponding assembly module 202 of the modular assembly system. For example, the programming instructions may be transmitted to control module 302 using USB. In some embodiments, prior to transmitting the programming instructions to control module 302, graphical programming environment 3606 may present a preview of the operations of assembly modules 202 of the modular assembly system in accordance with the programming instructions.

In this embodiment, user 1202 may select graphical statement blocks 3618 by dragging-and-dropping and provide values to parameters of selected graphical statement blocks 3618 to build the program. In some embodiments, graphical statement blocks 3618 may be grouped into categories, and at least some categories relate to functions of assembly modules 202 of the modular assembly system, such as motion, lighting, or sensing. In some embodiments, parameters of some graphical statement blocks 3618 may be associated with the physical switch on control module 302, such as the duration of pressing the physical switch as a condition to trigger an event. In this embodiment, each graphical assembly module 3620 may be a graphical representation corresponding to one of assembly modules 202 of the modular assembly system and may be associated with at least one property, such as name, icon, color, etc. In some embodiments, the icon may mimic the appearance of corresponding assembly module 202. In this embodiment, user 1202 may provide values of properties of graphical assembly modules 3620 to configure graphical assembly modules 3620 and/or corresponding assembly modules 202. It is to be appreciated that additional functional components may be included in graphical programming environment 3606 to facilitate user 1202 to program the modular assembly system.

Figure 37A:
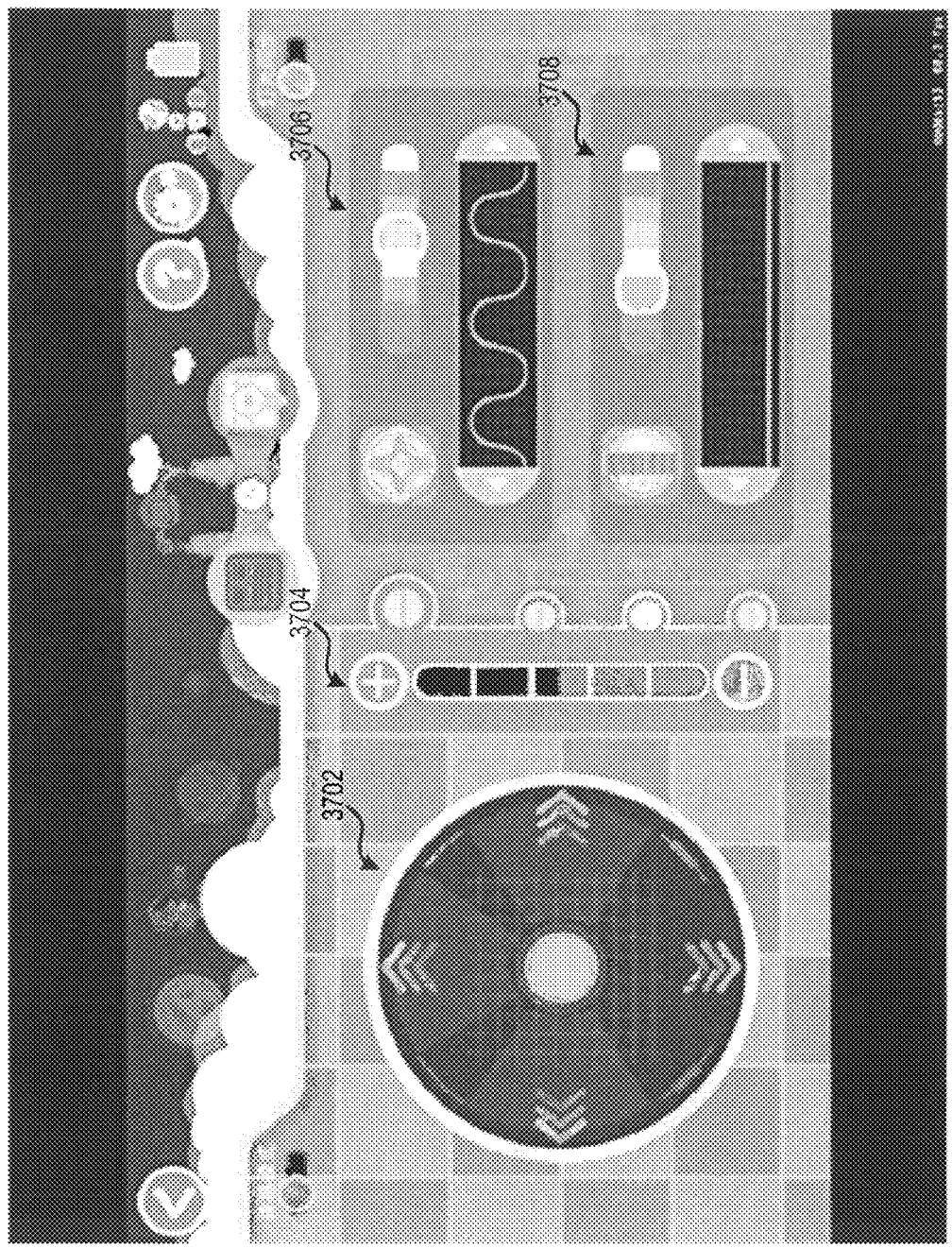
FIGS. 37A-37B are screenshots of an example of a control application in accordance with an embodiment.
Figure 37B:
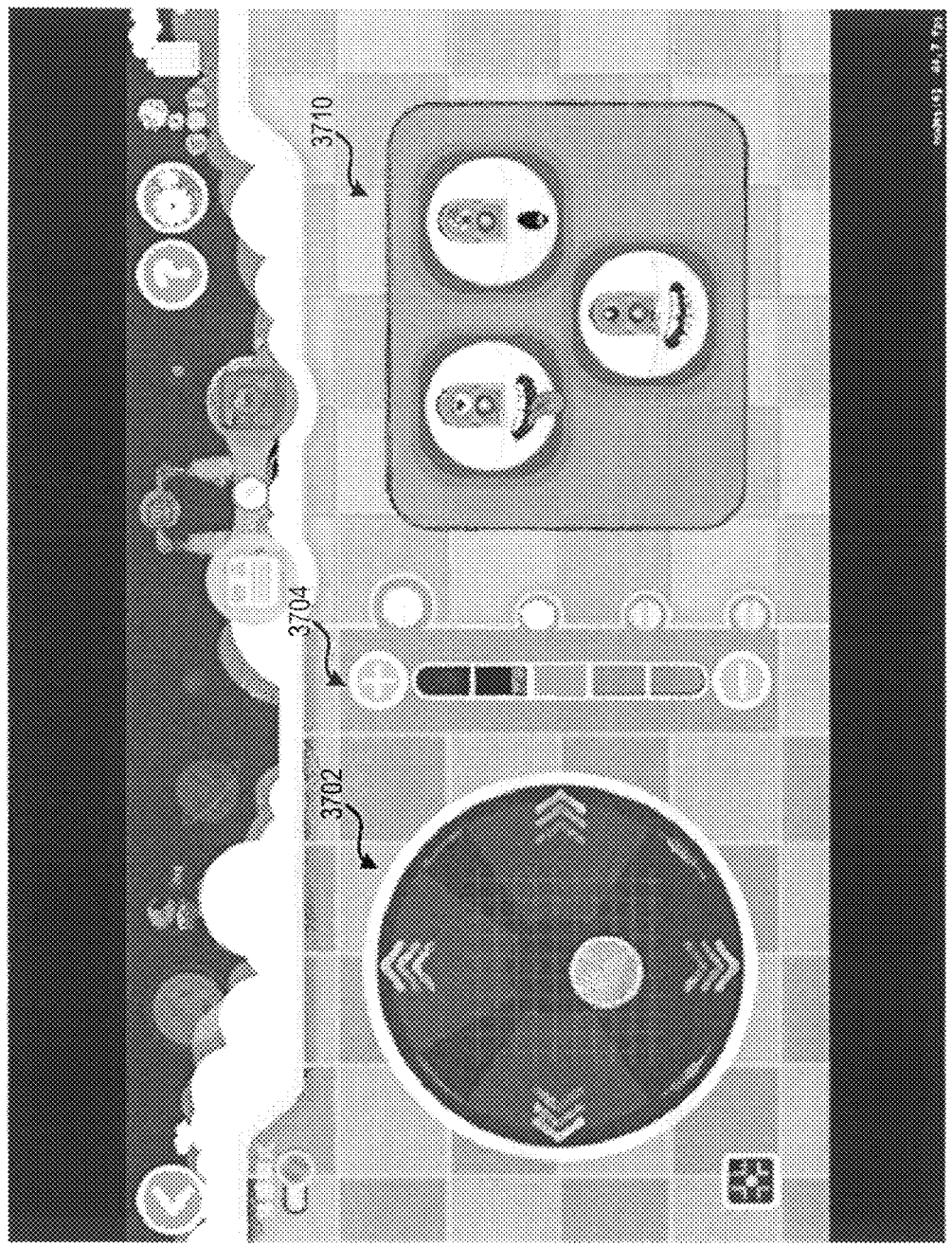

FIGS. 37A-37B are screenshots of an example of a control application in accordance with an embodiment. In FIG. 37A, the screenshot represents an exemplary GUI of virtual handle 3610 and lighting controller 3612. A GUI element 3702 represents virtual handle 3610 for the user to real-time control the movement direction (e.g., forward, backward, left, and right) of movement modules 318 of the modular assembly system. A GUI element 3704 allows the user to adjust the movement speed of movement modules 318. On the right side of the GUI, GUI elements 3706 and 3708 represent lighting controller 3612. GUI element 3706 allows the user to control lighting on control module 302, and GUI element 3708 allows the user to control lighting on movement modules 318. In FIG. 37B, on the right side of the GUI, a GUI element 3710 represents gesture controller 3614 and allows the user to select one of the three predefined gestures that can be presented by color recognition module 316.

Figure 38:
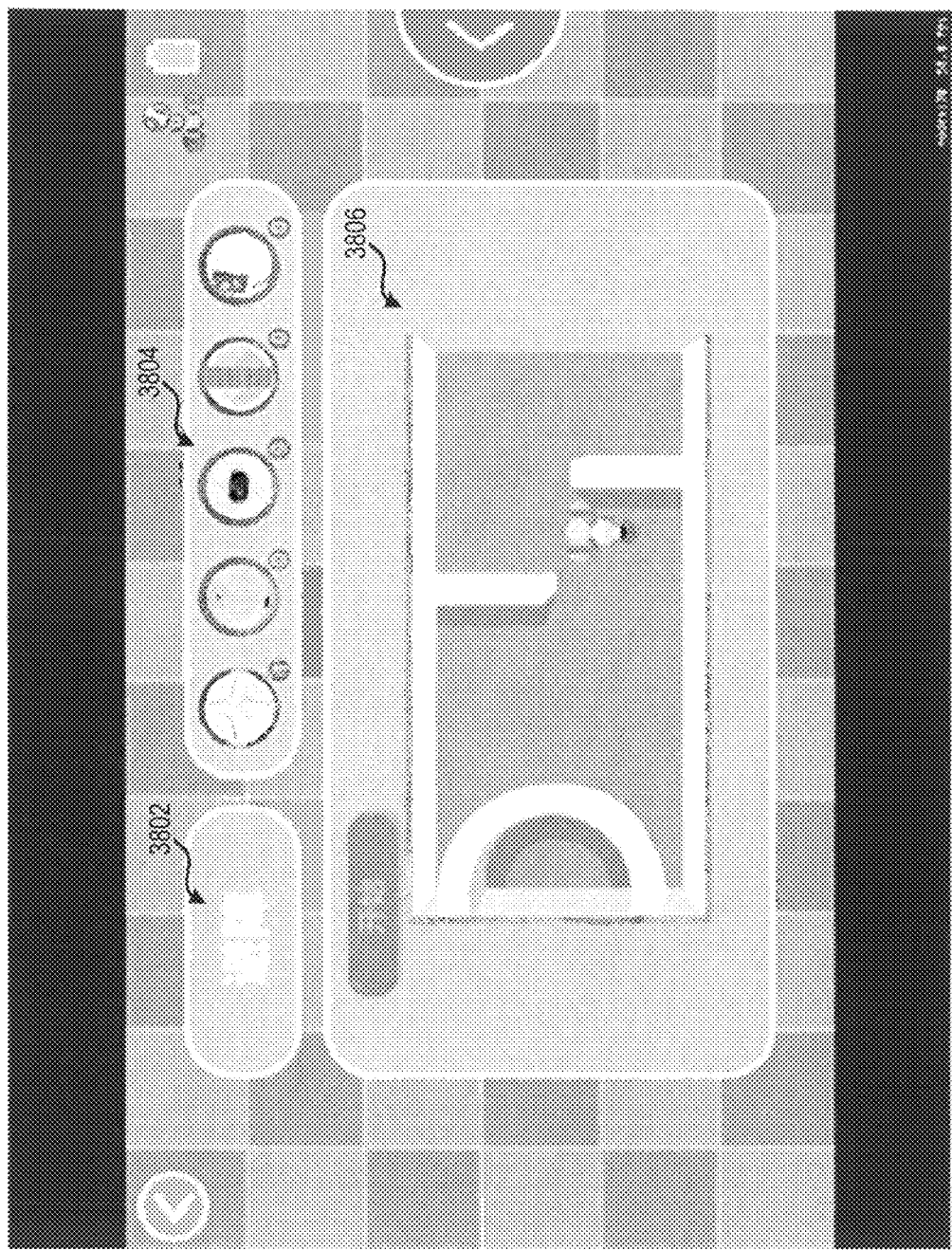
FIG. 38 is a screenshot of another example of a control application in accordance with an embodiment.

FIG. 38 is a screenshot of another example of a control application in accordance with an embodiment. In this example, the screenshot represents an exemplary GUI of one base function 3616 of script control environment 3604. As shown in FIG. 38, a GUI element 3802 indicates that the selected base function 3616 is "Obstacle Avoidance." A GUI element 3804 represents the assembly modules that are needed for the corresponding modular assembly system to perform the selected base function and the number of each type of assembly modules that are currently online. A GUI element 3806 allows the user to further modify or configure the selected base function, for example, by simulating the behavior of the modular assembly system.

Figure 39:
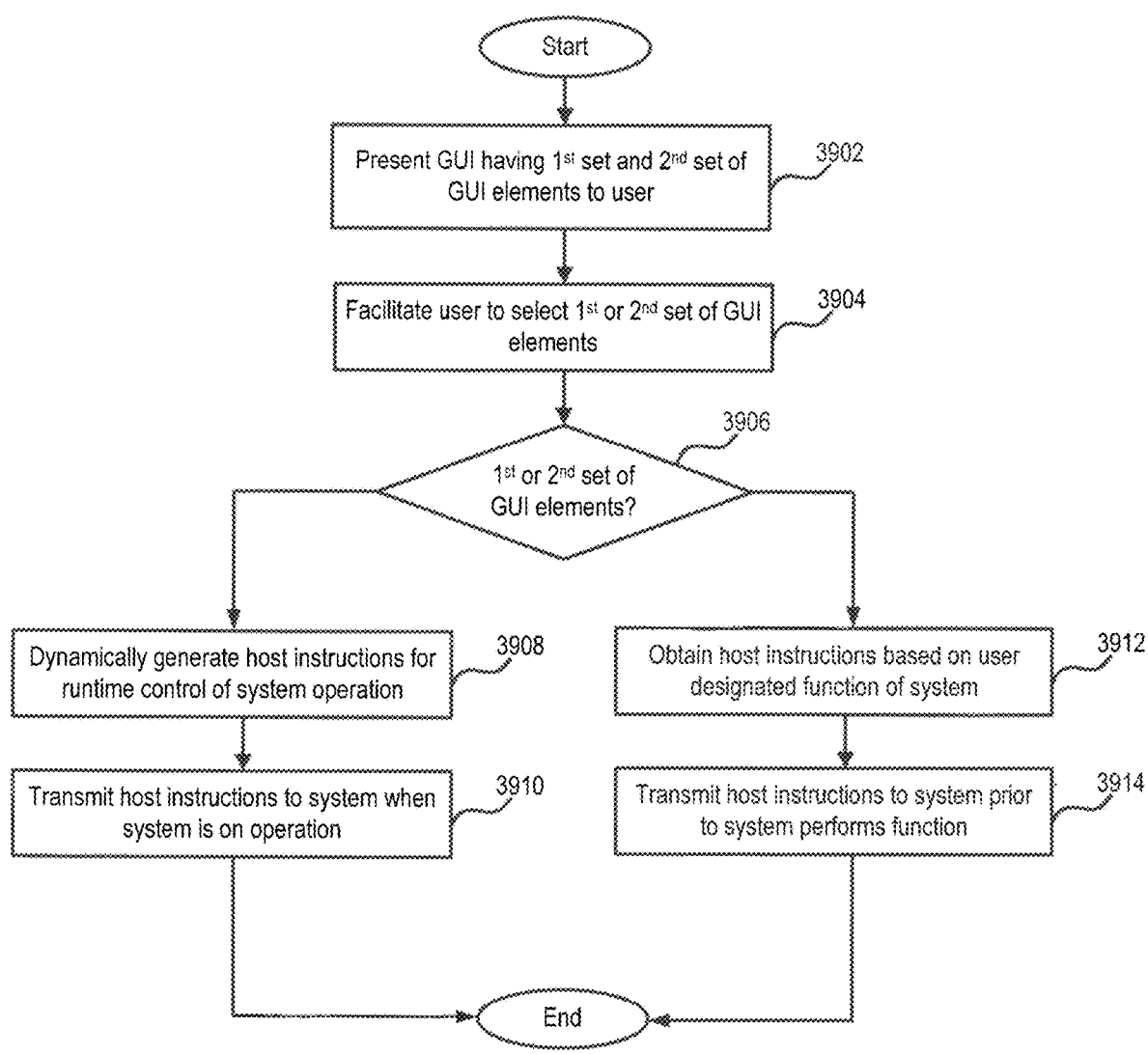
FIG. 39 is a flow chart illustrating an example of a method for providing host instructions to a control module in accordance with an embodiment.

FIG. 39 is a flow chart illustrating an example of a method 3900 for providing host instructions to control module 302 in accordance with an embodiment. It will be described with reference to the above figures. However, any suitable circuit, logic, unit, or module may be employed. Method 3900 can be performed by any suitable circuit, logic, unit, or module that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 39, as will be understood by a person of ordinary skill in the art.

Starting at 3902, host 204 may present a GUI having a first set of GUI elements and a second set of GUI elements to a user. The first set of GUI elements may allow the user to interactively control operation of the modular assembly system at runtime when the modular assembly system is on operation. The operation of the modular assembly system may include, for example, motion, lighting, and gesture. In one example, the first set of GUI elements may represent runtime control environment 3602, which includes virtual handle 3610, lighting controller 3612, and gesture controller 3614, as described above in detail. The second set of GUI elements may allow the user to designate a function or behavior corresponding to the modular assembly system. For example, the second set of GUI elements may represent script control environment 3604, which includes predefined base functions 3616 as described above in detail.

At 3904, host 204 may facilitate the user to select the first set of GUI elements or the second set of GUI elements. At 3906, host 204 may determine whether the first set of GUI elements or the second set of GUI elements is selected by the user. If the first set of GUI elements are selected, then at 3908, host 204 may dynamically generate a first set of host instruction, e.g., control instructions, based on the user's interactions with the first set of GUI elements for controlling the operation of the modular assembly system. At 3910, host 204 may transmit the generated first set of host instructions to control module 302 of the modular assembly system at runtime when the modular assembly system is on operation. If the second set of GUI elements are selected, then at 3912, host 204 may obtain a second set of host instructions, e.g., programming instructions, based on the function or behavior designated by the user. At 3914, host 204 may transmit the obtained second set of host instructions to control module 302 of the modular assembly system prior to the modular assembly system performs the function or behavior designated by the user. It is to be appreciated that the user may select both the first and second sets of GUI elements, and host 204 can generate and transmit both the first and second sets of host instructions in parallel or in sequence.

Figure 40A:
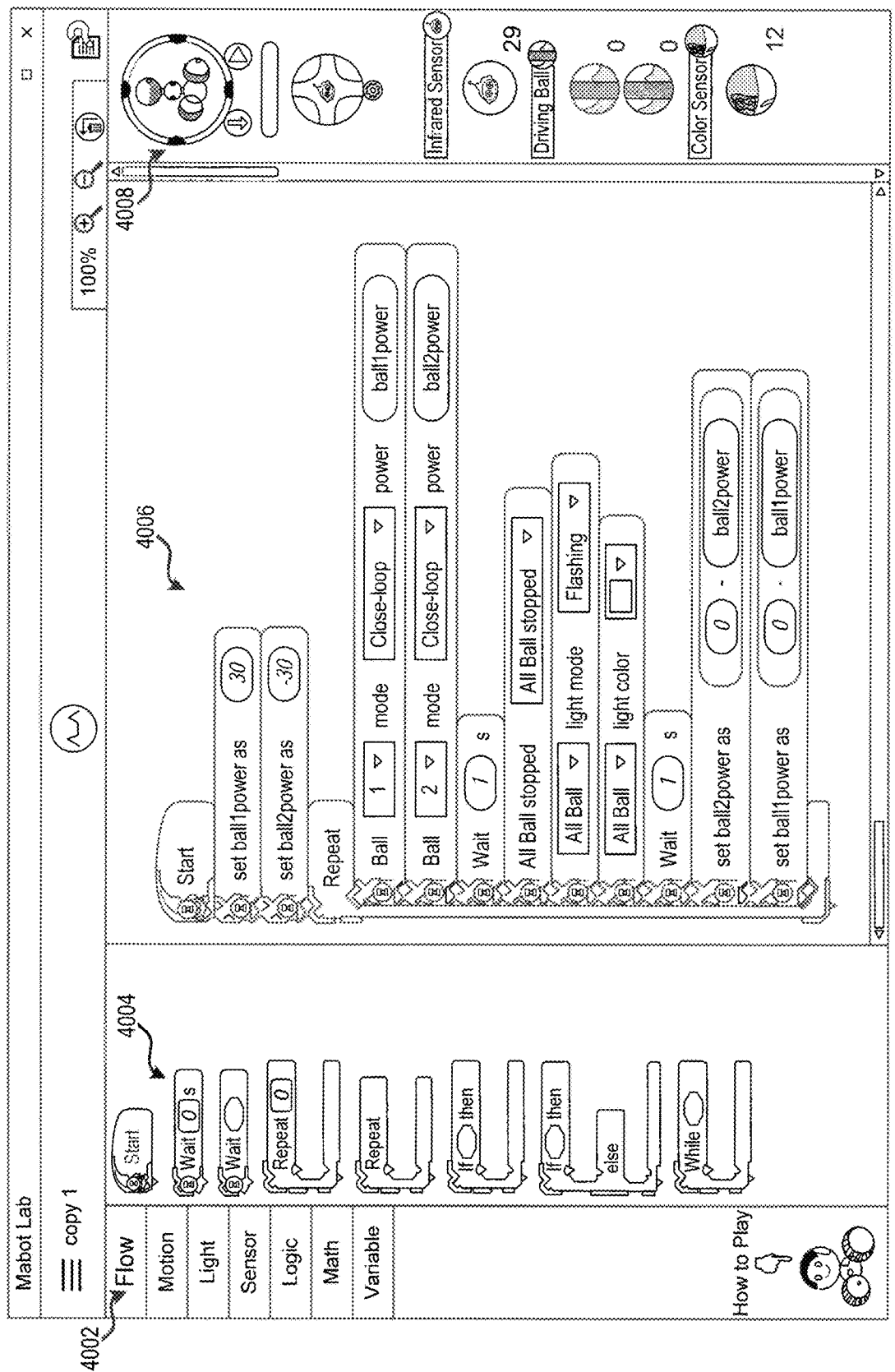
FIGS. 40A-40B are screenshots of an example of a programming application in accordance with an embodiment.
Figure 40B:
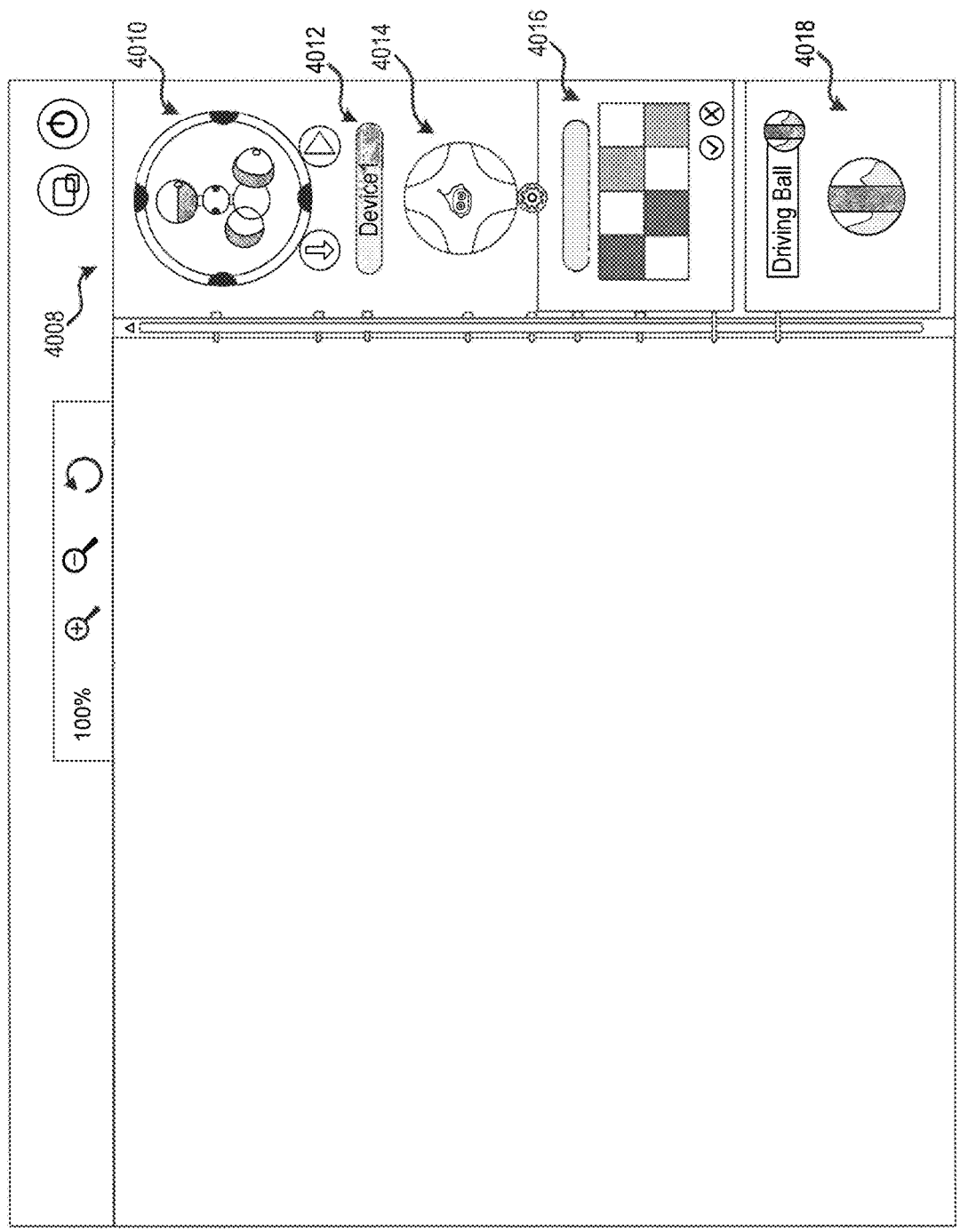

FIGS. 40A-40B are screenshots of an example of a programming application in accordance with an embodiment. In FIG. 40A, the screenshot represents an exemplary GUI of graphical programming environment 3606. GUI elements 4002 and 4004 represent graphical statement blocks 3618 that are organized in categories for the user select. GUI element 4002 represents the categories such as "Flow," "Motion," "Light," "Sensor," "Logic," "Math," and "Variable." GUI element 4004 represents the available graphical statement blocks 3618 under the currently-selected category—"Flow." As described above, graphical statements blocks 3618 may include parameters. The user can drag and drop desired graphical statement blocks 3618 into a GUI element 4006 to build a program. The values of the parameters of the selected graphical statement blocks 3618 can be inputted in GUI element 4006 as well.

Figure 41:
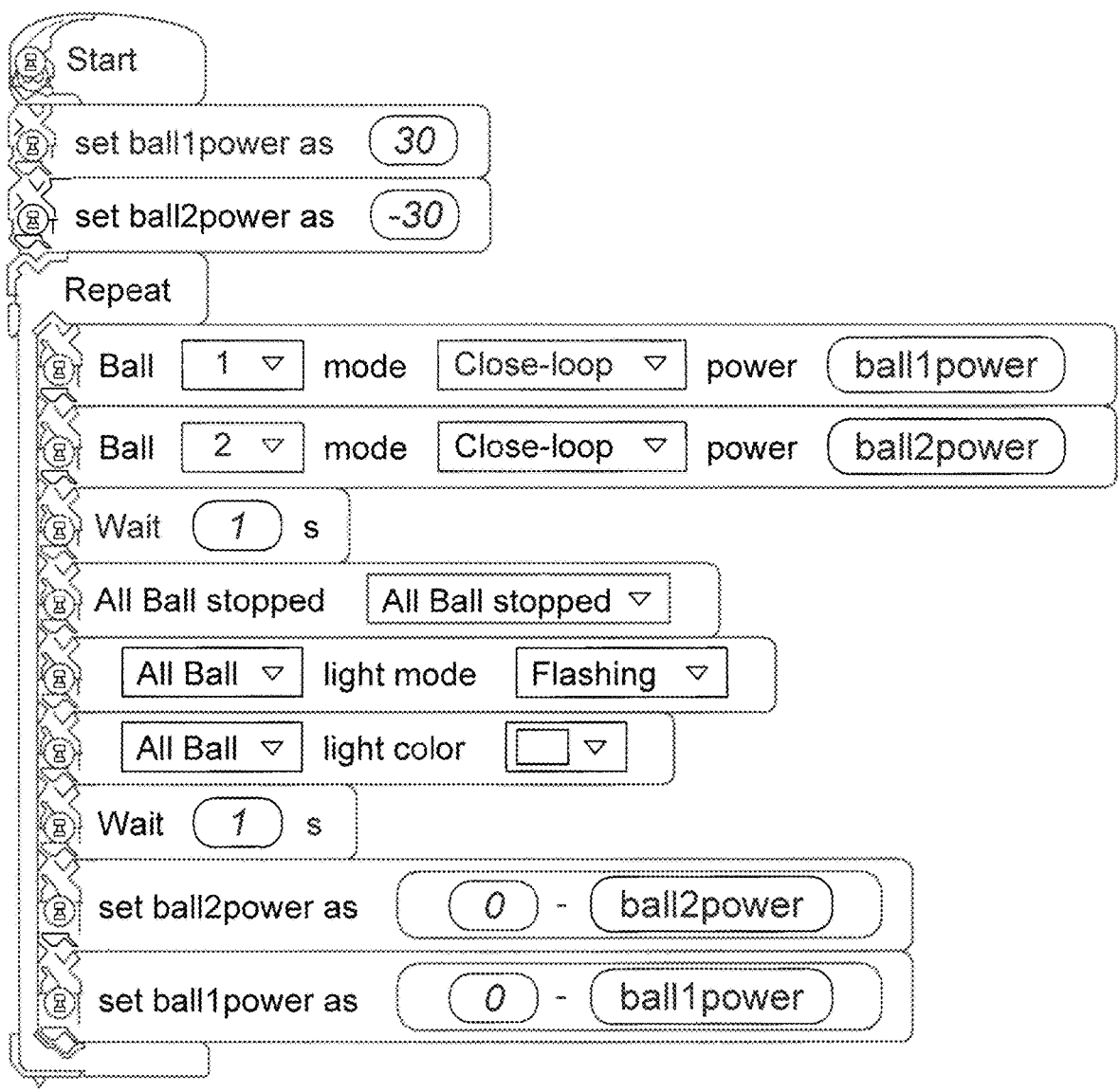
FIG. 41 is a screenshot of an example of a program including graphical statement blocks in accordance with an embodiment.

For example, FIG. 41 is a screenshot of an example of a program 4100 including graphical statement blocks in accordance with an embodiment. In this example, program 4100 starts with a "Start" graphical statement block. Program 4100 then sets the values of "ballpower" parameters of two power modules 310 as "30" and "−30." The next graphical statement block of program 4100 indicates that the following graphical statement blocks are repeated. Program 4100 further includes a graphical statement block that instructs movement modules 318 to stop without brake and graphical statement blocks that instruct all assembly modules to flash lights in the green color. In this example, program 4100 can achieve the following function or behavior: (1) the modular assembly robotic toy moves forward for one second with output power of 30 watt, while all the assembly modules flash the green lights; (2) after one second of idle time, switching the power output of the two movement modules to cause the modular assembly robotic toy to move backward for one second, while all the assembly modules flash the green lights; and (3) repeating (1) and (2) until the execution of program 4100 is interrupted.

Returning back to FIGS. 40A-40B, a GUI element 4008 represents graphical assembly modules 3620 of graphical programming environment 3606. In this example, GUI element 4008 shows the icon 4010 of the modular assembly robotic toy, the name 4012 of the modular assembly robotic toy, and icons, names, and numbers of each assembly module 202 of the modular assembly robotic toy. For example, a GUI element 4014 shows an icon of control module 302, a GUI element 4016 shows a field to input the name of control module 302, and a GUI element 4018 shows a field to select the color for control module 302. A GUI element 4018 provides the similar presentation or selection for movement module 318. That is, GUI element 4008 allows the user to provide values to properties (e.g., icon, name, or color) of each assembly module 202 of the modular assembly robotic toy or properties of the modular assembly robotic itself. In this embodiment, the icon of the modular assembly robotic toy and the icons of each assembly module 202 mimic the appearances of corresponding modular assembly robotic toy and assembly modules 202, respectively.

Figure 42:
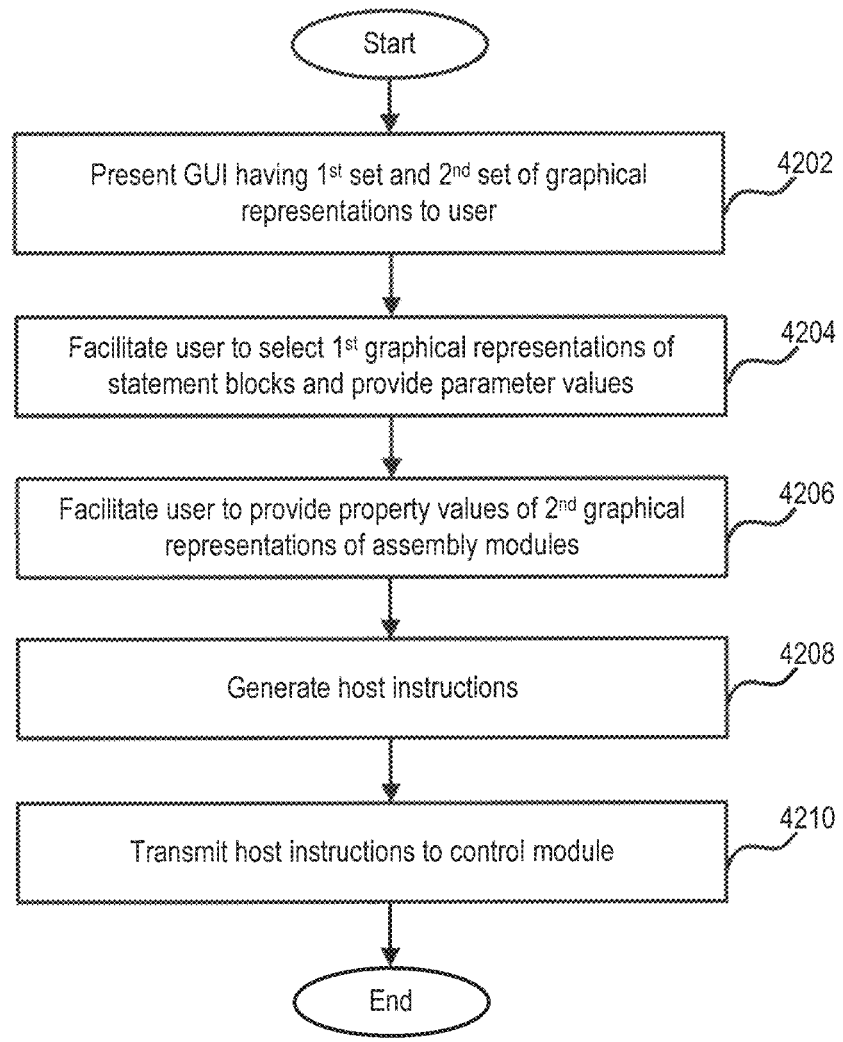
FIG. 42 is a flow chart illustrating another example of a method for providing host instructions to a control module in accordance with an embodiment.

FIG. 42 is a flow chart illustrating another example of a method 4200 for providing host instructions to control module 302 in accordance with an embodiment. It will be described with reference to the above figures. However, any suitable circuit, logic, unit, or module may be employed. Method 4200 can be performed by any suitable circuit, logic, unit, or module that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 42, as will be understood by a person of ordinary skill in the art.

Starting at 4202, host 204 may present a GUI, e.g., graphical programming environment 3606, including a set of first graphical representations and a set of second graphical representations. Each first graphical representation, e.g., graphical statement block 3618, may correspond to a statement block including at least one parameter. Each second graphical representation, e.g., graphical assembly module 3620, may correspond to one assembly module 202 associated with at least one property, e.g., icon, name, or color. The set of first graphical representations may be grouped into categories, some of which relate to functions of assembly modules 202, such as motion, lighting, or sensing.

At 4204, host 204 may facilitate the user to select at least one of the first graphical representations and provide values of the parameters for each selected graphical representation. The selection may be made by dragging-and-dropping the first graphical representations. In other words, the user may build the program in a visual and graphical manner. At 4206, host 204 may facilitate the user to provide values to the properties of the second graphical representations. That is, the user may customize the properties of assembly modules 202. It is to be appreciated that host 204 may perform 4204 and 4206 independently or in parallel. In some embodiments, the user may not be promoted to provide values to the properties of the second graphical representations.

At 4208, host 204 may generate a set of host instructions, e.g., programming instructions, based on the selected first and second graphical representations and values provided thereof. The host instructions may be, for example, source codes or intermediate codes. It is to be appreciated that in some embodiments, the host instructions may be generated based on the selected first graphical representation and values provided thereof, i.e., the program, but not based on the selected second graphical representations and values provided thereof. In other words, in some embodiments, the customization of properties of assembly modules 202 via the second graphical representations may be used by host 204, but not by control module 302. At 4210, host 204 may transmit the generated set of host instructions to control module 302 for controlling the operations of assembly modules 202 of the modular assembly system. In this embodiment, the transmission may occur prior to control module 302 is on operation. In some embodiments, host 204 may present a preview of the operations of assembly modules 202 in accordance with the set of host instructions prior to the transmission.

Figure 43:
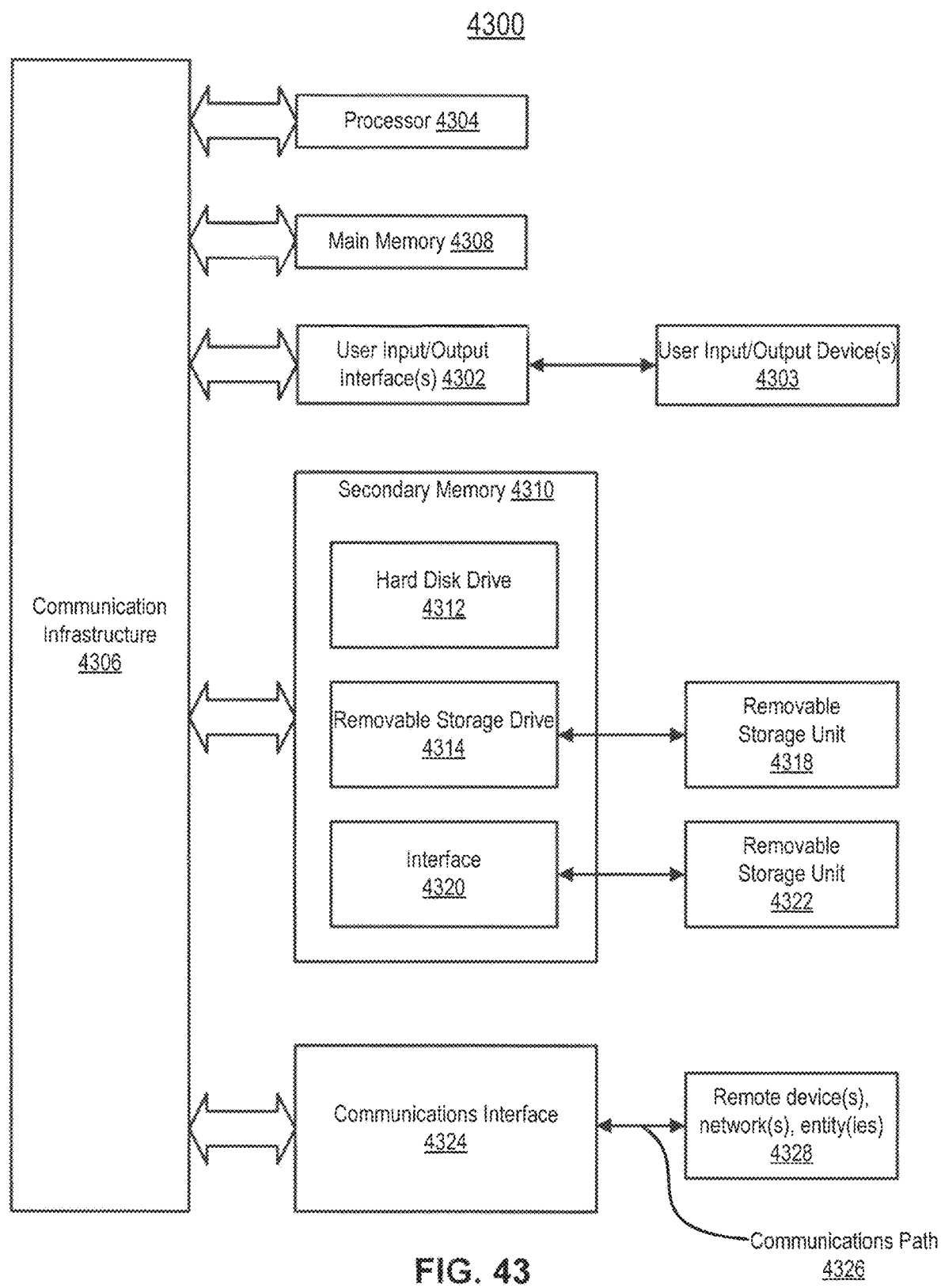
FIG. 43 is a block diagram illustrating an example of a computer system useful for implementing various embodiments set forth in the disclosure.

Various embodiments can be implemented, for example, using one or more computer systems, such as computer system 4300 shown in FIG. 43. One or more computer system 4300 can be used, for example, to implement method 2700 of FIG. 27, method 2800 of FIG. 28, method 3100 of FIG. 31, method 3200 of FIG. 32, method 3400 of FIG. 34, method 3500 of FIG. 35, method 3900 of FIG. 39, and method 4200 of FIG. 42, as well as event diagrams of FIGS. 26, 29, 30, and 33. For example, computer system 4300 can update firmware on and/or provide host instructions to a control module of a modular assembly system, according to various embodiments. Computer system 4300 can be any computer capable of performing the functions described herein.

Computer system 4300 can be any well-known computer capable of performing the functions described herein. Computer system 4300 includes one or more processors (also called central processing units, or CPUs), such as a processor 4304. Processor 4304 is connected to a communication infrastructure or bus 4306. One or more processors 4304 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 4300 also includes user input/output device(s) 4303, such as monitors, keyboards, pointing devices, etc., that communicate with communication infrastructure 4306 through user input/output interface(s) 4302.

Computer system 4300 also includes a main or primary memory 4308, such as random access memory (RAM). Main memory 4308 may include one or more levels of cache. Main memory 4308 has stored therein control logic (i.e., computer software) and/or data. Computer system 4300 may also include one or more secondary storage devices or memory 4310. Secondary memory 4310 may include, for example, a hard disk drive 4312 and/or a removable storage device or drive 4314. Removable storage drive 4314 may be a floppy disk drive, a magnetic tape drive, a compact disk drive, an optical storage device, tape backup device, and/or any other storage device/drive. Removable storage drive 4314 may interact with a removable storage unit 4318. Removable storage unit 4318 includes a computer usable or readable storage device having stored thereon computer software (control logic) and/or data. Removable storage unit 4318 may be a floppy disk, magnetic tape, compact disk, DVD, optical storage disk, and/any other computer data storage device. Removable storage drive 4314 reads from and/or writes to removable storage unit 4318 in a well-known manner.

According to an exemplary embodiment, secondary memory 4310 may include other means, instrumentalities or other approaches for allowing computer programs and/or other instructions and/or data to be accessed by computer system 4300. Such means, instrumentalities or other approaches may include, for example, a removable storage unit 4322 and an interface 4320. Examples of the removable storage unit 4322 and the interface 4320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 4300 may further include a communication or network interface 4324. Communication interface 4324 enables computer system 4300 to communicate and interact with any combination of remote devices, remote networks, remote entities, etc. (individually and collectively referenced by reference number 4328). For example, communication interface 4324 may allow computer system 4300 to communicate with remote devices 4328 over communications path 4326, which may be wired and/or wireless, and which may include any combination of LANs, WANs, the Internet, etc. Control logic and/or data may be transmitted to and from computer system 4300 via communication path 4326.

In an embodiment, a tangible apparatus or article of manufacture comprising a tangible computer useable or readable medium having control logic (software) stored thereon is also referred to herein as a computer program product or program storage device. This includes, but is not limited to, computer system 4300, main memory 4308, secondary memory 4310, and removable storage units 4318 and 4322, as well as tangible articles of manufacture embodying any combination of the foregoing. Such control logic, when executed by one or more data processing devices (such as computer system 4300), causes such data processing devices to operate as described herein.

Based on the teachings contained in this disclosure, it will be apparent to persons skilled in the relevant art(s) how to make and use embodiments of the present disclosure using data processing devices, computer systems and/or computer architectures other than that shown in FIG. 43. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the present disclosure as contemplated by the inventor(s), and thus, are not intended to limit the present disclosure or the appended claims in any way.

While the present disclosure has been described herein with reference to exemplary embodiments for exemplary fields and applications, it should be understood that the present disclosure is not limited thereto. Other embodiments and modifications thereto are possible, and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the present disclosure should not be limited by any of the above-described exemplary embodiments, but should be defined only in accordance with the following claims and their equivalents.

What is claimed is:

1. A method for updating firmware on a control module of a modular assembly system, the method comprising:
   obtaining information related to noise sampled from the control module, the information comprising an initial signal that is obtained by analog-to-digital conversion (ADC);
   calculating a first encryption key based on the information by filtering a noise signal from the initial signal to form a filtered signal and subtracting the filtered signal from the initial signal, the filtering being performed by Kalman filter;
   receiving, from a host, a message for requesting firmware update;
   in response to receiving the message, transmitting, to the host, the first encryption key;
   receiving, from the host of the modular assembly system, firmware to be updated on the control module, wherein the firmware is encrypted based on at least a second encryption key that matches the first encryption key and is in a form of a plurality of data packages;
   determining that the received firmware can be decrypted based on the first encryption key;
   in response to determining that the received firmware can be decrypted, decrypting the received firmware; and
   loading the decrypted firmware into the control module,
   wherein at least one of the obtaining, calculating, sending, receiving, determining, decrypting, and loading is performed by the control module.

2. The method of claim 1, further comprising:
   storing the first encryption key in a persistent storage of the control module.

3. The method of claim 2, further comprising:
   in response to receiving the firmware to be updated, retrieving the first encryption key from the persistent storage.

4. The method of claim 1, wherein the received firmware can be decrypted based on the first encryption key when the first and second encryption keys are the same.

5. The method of claim 1, wherein the noise is sampled from power supply of the control module.

6. The method of claim 1, wherein the obtaining further comprises:
   sampling the control module to obtain the initial signal before filtering out the noise signal.

7. The method of claim 1, wherein the plurality of data packages are sequentially transmitted to the control module.

8. The method of claim 7, wherein a size of each of the plurality of data packages is the same.

9. A method for encrypting firmware to be updated on a control module of a modular assembly system, the method comprising:
- transmitting, to the control module, a message for requesting firmware update;
- receiving, from the control module, an encryption key calculated based on a noise signal of the control module, the noise signal being an initial signal of information related to noise sampled from the control module subtracting a filtered signal that is obtained by filtering out the noise signal from the initial signal, the initial signal being obtained by analog-to-digital conversion (ADC) and the filtered signal being obtained by Kalman filter;
- encrypting firmware based on at least the received encryption key;
- dividing the encrypted firmware into a plurality of data packages after the firmware is encrypted; and
- transmitting, to the control module, the encrypted firmware,
- wherein at least one of the receiving, encrypting, dividing, and transmitting is performed by a host of the modular assembly system.

10. The method of claim 9, wherein the transmitting further comprises:
- sequentially transmitting, to the control module, each of the plurality of data packages.

11. The method of claim 10, wherein a size of each of the plurality of data packages is the same.

12. The method of claim 9, wherein the noise is sampled from power supply of the control module.

* * * * *